US012585442B2

(12) United States Patent
Gao et al.

(10) Patent No.: US 12,585,442 B2
(45) Date of Patent: Mar. 24, 2026

(54) DISPLAY INTERFACE LAYOUT METHOD AND ELECTRONIC DEVICE

(71) Applicant: Huawei Technologies Co., Ltd., Shenzhen (CN)

(72) Inventors: Zhang Gao, Shanghai (CN); Xiaoxiao Chen, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/022,090

(22) PCT Filed: Aug. 9, 2021

(86) PCT No.: PCT/CN2021/111594
§ 371 (c)(1),
(2) Date: Feb. 17, 2023

(87) PCT Pub. No.: WO2022/037432
PCT Pub. Date: Feb. 24, 2022

(65) Prior Publication Data
US 2023/0359447 A1 Nov. 9, 2023

(30) Foreign Application Priority Data

Aug. 18, 2020 (CN) .......................... 202010833382.1
Sep. 10, 2020 (CN) .......................... 202010949895.9
(Continued)

(51) Int. Cl.
G06F 9/44 (2018.01)
G06F 8/38 (2018.01)
(Continued)

(52) U.S. Cl.
CPC .................. *G06F 8/38* (2013.01); *G06F 8/61* (2013.01); *G06F 9/451* (2018.02)

(58) Field of Classification Search
CPC .............. G06F 8/38; G06F 8/61; G06F 9/451
See application file for complete search history.

(56) References Cited

U.S. PATENT DOCUMENTS 11,574,429 B1 * 2/2023 Tam ....................... G06F 40/154
2017/0235473 A1 * 8/2017 Han ........................ G06F 9/451
715/771
(Continued)

FOREIGN PATENT DOCUMENTS

CN 103164197 A 6/2013
CN 103176797 A 6/2013
(Continued)

OTHER PUBLICATIONS

English translation, Wang (CN 111443974 A), 2020, pp. 1-72. (Year: 2020).*
(Continued)

*Primary Examiner* — Mongbao Nguyen
(74) *Attorney, Agent, or Firm* — Slater Matsil, LLP

(57) ABSTRACT

This application provides a display interface layout method and an electronic device. A preset initial layout file may be displayed on a development interface by using an application development tool. A developer may add one or more control units to the initial layout file, and set an attribute constraint condition of the control unit, to obtain a first layout file that corresponds to a first display interface and that is in a first application. An attribute value of the control unit is obtained by a running device of the first application through calculation based on the corresponding attribute constraint condition. Subsequently, the running device of the first application may calculate an attribute value of each control unit based on the attribute constraint condition set in (Continued)

the first layout file, to automatically complete layout and display of the first display interface based on the attribute value of each control unit.

15 Claims, 51 Drawing Sheets

(30)           Foreign Application Priority Data

| Oct. 22, 2020 | (CN) | .......................... | 202011141090.8 |
| Oct. 30, 2020 | (CN) | .......................... | 202011185677.9 |
| Dec. 28, 2020 | (CN) | .......................... | 202011583597.9 |
| May 27, 2021 | (CN) | .......................... | 202110586643.9 |

(51)  Int. Cl.

| *G06F 8/61* | (2018.01) |
| *G06F 9/445* | (2018.01) |
| *G06F 9/45* | (2006.01) |
| *G06F 9/451* | (2018.01) |
| *G06F 9/455* | (2018.01) |

(56)            References Cited

U.S. PATENT DOCUMENTS

| 2017/0337321 | A1* | 11/2017 | Hoford | ................. | G06F 30/392 |
| 2019/0278449 | A1 | 9/2019 | Murphy | | |
| 2019/0325626 | A1* | 10/2019 | Tao | .......................... | G06T 11/60 |
| 2020/0218516 | A1* | 7/2020 | Hari Krishnan | .... | G06F 9/45529 |

FOREIGN PATENT DOCUMENTS

| CN | 103530117 | A | | 1/2014 | | |
| CN | 103744595 | A | | 4/2014 | | |
| CN | 103885755 | A | | 6/2014 | | |
| CN | 106250117 | A | | 12/2016 | | |
| CN | 110032409 | A | * | 7/2019 | ........... | G06F 9/4451 |
| CN | 110262859 | A | * | 9/2019 | ............ | G06F 9/451 |
| CN | 110597510 | A | | 12/2019 | | |
| CN | 110874447 | A | * | 3/2020 | ......... | G05B 19/0425 |
| CN | 111190681 | A | * | 5/2020 | ............ | G06F 9/451 |
| CN | 111240669 | A | * | 6/2020 | .............. | G06F 8/38 |
| CN | 111367516 | A | * | 7/2020 | | |
| CN | 111367518 | A | * | 7/2020 | .............. | G06F 8/36 |
| CN | 111399789 | A | * | 7/2020 | ............. | G06V 40/13 |
| CN | 111443974 | A | * | 7/2020 | ............ | G06F 9/451 |
| CN | 112698828 | A | | 4/2021 | | |
| DE | 102018124414 | A1 | * | 4/2019 | ............ | G05B 15/02 |
| KR | 2020071322 | A | * | 6/2020 | | |
| WO | WO-2019218736 | A1 | * | 11/2019 | ............. | G06F 9/451 |

OTHER PUBLICATIONS

English translation, Ma et al. (CN 111399789 A), 2020, pp. 1-72. (Year: 2020).*

Yang Cuixia, UI Ripping in Android: Reverse Engineering of Graphical User Interfaces and its application, 2015, pp. 1-8. https://ieeexplore.ieee.org/stamp/stamp.jsp?tp=&arnumber=7423078 (Year: 2015).*

* cited by examiner

Attribute value (which includes an Android native attribute value and an attribute value related to a dynamic layout capability, for example, an attribute value related to a scaling capability) of a View or a ViewGroup Measure (a measurement process of a native attribute+a measurement process of dynamic layout), lay out, and draw

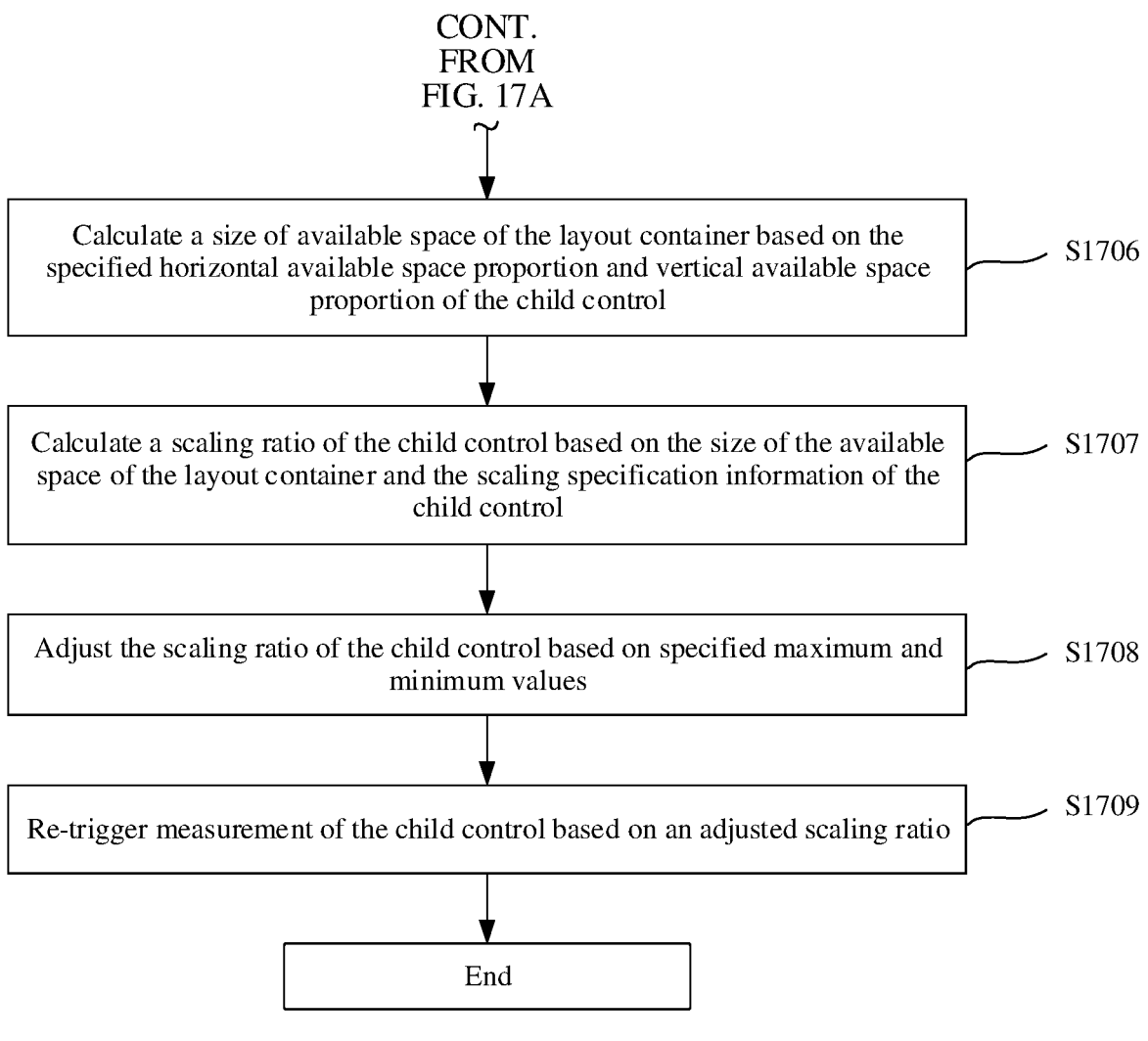

CONT.
FROM
FIG. 17A

Calculate a size of available space of the layout container based on the specified horizontal available space proportion and vertical available space proportion of the child control    S1706

Calculate a scaling ratio of the child control based on the size of the available space of the layout container and the scaling specification information of the child control    S1707

Adjust the scaling ratio of the child control based on specified maximum and minimum values    S1708

Re-trigger measurement of the child control based on an adjusted scaling ratio    S1709

End

FIG. 17B

CONT.
FROM

Mobile phone 2

Attribute value (which includes an Android native attribute value and an attribute value related to a dynamic layout capability, for example, an attribute value related to a wrap capability) of a View or a ViewGroup Measure (a measurement process of a native attribute+a measurement process of dynamic layout), lay out (the measurement process of the native attribute+the measurement process of dynamic layout), and draw

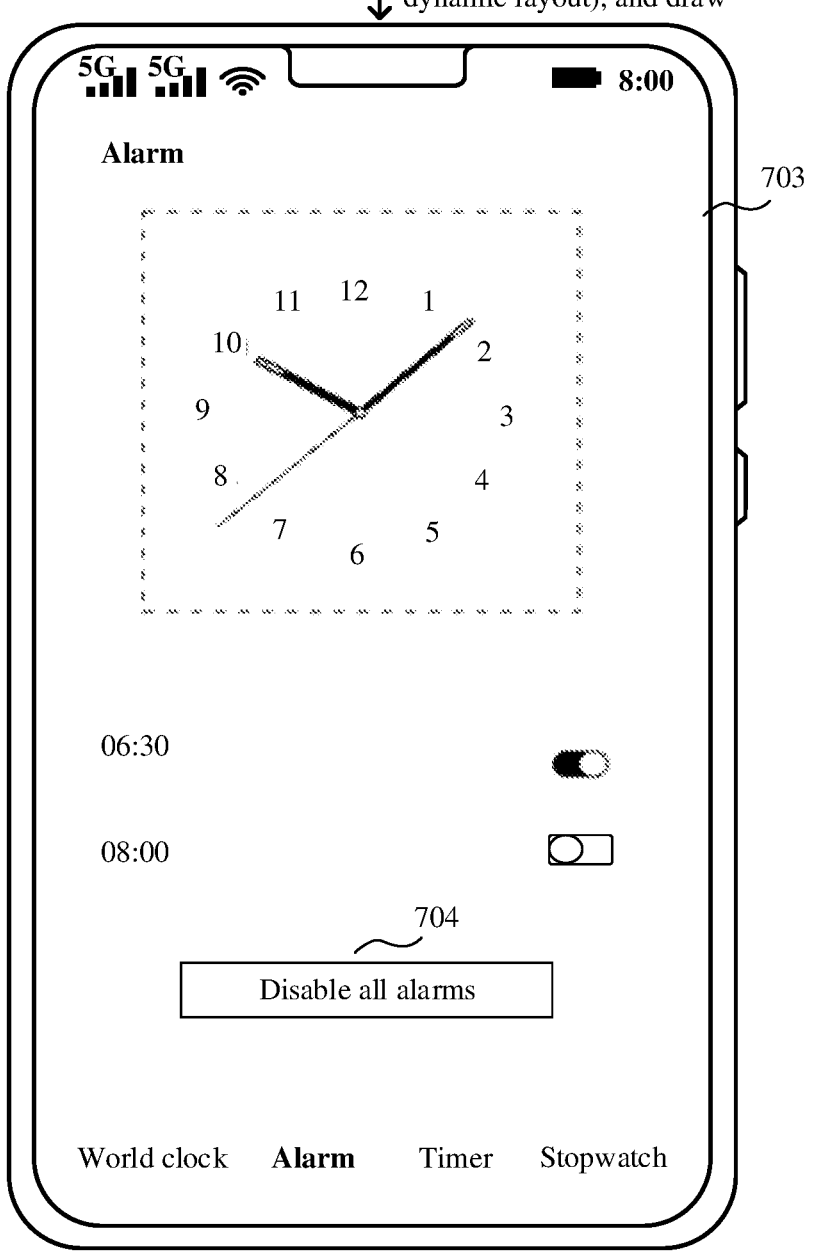

FIG. 29B

DISPLAY INTERFACE LAYOUT METHOD AND ELECTRONIC DEVICE

CROSS-REFERENCE TO RELATED APPLICATIONS

This application is a National Stage of International Application No. PCT/CN2021/111594, filed on Aug. 9, 2021, which claims priority to Chinese Patent Application No. 202010833382.1, filed on Aug. 18, 2020, and Chinese Patent Application No. 202011583597.9, filed on Dec. 28, 2020, and Chinese Patent Application No. 202010949895.9, filed on Sep. 10, 2020, and Chinese Patent Application No. 202011185677.9, filed on Oct. 30, 2020, and Chinese Patent Application No. 202011141090.8, filed on Oct. 22, 2020, and Chinese Patent Application No. 202110586643.9, filed on May 27, 2021. All of the aforementioned applications are hereby incorporated by reference in their entireties.

TECHNICAL FIELD

This application relates to the terminal field, and in particular, to a display interface layout method and an electronic device.

BACKGROUND

An electronic device, such as a mobile phone, is usually installed with one or more applications that may implement rich application functions. Currently, when developing each application, a developer needs to design a layout (layout) of each control on each display interface of the application, to obtain a layout file of each display interface, and add the layout file to an application installation package. In this way, after the installation package of the application is installed on the electronic device, when running the application, the electronic device may obtain the layout file of the related display interface, and display the corresponding display interface based on the layout file.

However, with the increasing variety of electronic devices and increasing specifications of each type of electronic device, the developer needs to spend a lot of time and energy in designing layout files of the application on different electronic devices. A head unit is used as an example. Head units produced by different manufacturers have at least 10-odd specifications of display interfaces. Therefore, for a same display interface of a same application, the developer needs to design a layout file of the display interface for a head unit of each specification. It is clear that this method for developing the layout file of the display interface is time-consuming and labor-consuming, increases difficulty of developing the application by the developer, and reduces efficiency.

SUMMARY

This application provides a display interface layout method and an electronic device, so that layout of a display interface can be automatically completed based on a device feature of an electronic device, to reduce application development difficulty, and improve application development efficiency.

To achieve the foregoing objectives, the following technical solutions are used in this application.

According to a first aspect, this application provides a display interface layout method, including: A running device installs an application installation package of a first application. The application installation package includes a first layout file, and the first layout file includes a first correspondence between a first control unit (for example, a View or a ViewGroup) and a first preset algorithm. An input parameter of the first preset algorithm is a value of a first attribute constraint condition of the running device, and the first attribute constraint condition includes at least one of a device type, a device size, a display direction, a device capability, or an interaction mode. An output parameter of the first preset algorithm is an attribute value of the first control unit, and the attribute value of the first control unit is used to indicate a size and a position of the first control unit on a first display interface. Certainly, the first attribute value may further indicate attributes such as a color, a shape, and a font of the first control unit. Subsequently, the running device may obtain a device parameter of the running device. The device parameter includes at least one of a device type value of the running device, a device size value of the running device, a display direction value of the running device, a device capability value of the running device, or an interaction mode value of the running device. Then, after inputting the obtained device parameter as the input parameter to the first preset algorithm, the running device may obtain a first attribute value of the first control unit, so that the running device may lay out the first control unit based on the first attribute value, and display the first control unit on the first display interface.

In other words, the running device of the first application may obtain a corresponding device parameter based on an attribute constraint condition that is set by a developer for each View or ViewGroup in a layout file, and then adaptively lay out each View or ViewGroup on a display interface based on the obtained device parameter, so that a presentation effect of each View or ViewGroup on the display interface matches a device feature (for example, a device type, a size, an interaction mode, or a function) of the current running device.

With reference to the display interface layout method provided in the first aspect, in a first possible implementation, the first layout file may further include a second correspondence between a second control unit and a second preset algorithm. Similarly, an input parameter of the second preset algorithm is a value of a second attribute constraint condition of the running device, and the second attribute constraint condition includes at least one of a device type, a device size, a display direction, a device capability, or an interaction mode. An output parameter of the second preset algorithm is an attribute value of the second control unit, and the attribute value of the second control unit is used to indicate attributes such as a size and a position of the second control unit on the first display interface. In this case, the method further includes: The running device calculates a second attribute value of the second control unit based on the device parameter and the second preset algorithm. Then, the running device may lay out the second control unit based on the second attribute value, and display the second control unit on the first display interface.

With reference to the first aspect and the first possible implementation of the first aspect, in a second possible implementation, the attribute value of the first control unit may be used to indicate a display style of the first control unit.

With reference to the first aspect and the first possible implementation, in a third possible implementation, the device type may include a mobile phone, a television, a head unit, or a watch.

With reference to the first aspect and the first possible implementation of the first aspect, in a fourth possible implementation, the device size may include device resolution or an aspect ratio.

With reference to the first aspect and the first possible implementation of the first aspect, in a fifth possible implementation, the display direction includes a landscape direction or a portrait direction.

With reference to the first aspect and the first possible implementation of the first aspect, in a sixth possible implementation, the device capability includes a photographing capability, a positioning capability, or a call capability, and the interaction mode includes touch interaction, remote control interaction, or voice interaction.

With reference to the first aspect and the first possible implementation of the first aspect, in a seventh possible implementation, the first layout file further includes a first function item of the first control unit, and the first function item includes one layout capability of scaling, stretch, hiding, even distribution, or wrap. The method further includes: The running device obtains a third preset algorithm corresponding to the first function item. The running device inputs the corresponding device parameter as an input parameter to the third preset algorithm, and obtains a third attribute value of the first control unit through calculation by using the third preset algorithm.

With reference to the first aspect and the first possible implementation of the first aspect, in an eighth possible implementation, the first layout file includes a third device capability corresponding to a third control unit. The method further includes: The running device queries a display output device having the third device capability. The running device may indicate the display output device to display the third control unit.

With reference to the eighth possible implementation of the first aspect, in a ninth possible implementation, that the running device indicates the display output device to display the third control unit includes: The running device may send a display resource corresponding to the third control unit to the display output device, so that the display output device displays the third control unit.

In this way, the running device can distribute, based on a device capability set for each View or ViewGroup in the layout file, different Views or ViewGroups to one or more electronic devices having a related device capability for display, so that different Views or ViewGroups on one display interface can be presented to a user on a corresponding electronic device that matches functions of the different Views or ViewGroups.

According to a second aspect, this application provides a layout file generation method, including: displaying a development interface of a first application; if a first operation input by a user (for example, a developer) is detected, displaying a preset initial layout file on the development interface; if a second operation input by the user is detected, adding a first control unit to the initial layout file, where the first control unit is used to be displayed on a first display interface of the first application, and the control unit may be a control (View) or a control group (ViewGroup); if a third operation input by the user is detected, setting a first attribute constraint condition of the first control unit in the initial layout file, where an attribute value of the first control unit (for example, an attribute, for example, a size or a position of the first control unit) is obtained by a running device of the first application through calculation based on the first attribute constraint condition, in other words, an attribute value of each View or ViewGroup in a layout file is not fixed, but is obtained by the running device through calculation based on the first attribute constraint condition, subsequently, after the developer adds all required control units on the first display interface and attribute constraint conditions of the control units to the initial layout file according to the foregoing method, a first layout file corresponding to the first display interface may be obtained, and the first layout file is used to indicate a layout manner of N control units on the first display interface; and then, generating, by an application development tool, an application installation package of the first application based on the first layout file.

In this way, an electronic device (which may be referred to as a running device) on which the application installation package of the first application is installed may dynamically calculate an attribute value of each control (or control group) based on an attribute constraint condition set for each control (or control group) in the first layout file, to automatically complete layout and display of the first display interface based on the attribute value of each control (or control group).

In other words, the developer only needs to set the attribute constraint condition of each control (or control group) in the layout file, so that different running devices can adaptively perform layout based on the attribute constraint condition, and the developer does not need to separately design a plurality of sets of layout files for the different running devices. This reduces application development difficulty, and improves application development efficiency.

With reference to the second aspect, in a first possible implementation, an attribute window may be set on the development interface, and the attribute window includes one or more attribute constraint conditions. The attribute constraint condition is used to define a device parameter that is obtained when the running device of the first application calculates an attribute value of a control unit. For example, the attribute constraint condition may include at least one of a device type, a device size, a display direction, a device capability, and an interaction mode of the running device.

In this case, before the setting a first attribute constraint condition of the first control unit in the initial layout file, the method may further include: detecting the third operation input by the user, where the third operation is an operation of selecting the first attribute constraint condition in the attribute window by the user. In this case, the setting a first attribute constraint condition of the first control unit in the initial layout file includes: establishing a first correspondence between the first attribute constraint condition and the first control unit in the first layout file based on the first attribute constraint condition selected by the user in the attribute window in the third operation. For example, the first attribute constraint condition selected by the user for the first control unit is the device size. In this case, the application development tool may establish a correspondence between the first control unit and the device size. To be specific, a specific attribute value of the first control unit is dynamically determined by the device size of the running device.

With reference to the second aspect and the first possible implementation of the second aspect, in a second possible implementation, the attribute window may further include one or more attribute options, for example, at least one of a width, a height, and a display position. When the user selects a first attribute option (for example, the width) from the one or more attribute options, the first correspondence is a correspondence between the first attribute constraint condition and the first attribute option of the first control unit. For example, the first correspondence is a correspondence between the width of the first control unit (namely, the first attribute option of the first control unit) and the device size (namely, the first attribute constraint condition). To be specific, a width attribute value of the first control unit is dynamically determined by the device size of the running device.

With reference to the second aspect and the first possible implementation of the second aspect, in a third possible implementation, the attribute window may further include one or more function items or function item groups. The function item includes at least one layout capability of scaling, stretch, hiding, even distribution, and wrap. The function item group is a layout capability formed after a plurality of function items are superimposed, for example, a layout capability that can implement immersive layout after layout capabilities such as scaling, stretch, and hiding are superimposed.

In this case, when the user selects a first function item from the one or more function items, the first correspondence is a correspondence between the first attribute constraint condition, the first function item, and the first control unit, and/or when the user selects a first function item group from the one or more function item groups, the first correspondence is a correspondence between the first attribute constraint condition, the first function item group, and the first control unit. For example, the first correspondence is a correspondence between the first control unit, scaling (namely, the first function item), and the device size (namely, the first attribute constraint condition). To be specific, when the first control unit implements the scaling layout capability, the specific attribute value of the first control unit is dynamically determined by the device size of the running device.

With reference to any one of the first to the third possible implementations of the second aspect, in a fourth possible implementation, after the setting a first attribute constraint condition of the first control unit, the method further includes: establishing a second correspondence between a first preset algorithm and the first control unit in the first layout file. An input parameter of the first preset algorithm is a device parameter (for example, a specific device size or the device type of the running device) that corresponds to the first attribute constraint condition and that is obtained by the running device of the first application. An output parameter of the first preset algorithm is the attribute value (for example, the control size or the position) of the first control unit.

With reference to any one of the second aspect and the first to the fourth possible implementations of the second aspect, in a fifth possible implementation, a control library and a view tree may be set on the development interface. The control library includes control units of different types, and the view tree is used to indicate a structural relationship between control units on the first display interface. The second operation is an operation of selecting, by the user (namely, the developer), the first control unit from the control library, and adding the first control unit to the view tree. In this case, the adding a first control unit to the initial layout file specifically includes: adding, based on the first control unit selected by the user in the second operation, the first control unit to a first position that is of the view tree and that is selected by the user in the second operation. In other words, the developer may select a to-be-added control unit on the development interface, and set a position of the control unit in the view tree.

With reference to any one of the second aspect and the first to the fifth possible implementations of the second aspect, in a sixth possible implementation, a preview window may be set on the development interface. The preview window is used to simulate the first display interface presented when the first application is run. In this case, after the adding a first control unit to the initial layout file, the method further includes: displaying the first control unit on a first display interface of the preview window, so that the developer previews a display effect of the first control unit on the running device.

With reference to any one of the second aspect and the first to the sixth possible implementations of the second aspect, in a seventh possible implementation, after the setting a first attribute constraint condition of the first control unit in the initial layout file, similar to adding the first control unit, a second control unit may be added to the initial layout file. The second control unit is also used to be displayed on the first display interface. Then, the developer may set a second attribute constraint condition of the second control unit in the initial layout file. An attribute value of the second control unit (for example, a position or a size of the second control unit on the first display interface) is obtained by the running device of the first application through calculation based on the second attribute constraint condition.

With reference to any one of the second aspect and the first to the sixth possible implementations of the second aspect, in an eighth possible implementation, after the setting a first attribute constraint condition of the first control unit in the initial layout file, the developer may further add a third control unit to the initial layout file. The third control unit is also used to be displayed on the first display interface. A difference lies in that the developer may directly set an attribute value of the third control unit in the initial layout file, instead of setting an attribute constraint condition of the third control unit in the initial layout file. In other words, in the first layout file generated in this application, some control units may be laid out in an existing development manner. This is not limited in this embodiment of this application.

According to a third aspect, this application provides an application interface layout method, including: receiving a first operation of a user; in response to receiving of the first operation, determining a first attribute value of a first control on a first interface and a second attribute value of the first control based on a first layout file corresponding to the first interface; determining a first size and a first position of the first control based on the first attribute value; determining a second size and a second position of the first control based on the first size and the first position of the first control, a screen parameter of an electronic device, and the second attribute value of the first control, where the second size is different from the first size, and/or the second position is different from the first position; and drawing the first control based on the second size and the second position, and displaying the first interface.

The first operation of the user is, for example, an operation of starting an application, or performing a specific operation on an interface of an application, and the interface needs to jump to the first interface. The first attribute value may be a native attribute value of an Android system, and the second attribute value may be an extended attribute value in this embodiment of this application. It should be noted that the extended attribute value does not uniquely determine a size and a position of the first control, but restricts a relative relationship (for example, a relative size or a relative position relationship) between the first control and another control on a display interface. In other words, when developing an application, a developer does not determine an appearance that is presented to a user and that is of each display interface. Subsequently, when drawing the display interface by using the layout file, the electronic device determines the size, the position, and the like of the first control on the display interface based on a hierarchical structure and the extended attribute value of the first control in the layout file and the screen parameter of the electronic device.

In this way, the developer only needs to design one set of layout files, to meet display requirements of electronic devices having different screen parameters. This helps reduce development costs and maintenance costs of the developer.

In addition, compared with a solution in which an application installation package needs to carry a plurality of sets of layout files, this solution in which the application installation package carries one set of layout files helps improve traffic costs and time costs of downloading the application installation package by the electronic device. In addition, after the application is installed on the electronic device, the electronic device does not need to store another redundant layout file. This improves utilization of storage space of the electronic device.

With reference to the third aspect, in a first possible implementation, the first attribute value includes one or more of the size, an outer margin value, and an inner margin value of the first control. The second attribute value includes one or more of an attribute value related to a scaling capability, an attribute value related to a stretch capability, an attribute value related to a hiding capability, an attribute value related to a wrap capability, an attribute value related to an even distribution capability, an attribute value related to a proportion capability, and an attribute value related to an extension capability of the first control.

For example, the electronic device may first read that the first control has a first attribute and a second attribute in the layout file, and then invoke a corresponding interface by using the layout file, to write the first attribute value and the second attribute value of the first control. Alternatively, the electronic device may directly invoke an interface to write the first attribute value and the second attribute value of the first control.

With reference to the first possible implementation of the third aspect, in a second possible implementation, when the second attribute value of the first control includes the attribute value related to the scaling capability of the first control, and the attribute value related to the scaling capability of the first control includes a horizontal available space proportion value and a vertical available control proportion value of the first control, the determining a second size of the first control based on the first size of the first control, a screen parameter of an electronic device, and the second attribute value of the first control includes: determining a size of a layout container of the first control based on the screen parameter of the electronic device; and scaling the first size of the first control based on the size of the layout container, the horizontal available space proportion value, and the vertical available control proportion value of the first control, to obtain the second size of the first control. An aspect ratio of the second size of the first control is the same as an aspect ratio of the first size of the first control. A ratio of a width in the second size of the first control to a width of the layout container is equal to the horizontal available space proportion value, and/or a ratio of a height in the second size to a height of the layout container is equal to the vertical available control proportion value.

The horizontal available space proportion value is a proportion of a width of the first control to the width of the layout container of the first control. The vertical available control proportion value is a proportion of a height of the first control to the height of the layout container of the first control.

For example, when drawing the first control, the electronic device scales the first control based on the size of the layout container, so that a scaled first control meets, as much as possible, available space proportions that are in a horizontal direction and a vertical direction and that are set by the developer. In some examples, the scaled first control can meet both the available space proportions in the horizontal direction and the vertical direction. In some other examples, the scaled first control cannot meet both the available space proportions in the horizontal direction and the vertical direction. In this case, in a scaling process, the first control may be stopped scaling after the first control reaches an available space proportion in a direction.

It can be learned that a scaling capability provided in this embodiment of this application can enable a control having the scaling capability to be adaptively scaled based on a change of a layout container, and ensure that an original shape of the control remains unchanged (that is, an aspect ratio remains unchanged). For example, a scaling capability may be set for a control of an image or a control that includes an image. The image may be deformed and distorted if the image is stretched in a single direction. This affects a display effect of the image. For another example, a scaling capability may be set for a button control having a rounded corner, to avoid loss of information about the rounded corner when the button control is stretched in a single direction.

In addition, different from a solution in which a width and a height of the image are simply scaled based on a same scaling ratio, to make a scaled width of the control the same as the width of the layout container, or make a scaled height of the control the same as the height of the layout container, this embodiment of this application provides a scaling capability of scaling a child control based on a horizontal available space proportion and a vertical available space proportion. In other words, when the child control is scaled, it can be ensured that a width and a height of the child control are in a specific proportion to the width and the height of the layout container. This ensures a stylish and aesthetic layout.

With reference to the second possible implementation of the third aspect, in a third possible implementation, the attribute value related to the scaling capability further includes a maximum scaling size of the first control and/or a minimum scaling size of the first control.

With reference to the first possible implementation of the third aspect, in a fourth possible implementation, when the second attribute value of the first control includes the attribute value related to the scaling capability of the first control, and the attribute value related to the scaling capability of the first control includes scaling capability enabling of a layout container of the first control, and does not include a horizontal available space proportion value and a vertical available control proportion value of the first control, the determining a second size of the first control based on the first size of the first control, a screen parameter of an electronic device, and the second attribute value of the first control includes: determining a size of the layout container of the first control based on the screen parameter of the electronic device; determining an integral scaling ratio of all controls stored in the layout container based on sizes and margins of all the controls in the layout container; and scaling the first size of the first control based on the integral scaling ratio, to obtain the second size of the first control. An aspect ratio of the second size of the first control is the same as an aspect ratio of the first size of the first control.

In some other embodiments, when an attribute of the layout container is set, an attribute value of scaling capability enabling is set to true. Alternatively, available space proportions in a horizontal direction and a vertical direction may not be set for a child control (for example, the first control) included in the layout container. In this case, both the horizontal available space proportion and the vertical available space proportion of the child control may be 100% by default. In other words, the child control in the layout container is scaled up or down equally proportionally based on a change of the layout container. In some examples, a scaled child control can satisfy that both the available space proportions in the horizontal direction and the vertical direction are 100%. In some examples, a scaled child control cannot satisfy that both the available space proportions in the horizontal direction and the vertical direction are 100%. In this case, in a scaling process, the child control may be stopped scaling after the child control reaches an available space proportion in a direction.

With reference to the fourth possible implementation of the third aspect, in a fifth possible implementation, the attribute value related to the scaling capability further includes a maximum size of the layout container of the first control and/or a minimum size of the layout container of the first control.

With reference to any one of the third aspect and the first to the fifth possible implementations of the third aspect, in a sixth possible implementation, the screen parameter includes a screen specification parameter and a screen status parameter. The screen specification parameter includes one or more of a size, resolution, and a screen type of a screen, and the screen status parameter includes one or more of a landscape/portrait state, a split-screen state, and a folded state.

According to a fourth aspect, this application provides an application interface layout system, including a first electronic device and a second electronic device. The first electronic device is configured to receive a first operation of a user. The first electronic device is further configured to determine, in response to receiving the first operation, a first attribute value of a first control on a first interface and a second attribute value of the first control based on a first layout file corresponding to the first interface. The first electronic device is further configured to: determine a first size and a first position of the first control based on the first attribute value, and determine a second size and a second position of the first control based on the first size and the first position of the first control, a screen parameter of the first electronic device, and the second attribute value of the first control. The second size is different from the first size, and/or the second position is different from the first position. The first electronic device is further configured to: draw the first control based on the second size and the second position, and display the first interface. The second electronic device is configured to receive a second operation of the user. The second electronic device is further configured to determine, in response to receiving the second operation, a third attribute value of a second control on a second interface and a fourth attribute value of the second control based on a second layout file corresponding to the second interface. The second electronic device is further configured to: determine a third size and a third position of the second control based on the third attribute value, and determine a fourth size and a fourth position of the second control based on the third size and the third position of the second control, a screen parameter of the second electronic device, and the fourth attribute value of the first control. The fourth size is different from the third size, and/or the fourth position is different from the third position. The second electronic device is further configured to: draw the second control based on the fourth size and the fourth position, and display the second interface. The second interface and the first interface are a same interface of a same application. The third attribute value and the fourth attribute value of the second control in the second layout file are respectively the same as the first attribute value and the second attribute value of the first control in the first layout file. The screen parameter of the second electronic device is different from the screen parameter of the first electronic device. A size and/or a position of the second control on the second interface displayed by the second electronic device is different from a size and/or a position of the first control on the first interface displayed by the first electronic device.

It can be learned that different display interfaces are drawn, based on a same layout file, by electronic devices having different screen parameters. In other words, the electronic devices can adaptively adjust layouts of the display interfaces based on the same layout file. This not only reduces a development workload of an application developer for the layout file, but also meets display requirements of the electronic devices having the different screen parameters.

With reference to the fourth aspect, in a first possible implementation, the first attribute value includes one or more of a size, an outer margin value, and an inner margin value of the first control. The second attribute value includes one or more of an attribute value related to a scaling capability, an attribute value related to a stretch capability, an attribute value related to a hiding capability, an attribute value related to a wrap capability, an attribute value related to an even distribution capability, an attribute value related to a proportion capability, and an attribute value related to an extension capability of the first control. The third attribute value includes one or more of a size, an outer margin value, and an inner margin value of the second control. The fourth attribute value includes one or more of an attribute value related to a scaling capability, an attribute value related to a stretch capability, an attribute value related to a hiding capability, an attribute value related to a wrap capability, an attribute value related to an even distribution capability, an attribute value related to a proportion capability, and an attribute value related to an extension capability of the second control.

With reference to the first possible implementation of the fourth aspect, in a second possible implementation, the attribute value related to the scaling capability includes one or more of a horizontal available space proportion value and a vertical available control proportion value of a control, a maximum scaling size of the control, a minimum scaling size of the control, scaling capability enabling of a layout container of the control, a maximum size of the layout container of the control, and a minimum size of the layout container of the control.

With reference to any one of the fourth aspect and the first and the second possible implementations of the fourth aspect, in a third possible implementation, a screen parameter includes a screen specification parameter and a screen status parameter. The screen specification parameter includes one or more of a size, resolution, and a screen type of a screen, and the screen status parameter includes one or more of a landscape/portrait state, a split-screen state, and a folded state.

According to a fifth aspect, this application provides an application interface layout system, including a first electronic device and a second electronic device. The first electronic device is configured to receive a first operation of a user. The first electronic device is further configured to determine, in response to receiving the first operation, a horizontal available space proportion value and a vertical available control proportion value of a first control on a first interface based on a first layout file corresponding to the first interface. The horizontal available space proportion value of the first control is a first ratio, and the vertical available control proportion value of the first control is a second ratio. The first electronic device is further configured to determine a size and a position of the first control based on a screen parameter of the first electronic device and a first attribute value. The first electronic device is further configured to display the first interface. The second electronic device is configured to receive a second operation of the user. The second electronic device is further configured to determine, in response to receiving the second operation, a horizontal available space proportion value and a vertical available control proportion value of a second control on a second interface based on a second layout file corresponding to the second interface. The horizontal available space proportion value of the second control is the first ratio, and the vertical available control proportion value of the second control is the second ratio. The second electronic device is further configured to determine a size and a position of the second control based on a screen parameter of the second electronic device and a second attribute value. The second electronic device is further configured to display the second interface. The second interface and the first interface are a same interface of a same application. The screen parameter of the second electronic device is different from the screen parameter of the first electronic device. On the first interface, a ratio of a width of the first control to a width of a layout container of the first control is the first ratio, or a ratio of a height of the first control to a height of a layout container of the first control is the second ratio. On the second interface, a ratio of a width of the second control to a width of a layout container of the second control is the first ratio, or a ratio of a height of the second control to a height of a layout container of the second control is the second ratio.

It can be learned that a scaling capability provided in this embodiment of this application can enable a control having the scaling capability to be adaptively scaled based on a change of a layout container, and ensure that an original shape of the control remains unchanged (that is, an aspect ratio remains unchanged). For example, a scaling capability may be set for a control of an image or a control that includes an image. The image may be deformed and distorted if the image is stretched in a single direction. This affects a display effect of the image. For another example, a scaling capability may be set for a button control having a rounded corner, to avoid loss of information about the rounded corner when the button control is stretched in a single direction.

In addition, different from a solution in which a width and a height of the image are simply scaled based on a same scaling ratio, to make a scaled width of the control the same as the width of the layout container, or make a scaled height of the control the same as the height of the layout container, this embodiment of this application provides a scaling capability of scaling a child control based on a horizontal available space proportion and a vertical available space proportion. In other words, when the child control is scaled, it can be ensured that a width and a height of the child control are in a specific proportion to the width and the height of the layout container. This ensures a stylish and aesthetic layout.

With reference to the fifth aspect, in a first possible implementation, when the width of the layout container of the second control is greater than the width of the layout container of the first control, and the height of the second control is equal to the height of the layout container of the first control, the size of the second control is the same as the size of the first control. When the width of the layout container of the second control is equal to the width of the layout container of the first control, and the height of the second control is greater than the height of the layout container of the first control, the size of the second control is the same as the size of the first control. When the width of the layout container of the second control is greater than the width of the layout container of the first control, and the height of the second control is greater than the height of the layout container of the first control, the size of the second control is greater than the size of the first control, and an aspect ratio of the second control is the same as an aspect ratio of the first control.

According to a sixth aspect, this application provides an application interface layout method, including: receiving a first operation of a user on a first interface; in response to receiving the first operation, determining a first layout container on a second interface, where N first controls arranged in a first direction are configured in the first layout container, and N is an integer greater than 1; determining a size of the first layout container in the first direction based on a display parameter of an electronic device; determining, based on the size of the first layout container in the first direction and a first size of the first control in the first direction, a quantity of rows or columns for displaying the first controls in the first layout container, and a quantity of first controls displayed in each row or each column; determining a second size of the first control in each row or each column in the first direction based on the size of the first layout container in the first direction and the quantity of first controls displayed in each row or each column, where the second size is the same as or different from the first size; displaying the second interface, where the second interface includes the first control, and a size of the first control in the first direction is the second size.

The first size of the first control in the first direction is a reference size of the first control in the first direction. Reference sizes of the N first controls in the first direction may be the same or different.

It can be learned that, according to the method provided in this embodiment of this application, a plurality of child controls in a layout container can be adaptively displayed in rows based on a change of the layout container. In this way, electronic devices having different screen parameters can present different display effects based on a same layout setting, so that a development and maintenance workload of a developer is reduced, and display requirements of various types of electronic devices are met.

In addition, compared with a solution in which an application installation package needs to carry a plurality of sets of layout files, this solution in which the application installation package carries one set of layout files helps improve traffic costs and time costs of downloading the application installation package by the electronic device. In addition, after an application is installed on the electronic device, the electronic device does not need to store another redundant layout file. This improves utilization of storage space of the electronic device.

With reference to the sixth aspect, in a first possible implementation, the first direction is a horizontal direction or a vertical direction.

The first direction may be a layout direction of the first layout container, or may be a direction set by the user.

With reference to the sixth aspect or the first possible implementation of the sixth aspect, in a second possible implementation, a layout parameter of the first layout container includes a wrap direction. The wrap direction includes forward wrap or reverse wrap. Forward wrap means that, when the first controls arranged in the horizontal direction in the first layout container are placed in rows, a first control that is arranged later is located in a next row of a first control that is arranged earlier, or when the first controls arranged in the vertical direction in the first layout container are placed in columns, a first control that is arranged below is located in a row on the right side of a first control that is arranged above. Reverse wrap means that, when the first controls arranged in the horizontal direction in the first layout container are placed in rows, a first control that is arranged later is located in an upper column of a first control that is arranged earlier, or when the first controls arranged in the vertical direction in the first layout container are placed in columns, a first control that is arranged below is located in a row on the left side of a first control that is arranged above. After the determining a second size of the first control in each row or each column in the first direction based on the size of the first layout container in the first direction and the quantity of first controls displayed in each row or each column, the method further includes: determining a position of the first control in each row or each column in the first layout container based on the size of the first layout container in the first direction, the second size of the first control in each row or each column in the first direction, and the wrap direction.

It should be noted that an arrangement sequence of the child controls herein may be determined based on a habit of the user to read a text. For example, the reading habit of the user may be specifically determined based on a language of a text displayed on the child controls. Generally, for languages such as Chinese and English, the user is accustomed to reading from left to right and from top to bottom. Therefore, for the plurality of child controls that are horizontally arranged, it may be considered that a left child control is arranged first, and a right child control is arranged later. For the plurality of child controls that are vertically arranged, it may be considered that an upper child control is arranged first, and a lower child control is arranged later.

Therefore, two different wrap directions are provided to meet display requirements of different languages and different reading habits.

With reference to any one of the sixth aspect and the first and the second possible implementations of the sixth aspect, in a third possible implementation, the layout parameter of the first layout container further includes a wrap alignment mode. The wrap alignment mode includes left alignment, vertical centering, right alignment, top alignment, horizontal centering, and bottom alignment. Left alignment means that the left edges of leftmost first controls in the rows in the first layout container are aligned. Vertical centering means that vertical center lines of all the first controls in each row in the first layout container are aligned. Right alignment means that the right edges of rightmost first controls in the rows in the first layout container are aligned. Top alignment means that the upper edges of uppermost first controls in the columns in the first layout container are aligned. Horizontal centering means that horizontal center lines of all the first controls in each column in the first layout container are aligned. Bottom alignment means that the lower edges of lowermost first controls in the columns in the first layout container are aligned. After the determining a second size of the first control in each row or each column in the first direction based on the size of the first layout container in the first direction and the quantity of first controls displayed in each row or each column, the method further includes: determining the position of the first control in each row or each column in the first layout container based on the size of the first layout container in the first direction, the second size of the first control in each row or each column in the first direction, and the wrap alignment mode.

With reference to any one of the sixth aspect and the first to the third possible implementations of the sixth aspect, in a fourth possible implementation, the first layout container enables a proportion capability in the first direction, and enables a scaling capability. The proportion capability in the first direction is a capability of the first control in the first layout container to maintain a preset proportion in the first direction, and the scaling capability is a capability of the first control in the first layout container to be scaled down or scaled up based on a size of the first layout container. The determining a second size of the first control in each row or each column in the first direction based on the size of the first layout container in the first direction and the quantity of first controls displayed in each row or each column includes: determining the second size of the first control in each row or each column in the first direction based on the size of the first layout container in the first direction, the quantity of first controls displayed in each row or each column, and the proportion capability in the first direction, where the second size is different from the first size; and determining a size of the first control in each row or each column in a second direction based on the second size of the first control in each row or each column in the first direction and the scaling capability, where the second direction is a direction perpendicular to the first direction.

It can be learned that the wrap capability can be further used in combination with the proportion capability and the scaling capability to implement different display requirements.

With reference to any one of the sixth aspect and the first to the third possible implementations of the sixth aspect, in a fifth possible implementation, the first layout container enables an even distribution capability in the first direction. The even distribution capability in the first direction means that spacings that are in the first direction and that are between first controls that are adjacent in the first direction in the first layout container are equal. After the determining a second size of the first control in each row or each column in the first direction based on the size of the first layout container in the first direction and the quantity of first controls displayed in each row or each column, the method further includes: determining the position of the first control in each row or each column in the first layout container based on the size of the first layout container in the first direction, the second size of the first control in each row or each column in the first direction, and the even distribution capability of the first layout container in the first direction.

It can be learned that the wrap capability can be further used in combination with the even distribution capability to implement different display requirements.

With reference to any one of the sixth aspect and the first to the third possible implementations of the sixth aspect, in a sixth possible implementation, the first layout container enables a hiding capability in a second direction. The second direction is a direction perpendicular to the first direction, and the hiding capability means that the first layout container can hide at least one first control in the second direction. The method further includes: determining a size of the first layout container on the second interface in the second direction based on a screen parameter of the electronic device; and when the quantity of rows or columns for displaying the first controls in the first layout container is determined based on the size of the first layout container in the first direction and the first size of the first control in the first direction, and it is determined that the quantity of first controls displayed in each row or each column is 1, determining, based on the size of the first layout container in the second direction, a size of the first control in the second direction, and a hiding priority of the first control, a first control displayed on the second interface.

It can be learned that the wrap capability can be further used in combination with the hiding capability to implement different display requirements.

With reference to any one of the sixth aspect and the first to the sixth possible implementations of the sixth aspect, in a seventh possible implementation, the first control is any one or more of an image control, a button control, a text control, and an icon button control.

With reference to any one of the fifth aspect and the first to the seventh possible implementations of the fifth aspect, in an eighth possible implementation, the first operation is any one of an operation of starting the application, an operation of jumping to the second interface, an operation of switching a landscape/portrait state of the electronic device, and an operation of switching a split-screen state of the electronic device.

According to a seventh aspect, this application provides a computer-readable storage medium, including computer instructions. The computer instructions are used to display a first display interface of a first application, and the first display interface includes a first control unit (the first control unit is a control or a control group). When the computer instructions are run on a first running device, the first running device may be enabled to display the first control unit on the first display interface based on a first device parameter. When the computer instructions are run on a second running device, the second running device may be enabled to display the first control unit on the first display interface based on a second device parameter. A layout manner that is presented on the first running device and that is of the first control unit is different from a layout manner that is presented on the second running device and that is of the first control unit. In other words, the developer only needs to design one set of corresponding computer instructions for each display interface of the application, to implement a layout process of each View or ViewGroup on the display interface on different running devices, and the developer does not need to separately develop corresponding computer instructions for the different running devices for a same display interface.

For example, the first device parameter or the second device parameter includes at least one of a device type, a device size, a display direction, a device capability, and an interaction mode.

According to an eighth aspect, this application provides a computer-readable storage medium, for example, an application development tool. The application development tool may specifically include computer instructions. When the computer instructions are run on the foregoing electronic device, the electronic device can be enabled to perform the method according to any one of the foregoing aspects.

According to a ninth aspect, this application provides an electronic device, including a display, an input device, one or more processors, one or more memories, and one or more computer programs. The processor is coupled to the input device, the display, and the memory. The one or more computer programs are stored in the memory. When the electronic device runs, the processor may execute the one or more computer programs stored in the memory, to enable the electronic device to perform the method according to any one of the foregoing aspects.

According to a tenth aspect, this application provides a running device, including a display, one or more processors, one or more memories, and one or more computer programs. The processor is coupled to both the display and the memory. The one or more computer programs are stored in the memory. When the running device runs the first application, the processor may execute the one or more computer programs stored in the memory, to enable the running device to perform the method according to any one of the foregoing aspects.

It may be understood that the electronic device, the running device, and the computer-readable storage medium provided in the foregoing aspects are all applied to the corresponding methods provided above. Therefore, for beneficial effects that can be achieved by the electronic device, the running device, and the computer-readable storage medium, refer to beneficial effects in the corresponding methods provided above. Details are not described herein again.

BRIEF DESCRIPTION OF THE DRAWINGS

FIG. 17A and FIG. 17B are a schematic flowchart 3 of a display interface layout method according to an embodiment of this application;

FIG. 29A and FIG. 29B are a schematic diagram 15 of application of a display interface layout method according to an embodiment of this application;

DETAILED DESCRIPTION OF ILLUSTRATIVE EMBODIMENTS

For ease of understanding the following embodiments, related technologies are described first.

Control (View): An element that is presented on a graphical user interface (graphical user interface, GUI) may be usually referred to as a control, and the control can provide a specific operation function for a user or is used to display specific content.

For example, the control may specifically include a text control, for example, a TextView control or an EditText control, may also include a button control, for example, a Button control or an ImageButton control, and may further include an image control, for example, an Image control. This is not limited in embodiments of this application.

An Android system is used as an example. Elements on all display interfaces of an application (App) each include a control (View) and a control group (ViewGroup).

Figure 1:
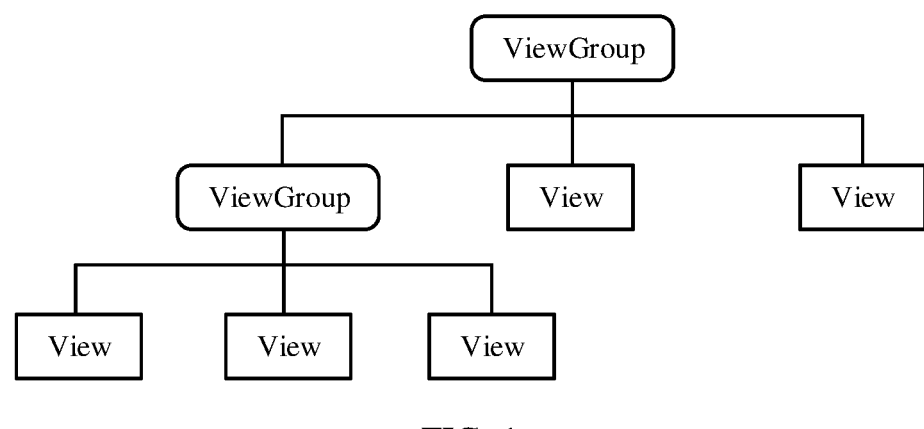
FIG. 1 is a schematic diagram of a control and a control group on a display interface in the conventional technology.

As shown in FIG. 1, one display interface may include one or more Views or ViewGroups. The View is an element displayed on the display interface, and the ViewGroup is a layout container for storing the View (or the ViewGroup). A new View or ViewGroup may be added to the ViewGroup, so that the Views are arranged based on a specific hierarchy and structural relationship.

For example, a developer may design the View or the ViewGroup on each display interface of the app in a layout manner, for example, a linear layout (LinearLayout), a table layout (TableLayout), a relative layout (RelativeLayout), a frame layout (FrameLayout), an absolute layout (AbsoluteLayout), or a grid layout (GridLayout), to generate a layout file, namely, a layout file, of each display interface.

The layout files of these display interfaces may be carried in an application installation package of the app, to be installed on an electronic device, for example, a mobile phone. In this way, when the app is run on the electronic device, the electronic device obtains a corresponding layout file, and may arrange a View or a ViewGroup on a corresponding display interface based on the layout file, to present the corresponding display interface to the user.

The following describes implementations of embodiments in detail with reference to the accompanying drawings.

A display interface layout method provided in embodiments of this application may be applied to an electronic device having a display function, for example, a mobile phone, a tablet computer, a notebook computer, an ultra-mobile personal computer (ultra-mobile personal computer, UMPC), a handheld computer, a netbook, a personal digital assistant (personal digital assistant, PDA), a wearable electronic device, a vehicle-mounted device (also referred to as a head unit), or a virtual reality device. This is not limited in embodiments of this application.

Figure 2:
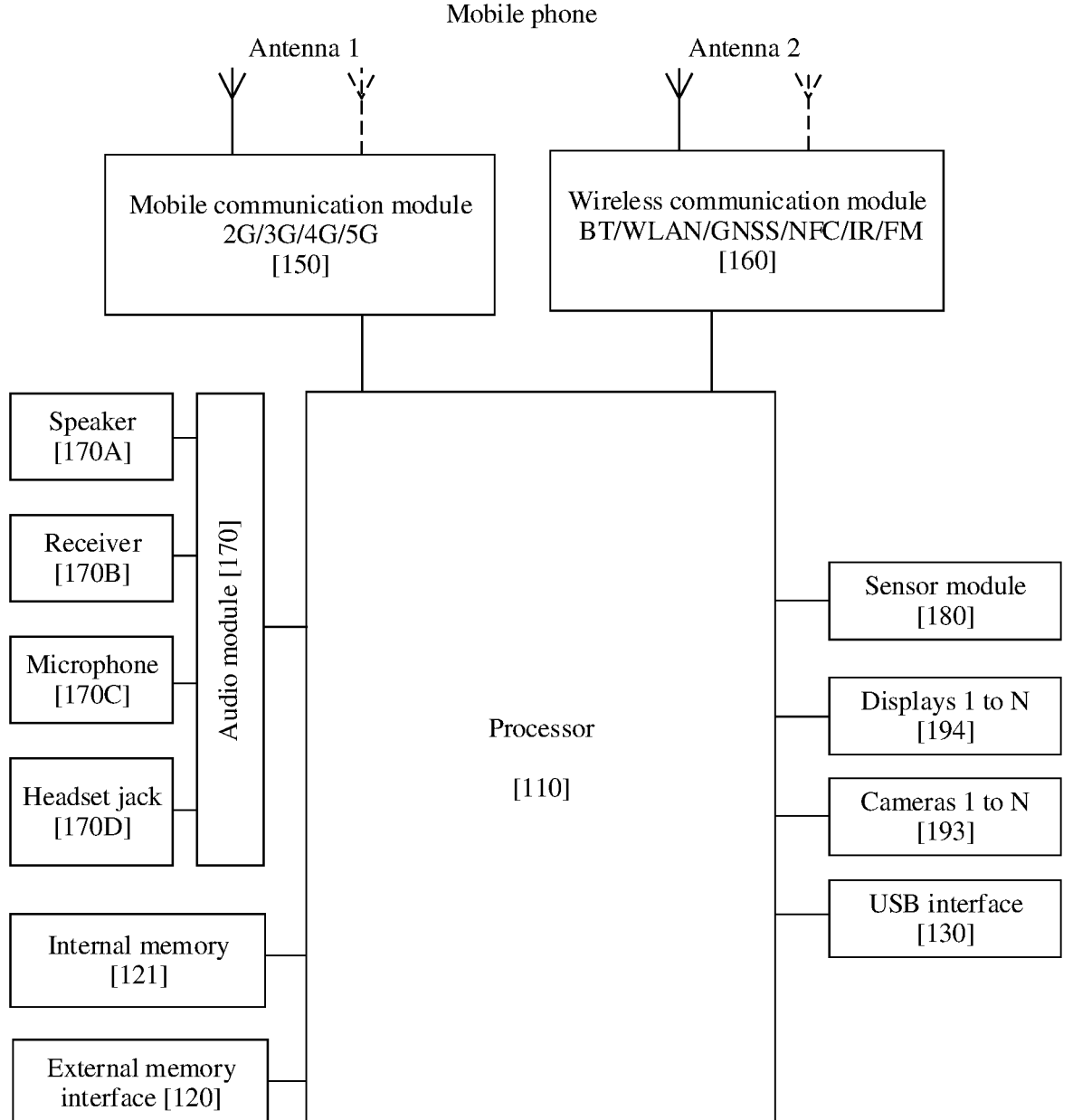
FIG. 2 is a schematic diagram 1 of a structure of an electronic device according to an embodiment of this application.

For example, the mobile phone is used as the electronic device. FIG. 2 is a schematic diagram of a structure of the mobile phone.

The mobile phone may include a processor 110, an external memory interface 120, an internal memory 121, a universal serial bus (universal serial bus, USB) interface 130, an antenna 1, an antenna 2, a mobile communication module 150, a wireless communication module 160, an audio module 170, a speaker 170A, a receiver 170B, a microphone 170C, a headset jack 170D, a sensor module 180, and the like.

It may be understood that the structure shown in this embodiment of the present invention does not constitute a specific limitation on the mobile phone. In some other embodiments of this application, the mobile phone may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

A memory may be further disposed in the processor 110, and is configured to store instructions and data. In some embodiments, the memory in the processor 110 is a cache. The memory may store an instruction or data just used or cyclically used by the processor 110. If the processor 110 needs to use the instruction or the data again, the processor 110 may directly invoke the instruction or the data from the memory. This avoids repeated access and reduces a waiting time of the processor 110, thereby improving system efficiency.

A wireless communication function of the mobile phone may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals.

The mobile communication module 150 may provide a solution that includes wireless communication such as 2G, 3G, 4G, and 5G and that is applied to the mobile phone. In some embodiments, at least some function modules of the mobile communication module 150 may be disposed in the processor 110. In some embodiments, at least some function modules of the mobile communication module 150 may be disposed in a same component as at least some modules of the processor 110.

The wireless communication module 160 may provide a solution that is applied to the mobile phone and that includes wireless communication such as a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near-field communication, NFC) technology, and an infrared (infrared, IR) technology.

In some embodiments, in the mobile phone, the antenna 1 and the mobile communication module 150 are coupled, and the antenna 2 and the wireless communication module 160 are coupled, so that the mobile phone can communicate with a network and another device by using a wireless communication technology.

The mobile phone implements a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, quantum dot light emitting diodes (quantum dot light emitting diodes, QLEDs), or the like. In some embodiments, the mobile phone may include one or N displays 194, where N is a positive integer greater than 1.

The mobile phone may implement a photographing function by using the ISP, a camera 193, the video codec, the GPU, the display 194, the application processor, and the like.

The camera 193 is configured to capture a static image or a video. An optical image of an object is generated through a lens, and is projected to a light-sensitive element. The light-sensitive element may be a charge-coupled device (charge-coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the mobile phone may include one or N cameras 193, where N is a positive integer greater than 1.

The external memory interface 120 may be configured to connect to an external storage card, for example, a micro SD card, to extend a storage capability of the mobile phone. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to perform various function applications of the mobile phone and data processing. The internal memory 121 may include a program storage area and a data storage area. The program storage area may store an operating system, an application required by at least one function (for example, a voice playing function or an image playing function), and the like. The data storage area may store data (for example, audio data or a phone book) created during use of the mobile phone, and the like. In addition, the internal memory 121 may include a high-speed random access memory, and may further include a non-volatile memory, for example, at least one magnetic disk storage component, a flash memory component, or a universal flash storage (universal flash storage, UFS).

The mobile phone may implement an audio function, for example, music playing or recording, by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "loudspeaker", is configured to convert an electrical audio signal into a sound signal. The mobile phone may be used to listen to music or answer a call in a hands-free mode over the speaker 170A.

The receiver 170B, also referred to as an "earpiece", is configured to convert an electrical audio signal into a sound signal. When a call is answered or a voice message is received by using the mobile phone, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through the mouth of the user, to input a sound signal to the microphone 170C. At least one microphone 170C may be disposed in the mobile phone. In some other embodiments, two microphones 170C may be disposed in the mobile phone, to collect a sound signal and further implement a noise reduction function. In some other embodiments, three, four, or more microphones 170C may be alternatively disposed in the mobile phone, to collect a sound signal, implement noise reduction, and identify a sound source, so as to implement a directional recording function and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The sensor module 180 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

Certainly, the mobile phone may further include a charging management module, a power management module, a battery, a button, an indicator, one or more SIM card interfaces, and the like. This is not limited in this embodiment of this application.

Generally, an application developed by a developer may be released in AppGallery in a form of an application installation package, and an application installation package of each application may be provided in AppGallery for a user to download. For example, the application installation package may be an APK file.

For example, the mobile phone is still the foregoing electronic device. The user may download an application installation package of an application in the AppGallery by using the mobile phone. A music app is used as an example. After downloading an application installation package of the music app, the mobile phone may install the music app on the mobile phone by running the application installation package.

For example, the application installation package of the music app may include a layout file that is of each display interface and that is designed by a developer. Content in the layout file determines an appearance that is presented to the user and that is of the display interface. For example, controls (Views) or control groups (ViewGroups) included in a display interface 1 and a structural relationship between these controls (Views) or control groups (ViewGroups) may be defined in a layout file 1. In addition, a display resource, for example, an icon of a button, text content, an avatar, or an image, of each control (View) or control group (ViewGroup) may also be carried in the application installation package of the music app and installed on the mobile phone of the user. In this way, when the music app is run, the mobile phone may obtain a layout file of a related display interface, and obtain a display resource of a corresponding control or control group based on a control or a control group defined in the layout file. Then, the mobile phone may load the display resource of the corresponding control or control group to a corresponding position on the display interface based on the layout file, that is, complete layout of each control or control group in the layout file. Finally, the mobile phone may display each loaded control or control group on the display, and present the corresponding display interface.

In the conventional technology, the developer may define an attribute value of each control (View) or control group (ViewGroup) in a layout file. An attribute value of a control or a control group may be used to indicate a position and a size of the control or the control group when the control or the control group is displayed on a display interface. Certainly, the attribute value may be used to indicate a specific display manner and a display effect of the control or the control group when the control or the control group is displayed on the display interface, such as a color, a font, and resolution. This is not limited in embodiments of this application.

For example, a control 1 is an image 1 whose name is "123", resolution of the control 1 is 1080p, a shape of the control 1 when the control 1 is displayed is a rounded rectangle, and a display position of the control 1 is a centered position at an upper layer of a control 2. In other words, the attribute value of each View or ViewGroup in the layout file is specific. In this way, after reading an attribute value of the control 1 in the layout file, the mobile phone may lay out the control 1 based on the attribute value of the control 1. For example, the corresponding image 1 (namely, a display resource) is obtained based on the name of the control 1, and the image 1 is loaded to the display interface based on attribute values such as the resolution, the shape, and the display position that are defined for the control 1 in the layout file, to display the corresponding display interface.

Because display specifications (for example, sizes and resolution of displays) of different electronic devices are usually different, requirements of the user on a display interface of the application on the different electronic devices are also different. If a same layout file is used on all the electronic devices to lay out the display interface of the application, a problem of a poor display effect occurs. To achieve a better display effect when the different electronic devices display the display interface of the application, the developer needs to design a layout file of the corresponding display interface for each electronic device when developing the display interface of the app. As a result, a process of developing and maintaining the app by the developer is complex, and development and maintenance efficiency is reduced.

In this embodiment of this application, the developer does not need to set a specific attribute value for each View or ViewGroup in the layout file of the application. Correspondingly, the developer may set a constraint condition (which may be referred to as an attribute constraint condition subsequently) of the attribute value of each View or View-Group in the layout file. The specific attribute value of each View (or ViewGroup) depends on specific values of these attribute constraint conditions.

For example, an attribute constraint condition of a View 1 may include a device type. For example, when the device type is a mobile phone, an attribute value of the View 1 specifically includes that resolution is 1080p, and a display direction is a portrait display direction, or when the device type is a television, an attribute value of the View 1 specifically includes that resolution is 2048p and a display direction is a landscape display direction. It should be noted that the attribute value of the View 1 may further include a size, a shape, a color, and the like. All these attribute values may be affected by the attribute constraint condition, namely, the device type. This is not limited in this embodiment of this application.

Certainly, there may be alternatively a plurality of attribute constraint conditions of the View 1. For example, the attribute constraint condition of the View 1 may include a device type, a display size, a mode of interaction with the user, and the like. When device types, display sizes, or manners of interaction with the user of the electronic devices are different, the View 1 may correspond to different attribute values, to present different display effects of the View 1 to the user. A specific method for laying out the View or the ViewGroup by the electronic device based on the attribute constraint condition in the layout file is described in detail in a subsequent embodiment. Therefore, details are not described herein again.

In other words, when laying out the display interface of the application, the different electronic devices may obtain, based on an attribute constraint condition set by the developer for each control (or control group) in the layout file, a device type, a display size, a mode of interaction with the user, or the like of an electronic device (namely, a running device) that runs the application, and automatically determine an attribute value that is of each control (or control group) and that matches the attribute constraint condition, to automatically complete layout of the display interface based on the attribute value of each control (or control group).

In this way, the different electronic devices can adaptively lay out the control (or the control group) on the display interface based on the attribute constraint condition in the layout file. In addition, the developer only needs to set the attribute constraint condition of each control (or control group) in a layout file of the display interface, so that the different electronic devices can adaptively perform layout based on the attribute constraint condition, and the developer does not need to separately design a plurality of sets of layout files for the different electronic devices. This reduces application development difficulty, and improves application development efficiency.

For example, the developer may use a corresponding application development tool (for example, Android Studio) to design a layout of each control (or control group) on a display interface of an application, to obtain a layout file of the display interface.

Figure 3A:
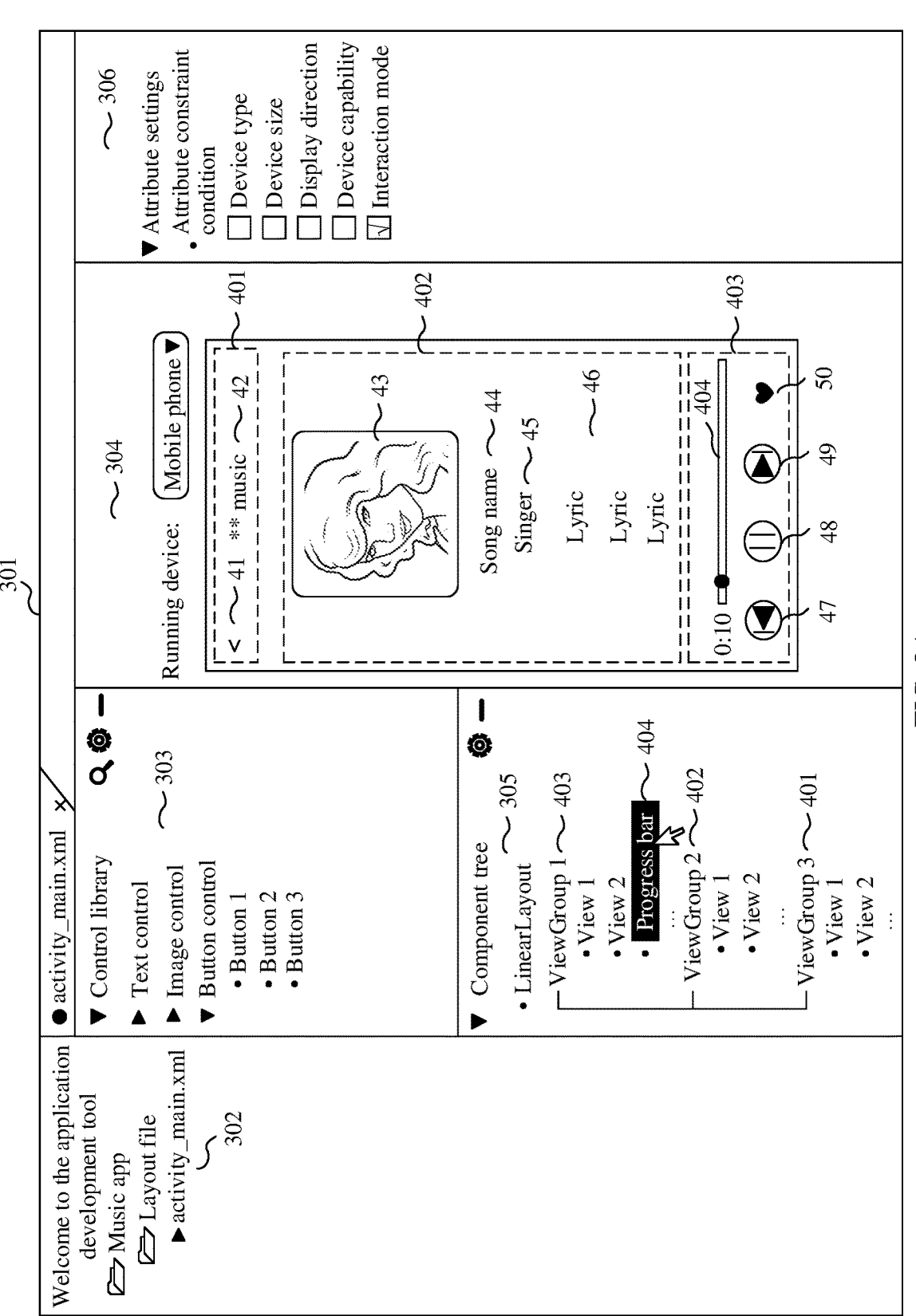
FIG. 3A is a schematic diagram 1 of a development interface according to an embodiment of this application.

The music app is still used as an example. As shown in FIG. 3A, the developer may design each display interface of the music app on a development interface 301 of the application development tool. For example, when designing a display interface (which may also be referred to as a playing interface) that is used to play a song and that is of the music app, the developer may create a layout file 302 for the playing interface on the development interface 301. For example, the layout file 302 may be a file whose name is "activity_main" and format is an extensible markup language (Extensible Markup Language, XML). In this case, the layout file 302 created by the application development tool is a default initial layout file. Subsequently, the developer may add a View or a ViewGroup required on the playing interface to the initial layout file.

Still as shown in FIG. 3A, a control library 303 is set on the development interface 301, and the control library 303 includes various types of Views and ViewGroups, for example, a text control and an image control. The developer may add a corresponding View or ViewGroup to the layout file 302 in the control library 303. These Views or View-Groups constitute the playing interface of the music app.

Still as shown in FIG. 3A, a preview window 304 may be set on the development interface 301, and the developer may view, in real time in the preview window 304, a display effect of the display interface including the added View or ViewGroup. For example, in the preview window 304, a current playing interface of the music app includes three ViewGroups, namely, a title bar 401, a playing status bar 402, and an operation bar 403. The title bar 401 includes two Views: a back button 41 and a title 42. The playing status bar 402 includes four Views: a cover 43, a song name 44, a singer 45, and a lyric 46. The operation bar 403 includes five Views: a progress bar 404, a pause button 48, a previous button 47, a next button 49, and a favorites button 50.

For example, the developer adds the View, namely, the progress bar (ProgressBar) 404 in the operation bar 403. After selecting the View, namely, the progress bar 404 in the control library 303, the developer may add the progress bar 404 as a node to a corresponding ViewGroup of a view tree 305 (for example, a component tree). For example, the progress bar 404 is a child node in a ViewGroup 1. In this case, the application development tool may display the progress bar 404 in the preview window 304 based on a structural relationship between the progress bar 404 and another View in the ViewGroup 1 in the view tree 305.

For example, when the developer adds the progress bar 404 to the view tree 305, the application development tool may set a group of default attribute values for the progress bar 404 based on a specific position of the progress bar 404 in the view tree 305. For example, the progress bar 404 has a width being a width 1, a height being a height 1, and a display position being a position 1. Then, the application development tool may display the progress bar 404 in a corresponding position of the preview window 304 based on the default attribute value. In addition to a width, a height, and a display position, an attribute value of a View or a ViewGroup may further include a color, a shape, a font, and the like. These attribute values determine a display manner and a display effect of the View or the ViewGroup on the display interface.

In this embodiment of this application, the developer may set, in the layout file 302, an attribute value of one or more Views or ViewGroups to be dynamically variable. The progress bar 404 is still used as an example. If the developer does not expect that a specific attribute value of the progress bar 404 when progress bar 404 is displayed on the playing interface is fixed, as shown in FIG. 3A, the developer may set a constraint condition, namely, an attribute constraint condition, of the attribute value of the View for the progress bar 404 in an attribute window 306 on the development interface 301. The specific attribute value of the View depends on a specific value of a corresponding attribute constraint condition.

For example, the attribute constraint condition of the View or the ViewGroup may include one or more of a device type, a device size, a display direction, a device capability, and an interaction mode. A specific value of the device type may be a mobile phone, a television, a heat unit, a watch, or the like, or may be a device of a specific model or specification. A specific value of the device size may be resolution, an aspect ratio, or the like of a device. A specific value of the display direction may be a landscape direction, a portrait direction, or the like. A specific value of the device capability may be a function provided by the device, for example, a photographing capability, a positioning capability, or a call capability. A specific value of the interaction mode may be a specific mode of interaction with the user, for example, touch interaction, remote control interaction, or voice interaction.

The View, namely, the progress bar 404, is still used as an example. The developer may set the attribute constraint condition of the progress bar 404 in the attribute window 306. For example, if the developer selects the attribute constraint condition "interaction mode", it indicates that the developer sets the specific attribute value of the View, namely, the progress bar 404, to depend on a mode of interaction between a device that runs the music app and the user. In this case, the application development tool may add a preset algorithm (for example, a first preset algorithm F) of a control attribute corresponding to the "interaction mode", to the layout file 302, or add the first preset algorithm F to the application installation package of the music app. In addition, the application development tool may establish a correspondence between the first preset algorithm F and the View, namely, the progress bar 404, in the layout file 302. The first preset algorithm F may include one or more algorithms preset by the developer. An input parameter of the first preset algorithm F1 is the specific value of the attribute constraint condition "interaction mode", and an output parameter of the first preset algorithm F1 is the specific attribute value (for example, the height, the width, or the display position) of the View, namely, the progress bar 404.

For example, the first preset algorithm F1 may include a height algorithm F11, a width algorithm F12, and a position algorithm F13. Subsequently, when displaying the progress bar 404 on the playing interface, the device (for example, the mobile phone) that runs the music app may obtain, based on the attribute constraint condition "interaction mode" set by the developer in the layout file 302, that a current interaction mode is "touch interaction". In other words, the specific value of the interaction mode is "touch interaction". Then, the mobile phone may input the parameter "touch interaction" to the height algorithm F11, and calculate the height of the progress bar 404 by using the height algorithm F11. Similarly, the mobile phone may input the parameter "touch interaction" to the width algorithm F12, and calculate the width of the progress bar 404 by using the width algorithm F12. Likewise, the mobile phone may input the parameter "touch interaction" to the position algorithm F13, and calculate the display position of the progress bar 404 by using the position algorithm F13. In this way, the mobile phone may display the progress bar 404 on the playing interface based on the calculated height, width, and display position. In other words, the device that runs the music app can dynamically determine an attribute value of a related View or ViewGroup based on an attribute constraint condition set by the developer in the layout file 302, to dynamically lay out the View or the ViewGroup on the display interface.

Figure 3B:
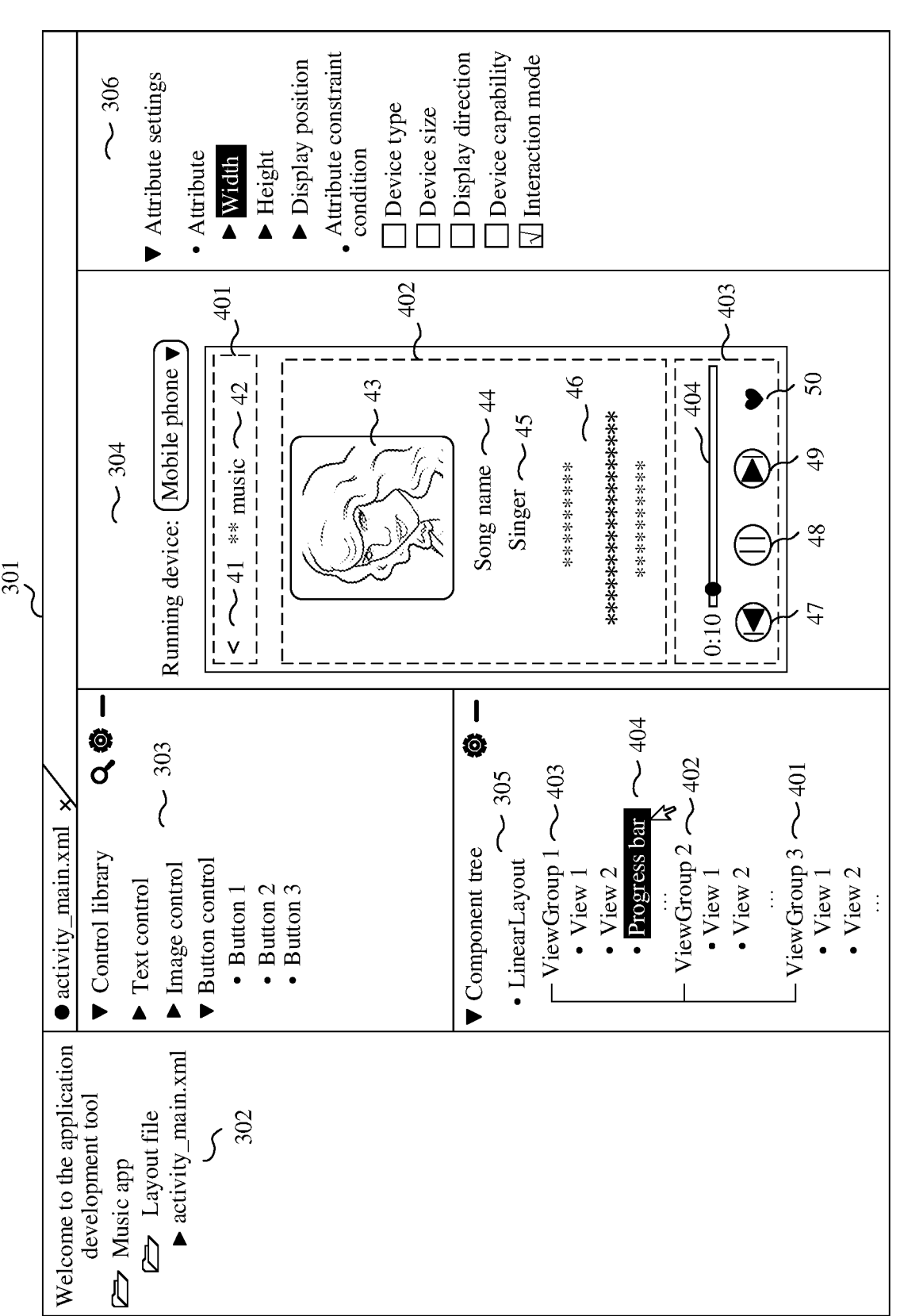
FIG. 3B is a schematic diagram 2 of a development interface according to an embodiment of this application.

In some other embodiments, as shown in FIG. 3B, the attribute window 306 may further include attribute options such as a "width", a "height", and a "display position". The View, namely, the progress bar 404 is still used as an example. After the developer adds the progress bar 404 to the view tree 305, if the developer considers that the two attribute values, namely, the height 1 and the position 1 that are set by the application development tool by default for the progress bar 404, do not need to be modified, but the parameter, namely, the width 1 that is set by the application development tool by default for the progress bar 404, needs to be modified, the developer may select the attribute option "width". Then, for the attribute value "width", the developer may continue to set an attribute constraint condition of the attribute value in the attribute window 306. For example, if the developer selects the attribute constraint condition "device size", it indicates that the developer sets a specific attribute value of the width of the progress bar 404 to depend on a device size of the device that runs the music app. In this case, the application development tool may add, to the layout file 302 (or the application installation package of the music app), the second preset algorithm F2 that uses the "device size" as an independent variable and uses the control attribute value "width" as a dependent variable. In addition, the layout file 302 records a correspondence between second preset algorithm F2 and the attribute value, namely, the width of the progress bar 404.

Subsequently, when displaying the progress bar 404 on the playing interface, the device (for example, the mobile phone) that runs the music app needs to determine attribute values such as the width, the height, and the display position of the progress bar 404. The mobile phone may determine, by reading the layout file, that the height of the progress bar 404 is the default height 1, the display position of the progress bar 404 is the default position 1, and the width of the progress bar 404 depends on the attribute constraint condition "device size". Then, the mobile phone may obtain a specific value of a current "device size". For example, the "device size" is 2400×1080. In this case, the mobile phone may input the parameter 2400×1080 to the second preset algorithm F2, and calculate the width of the progress bar 404 by using the second preset algorithm F2. In this way, the mobile phone can display the progress bar 404 on the playing interface based on the default height 1 and the default position 1 in the layout file 302 and the calculated height. In other words, one or more attribute values of the View or the ViewGroup can be dynamically determined based on the attribute constraint condition set by the developer in the layout file 302, to implement dynamic layout of the View or the ViewGroup on the display interface.

It should be noted that the preview window 304 may consider by default that the mobile phone is the device (that is, a running device) that runs the music app, to display a layout status of each View or ViewGroup on a screen of the mobile phone in the preview window 304. The developer may alternatively switch the preview window 304 to a preview mode of another running device (for example, a television or a head unit), and display a layout status of each View or ViewGroup on a screen of the another device in the preview window 304. This is not limited in this embodiment of this application.

In addition, in the layout file 302, the developer may set a corresponding attribute constraint condition for all the Views or ViewGroups on the playing interface, or may set a corresponding attribute constraint condition for one or some Views or ViewGroups on the playing interface. After the developer adds all the Views or ViewGroups to the layout file 302, the application development tool may generate a layout file 302 corresponding to the playing interface. Subsequently, the application development tool may add the layout file 302 to the application installation package of the music app by compiling the layout file 302.

In other words, when laying out the display interface of the application by using the foregoing method, the developer may set a corresponding attribute constraint condition for one or more Views or ViewGroups on the display interface, so that the View or the ViewGroup on the display interface may be adaptively laid out, based on a specific value of the attribute constraint condition, when being run on the different electronic devices. In this way, the developer does not need to separately create corresponding layout files for the different electronic devices, and separately set the attribute value of each View or ViewGroup in different layout files. This reduces application development difficulty, and improves application development efficiency.

In some other embodiments, the layout file 302 of the playing interface is still used as an example. The developer may further set, on the development interface 301, a function item supported by the View or the ViewGroup. For example, the function item supported by the View or the ViewGroup may include a function item of a basic layout capability, for example, scaling, stretch, hiding, even distribution, or wrap. Scaling refers to a display capability of scaling up or scaling down the width and the height of the View or the ViewGroup in a specific proportion. Stretch refers to a display capability of scaling up or scaling down the width and the height of the View or the ViewGroup in different proportions. Hiding refers to a display capability of making the View or the ViewGroup visible or invisible on the display interface. Even distribution refers to a display capability of evenly distributing content in the View or the ViewGroup on the display interface. Wrap refers to a display capability of displaying the content in the View or the ViewGroup in one or more rows on the display interface.

For a specific method for implementing adaptive layout when the electronic device displays a corresponding interface by setting a capability, for example, scaling or wrap, for the View or the ViewGroup in the layout file 302, refer to detailed descriptions in a subsequent embodiment.

Figure 4A:
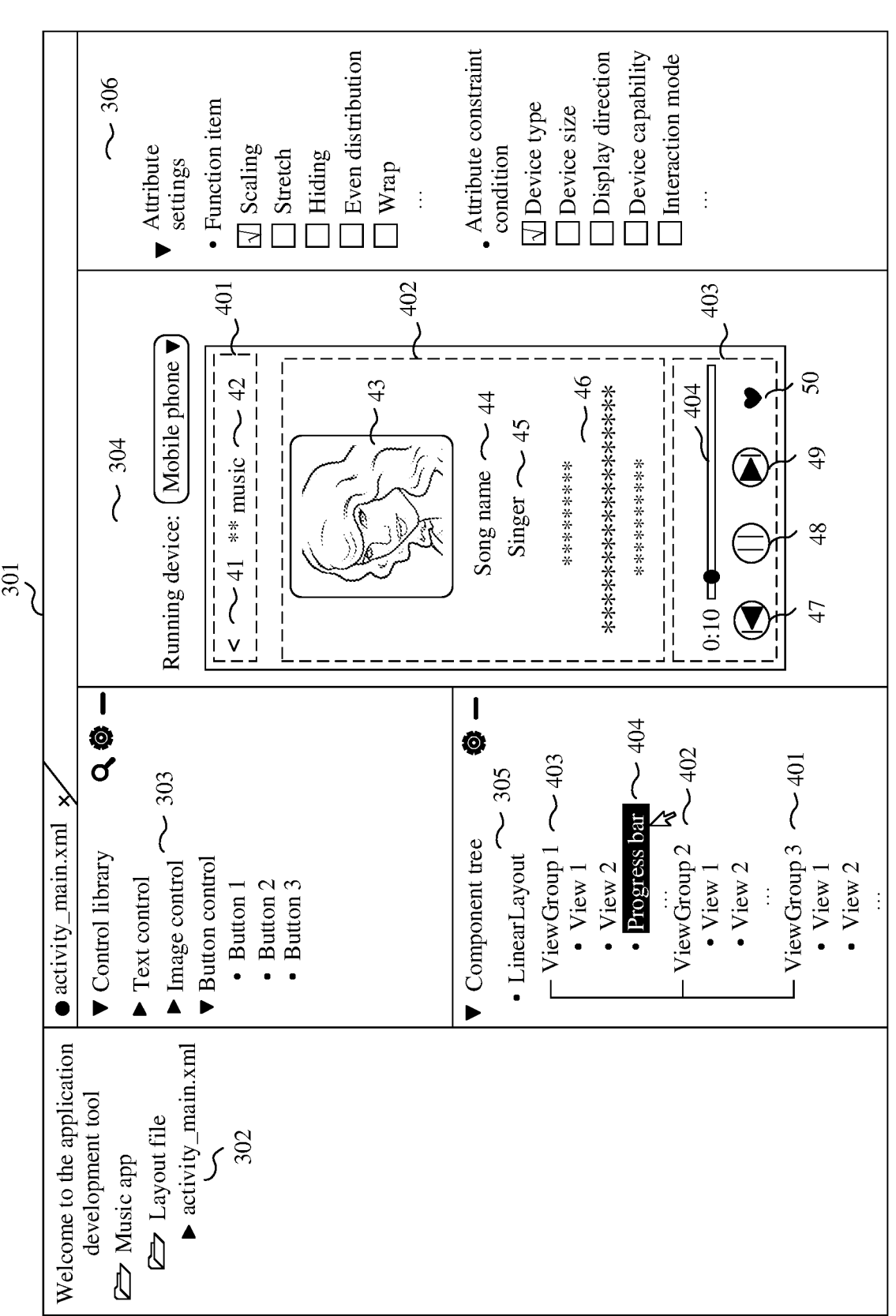
FIG. 4A is a schematic diagram 3 of a development interface according to an embodiment of this application.

As shown in FIG. 4A, the View, namely, the progress bar 404 in the operation bar 403, is still used as an example. After the developer adds the progress bar 404 to the View-Group 1 of the view tree 305, the developer may further set, in the attribute window 306, a function item supported by the progress bar 404 and an attribute constraint condition of the progress bar 404 when the function item is implemented. For example, if the developer selects the function item "scaling", it indicates that the developer sets the progress bar 404 to a View having the display capability "scaling". If the developer selects the attribute constraint condition "device type", it indicates that, when the progress bar 404 implements a "scaling" function, an attribute value of the progress bar 404 depends on a device type of the running device of the music app.

For example, the developer may preset a preset algorithm Y1 of a control attribute value corresponding to the function item "scaling". When specific values of different attribute constraint conditions are input to the preset algorithm Y1, different attribute values of a corresponding control may be calculated by using the preset algorithm Y1. For example, a specific value of the "device type" may be input as an input parameter to the preset algorithm Y1, and the attribute values such as the width, the height, and the display position of the progress bar 404 are obtained through calculation by using the preset algorithm Y1. For another example, the preset algorithm Y1 further includes a preset algorithm Y11 used to calculate a width of a control, a preset algorithm Y12 used to calculate a height of the control, and a preset algorithm Y13 used to calculate a display position of the control. In this case, if the specific value of the "device type" is input as an input parameter to the preset algorithm Y11, the width of the progress bar 404 may be obtained through calculation by using the preset algorithm Y11. If the specific value of the "device type" is input as an input parameter to the preset algorithm Y12, the height of the progress bar 404 may be obtained through calculation by using the preset algorithm Y12. If the specific value of the "device type" is input as an input parameter to the preset algorithm Y13, the display position of the progress bar 404 may be obtained through calculation by using the preset algorithm Y13.

Similarly, the developer may further preset a preset algorithm for control attribute values respectively corresponding to function items such as "stretch", "hiding", "even distribution", and "wrap". In this way, after the developer sets a corresponding function item for a View or ViewGroup in the layout file 302, the application development tool may add a corresponding preset algorithm to the layout file or the application installation package and deliver the layout file or the application installation package to a device on which the music app is installed. Subsequently, when displaying the related View or ViewGroup, the device on which the music app is installed may obtain the corresponding preset algorithm based on the function item set in the layout file 302, and input, to the preset algorithm, a specific value of an attribute constraint condition set by the developer, to dynamically calculate a specific attribute value of the View or ViewGroup, so as to dynamically lay out the View or the ViewGroup on the display interface based on the specific attribute value of the View or the ViewGroup.

In some embodiments, the View or the ViewGroup may be further designed as a function item group, that includes a plurality of basic layout capabilities, by combining and superimposing the foregoing basic local capabilities such as scaling, extension, hiding, even distribution, and wrap. For example, the View 1 may implement an immersive layout function item group through scaling, extension, and hiding. For another example, Views in the ViewGroup 1 may implement a dynamical combination/expansion function item group through scaling and wrap. The developer may design a corresponding function item group after arranging and combining the foregoing basic layout capabilities based on an actual application scenario or a user requirement. This is not limited in this embodiment of this application.

Similarly, the developer may preset a preset algorithm for corresponding control attribute values for different function item groups. For example, a preset algorithm for a control attribute value corresponding to the function item group "immersive layout" is the preset algorithm Y2. When specific values of different attribute constraint conditions are input to the preset algorithm Y2, different attribute values of a corresponding control may be calculated by using the preset algorithm Y2. For example, because the function item group "immersive layout" integrates a plurality of basic layout capabilities such as scaling, extension, and hiding, the preset algorithm Y2 may include preset algorithms for control attribute values corresponding to a plurality of function items such as scaling, extension, and hiding. This is not limited in this embodiment of this application.

Figure 4B:
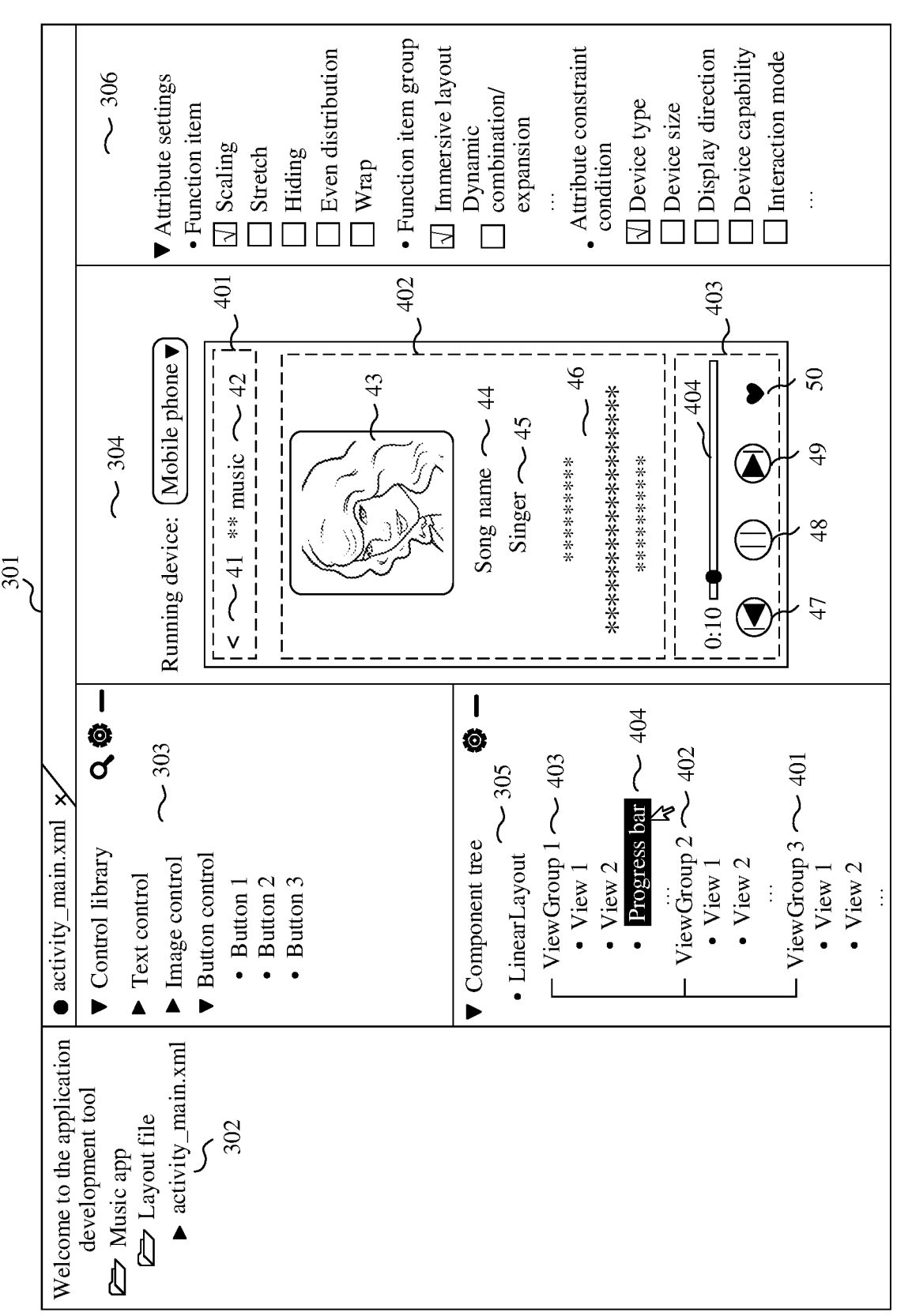
FIG. 4B is a schematic diagram 4 of a development interface according to an embodiment of this application.

For example, as shown in FIG. 4B, the ViewGroup, namely, the operation bar 403, is used as an example. After the developer adds the ViewGroup 1 corresponding to the operation bar 403 to the view tree 305, the developer may further set, in the attribute window 306, a function item group supported by the operation bar 403. For example, by selecting the function item group "immersive layout", the developer may set the operation bar 403 to have a layout capability for the immersive layout. Then, the developer may continue to set, in the attribute window 306, an attribute constraint condition corresponding to the function item "immersive layout", namely, a constraint condition of an attribute value of the operation bar 403 when the operation bar 403 implements the layout capability for "immersive layout". For example, the attribute constraint condition set by the developer is an interaction mode.

In this case, when displaying the operation bar 403, the device (for example, the mobile phone) that runs the music app may obtain the corresponding preset algorithm Y2 based on the function item group "immersive layout" set in the layout file 302. In addition, the mobile phone may obtain, based on the attribute constraint condition "interaction mode" set in the layout file 302, that a mode of interaction between the device and the user is touch interaction. In other words, a specific value of the "interaction mode" is touch interaction. Then, the mobile phone may input touch interaction as an input parameter to the preset algorithm Y2, and calculate specific attribute values (for example, a display position, a height, and a width) of the operation bar 403 by using the preset algorithm Y2. In this way, the mobile phone can dynamically lay out the operation bar 403 on the display interface based on the calculated specific attribute values, so that the operation bar 403 can implement an immersive layout function based on the mode of interaction between the mobile phone and the user.

In other words, the developer may further set, in the layout file based on the View or the ViewGroup, the function item (or a function item group) supported by the View or ViewGroup, and an attribute constraint condition corresponding to the function item (or the function item group). Subsequently, the electronic device that runs the music app may obtain a specific value of the foregoing attribute constraint condition, to adaptively lay out the corresponding View or ViewGroup based on the specific value of the attribute constraint condition, so that the View or ViewGroup can implement the function item set by the developer.

Similarly, when this development method for the layout file is used to develop a display interface, the developer only needs to design a set of layout files for each display interface of the application, so that the set of layout files are applicable to the different electronic devices. The developer does not need to separately create a plurality of sets of corresponding layout files for the different electronic devices, and separately set an attribute value of each View or ViewGroup in each layout file. This reduces application development difficulty, and improves application development efficiency.

In addition, when the developer subsequently maintains the music app, if the developer needs to modify a layout of a display interface, the developer may modify a function item, a function item group, or an attribute constraint condition of each View or ViewGroup in a corresponding layout file, generate a new layout file, and update the new layout file to the electronic device used by the user. The developer does not need to separately modify each View or ViewGroup in the layout file for the different electronic devices. This simplifies an application maintenance process after application development is completed.

In the foregoing embodiment, an example in which the developer designs a layout file of one display interface (namely, the playing interface) of the music app is used for description. It may be understood that the developer may generate a layout file of each display interface of the music app according to the foregoing method, and each View or ViewGroup included in a corresponding display interface, a function item (or a function item group) supported by one or more Views or ViewGroups on the display interface, and an attribute constraint condition corresponding to the function item (or the function item group) are all declared in each layout file. Then, the developer may add these layout files to the application installation package of the music app, so that the different electronic devices can obtain layout files of different display interfaces by downloading and installing the application installation package of the music app. In this way, when running the music app, the different electronic devices can lay out the View or the ViewGroup on the display interface based on a corresponding layout file, to present a complete display interface to the user.

The music app is still used as an example. After downloading the application installation package of the music app on the mobile phone, the user may install the application installation package on the mobile phone. In this case, the layout file that is of each display interface, that is designed by the developer, and that is carried in the application installation package are also stored on the mobile phone. For example, when the application installation package of the music app is installed, the mobile phone may create, in a specified path, a folder 1 whose name is "music", and store, in the folder 1, the layout file that is of each display interface and that is carried in the application installation package.

Certainly, the application installation package of the music app may further carry other information set by the developer. For example, the application installation package of the music app may further carry a display resource of a related View or ViewGroup, for example, an icon of a button, an avatar of a contact, an image, a text, or a web page link. These display resources may also be stored in a folder created by the mobile phone for the music app, for example, stored in the folder 1 whose name is "music". When being run, the music app may obtain a display resource of a corresponding View or ViewGroup based on a layout file, and then load the corresponding View or ViewGroup by using the display resource of the View or the ViewGroup, to display a corresponding display page.

In this embodiment of this application, when running the music app, the mobile phone may display different display interfaces of the music app. For example, when the music app needs to display the playing interface, the music app may trigger, by invoking a corresponding interface, the mobile phone to obtain, from the folder 1 whose name is "music", a layout file corresponding to the playing interface, namely, the layout file 302 created by the developer in FIG. 3A, FIG. 3B, FIG. 4A, or FIG. 4B.

Figure 5:
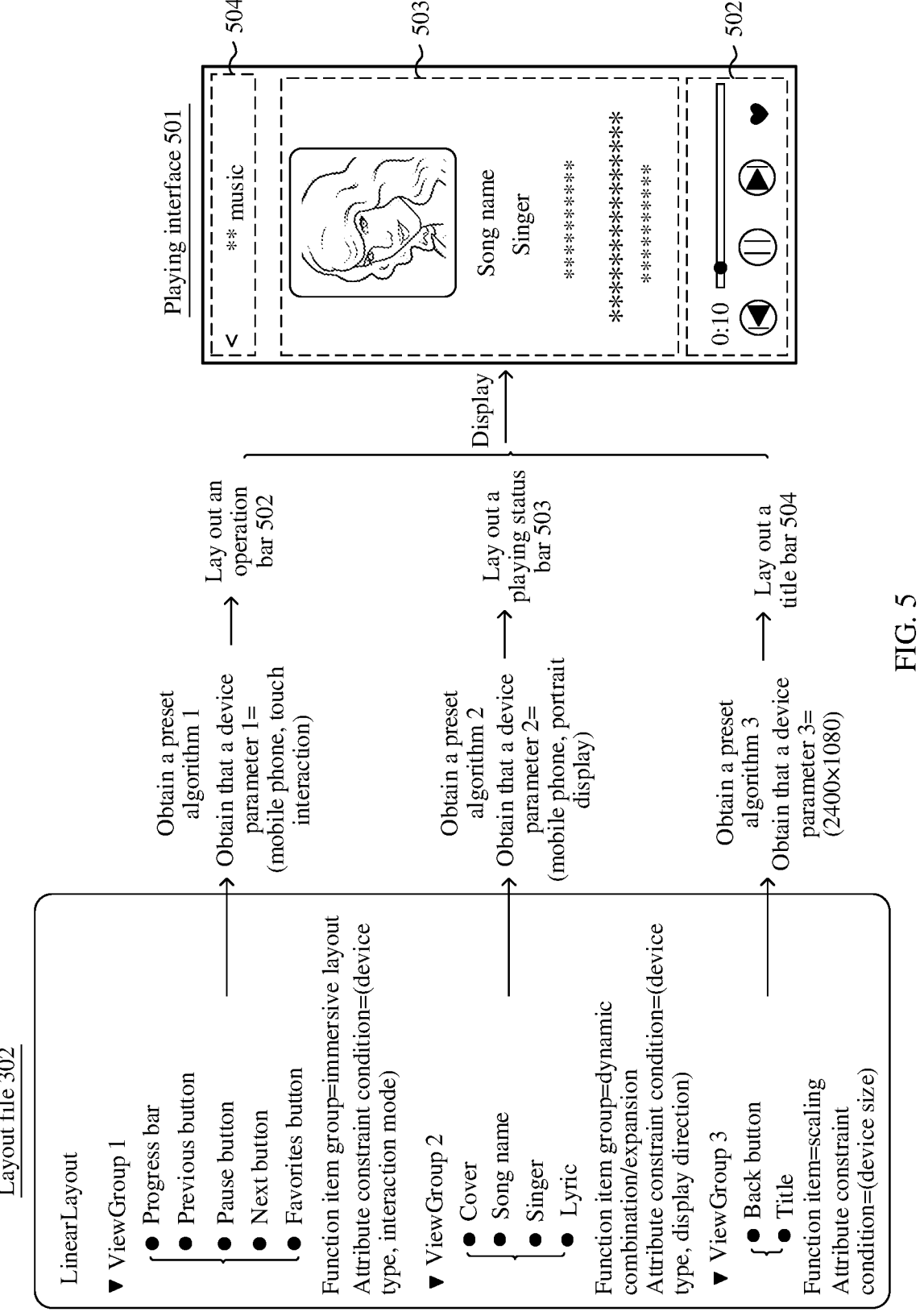
FIG. 5 is a schematic diagram 1 of application of a display interface layout method according to an embodiment of this application.

For example, as shown in FIG. 5, a ViewGroup 1, a ViewGroup 2, and a ViewGroup 3 are defined in the layout file 302. The ViewGroup 1 corresponds to an operation bar on a playing interface, and the ViewGroup 1 includes five Views: a progress bar, a pause button, a previous button, a next button, and a favorites button. The ViewGroup 2 corresponds to a playing status bar on the playing interface, and the ViewGroup 2 includes four Views: a cover, a song name, a singer, and a lyric. The ViewGroup 3 corresponds to a title bar on the playing interface, and the ViewGroup 3 includes two Views: a back button and a title.

In addition, still as shown in FIG. 5, the developer sets a corresponding function item (or function item group) and an attribute constraint condition corresponding to the function item (or the function item group) for a related View or ViewGroup in the layout file 302. For example, a function item group supported by the ViewGroup 1 is "immersive layout", and a corresponding attribute constraint condition 1 includes a device type and an interaction mode. For another example, a function item group supported by the ViewGroup 2 is "dynamic combination/expansion", and a corresponding attribute constraint condition 2 includes a device type and a display direction. For another example, a function item supported by the ViewGroup 3 is "scaling", and a corresponding attribute constraint condition 3 includes a device size.

It should be noted that, in FIG. 5, a function item and an attribute constraint condition of each ViewGroup are set by using the ViewGroup as a granularity. It may be understood that, when designing the layout file, the developer may alternatively set a corresponding function item and attribute constraint condition for each View by using the View as a granularity. This is not limited in this embodiment of this application.

The ViewGroup 1 is used as an example. The mobile phone may determine, by reading the layout file 302, that the ViewGroup 1 includes the five Views: the progress bar, the pause button, the previous button, the next button, and the favorites button. Then, the mobile phone may obtain a display resource of each of the five Views from the folder 1.

In addition, the mobile phone may determine, by reading the layout file 302, that the function item group of the ViewGroup 1 is "immersive layout", and the corresponding attribute constraint condition 1 includes the device type and the interaction mode. Then, still as shown in FIG. 5, the mobile phone may obtain a preset algorithm 1 for a corresponding control attribute based on the function item group "immersive layout". A correspondence between different function items (or function item groups) and different preset algorithms may be carried in the layout file 302 or the application installation package of the music app and delivered to the mobile phone. In addition, still as shown in FIG. 5, the mobile phone may obtain a corresponding device parameter 1 (namely, a specific value of the attribute constraint condition 1) based on the attribute constraint condition 1. For example, the device parameter 1 includes a device parameter that is a mobile phone and that corresponds to the device type, that is, the device type=mobile phone, and the device parameter 1 includes a device parameter that is touch interaction and that corresponds to the interaction mode, that is, the interaction mode=touch interaction.

Then, the mobile phone may input that the device parameter 1=(mobile phone, touch interaction) as an input parameter to the preset algorithm 1, and calculate specific attribute values of each View in the ViewGroup 1, for example, a size, a shape, and a display position of the View, by using the preset algorithm 1. For example, in the device parameter 1, when the device type=mobile phone, and the interaction mode=touch interaction, the View in the ViewGroup 1 may be set to be located at the bottom of a screen of the mobile phone, to facilitate a user operation. Certainly, the mobile phone may alternatively calculate attribute values such as a size and a shape of each View in the ViewGroup 1 based on the device parameter 1. This is not limited in this embodiment of this application. Then, still as shown in FIG. 5, the mobile phone may load, based on the calculated specific attribute values of each View, each View in the ViewGroup 1 to a playing interface 501 by using a display resource of each View, to display an operation bar 502 on the playing interface 501 on a display of the mobile phone.

In the foregoing embodiment, an example in which the mobile phone displays the ViewGroup 1 based on the layout file 302 is used for description. Similarly, when displaying the ViewGroup 2, the mobile phone may obtain a display resource of each View in the ViewGroup 2 from the folder 1 by reading the layout file 302.

In addition, still as shown in FIG. 5, the mobile phone may determine, by reading the layout file 302, that the function item group of the ViewGroup 2 is "dynamic combination/expansion", and the corresponding attribute constraint condition 2 includes the device type and the display direction. Then, still as shown in FIG. 5, the mobile phone may obtain a preset algorithm 2 for a corresponding control attribute based on the function item group "dynamic combination/expansion". In addition, the mobile phone may obtain a corresponding device parameter 2 (namely, a specific value of the attribute constraint condition 2) based on the attribute constraint condition 2. For example, the device parameter 2 includes a device parameter that is a mobile phone and that corresponds to the device type, that is, the device type=mobile phone, and the device parameter 2 includes a device parameter that is portrait display and that corresponds to the display direction, that is, the display direction=portrait display.

Then, the mobile phone may input that the device parameter 2=(mobile phone, portrait display) as an input parameter to the preset algorithm 2, and calculate specific attribute values of each View in the ViewGroup 2, for example, a size, a shape, and a display position of the View, by using the preset algorithm 2. For example, in the device parameter 2, when the device type=mobile phone, and the display direction=portrait display, the Views in the ViewGroup 2 may be set to be expanded and arranged in a vertical direction. Then, still as shown in FIG. 5, the mobile phone may load, based on the calculated specific attribute values of each View, each View in the ViewGroup 2 to the playing interface 501 by using a display resource of each View, to display a playing status bar 503 on the playing interface 501 on the display of the mobile phone.

Similarly, still as shown in FIG. 5, the mobile phone may determine, by reading the layout file 302, a View included in the ViewGroup 3, and obtain a display resource of the corresponding View. In addition, as defined in the layout file 302, the function item of the ViewGroup 3 is "scaling", and the corresponding attribute constraint condition 3 includes the device size. Then, still as shown in FIG. 5, the mobile phone may obtain a preset algorithm 3 for a corresponding control attribute based on the function item "scaling". In addition, the mobile phone may obtain a corresponding device parameter 3 (namely, a specific value of the attribute constraint condition 3) based on the attribute constraint condition 3. For example, the device parameter 3 includes a device parameter that is 2400×1080 and that corresponds to the device size, that is, the device size=2400×1080.

Then, the mobile phone may input that the device parameter 3=(2400×1080) as an input parameter to the preset algorithm 3, and calculate specific attribute values of each View in the ViewGroup 3, for example, a size, a shape, and a display position of the View, by using the preset algorithm 3. For example, in the device parameter 3, when the device size=2400×1080, the ViewGroup 3 may be set to be located at the top of the screen, and a font size of each View in the ViewGroup 3 may be set to 14. Then, still as shown in FIG. 5, the mobile phone may load, based on the calculated specific attribute values of each View, each View in the ViewGroup 3 to the playing interface 501 by using a display resource of each View, to display a title bar 504 on the playing interface 501 on the display of the mobile phone.

In this way, when displaying the playing interface 501 of the music app, the mobile phone can obtain, based on the function item (or the function item group) set for each View or ViewGroup in the layout file 302, a preset algorithm for calculating a specific control attribute value, obtain a corresponding device parameter based on the attribute constraint condition set for each View or ViewGroup, then calculate, based on the obtained device parameter, an attribute value of a corresponding View or ViewGroup by using the corresponding preset algorithm, to lay out each View or ViewGroup based on the attribute value, and finally display the corresponding playing interface 501 on the display for the user.

Similarly, when running the music app to display another display interface of the music app, the mobile phone may also obtain a corresponding layout file according to the foregoing method to lay out each View or ViewGroup, so as to display the corresponding display interface.

In other words, the mobile phone may obtain a corresponding device parameter based on a function item and an attribute constraint condition that are set by the developer for each View or ViewGroup in a layout file, and then adaptively lay out each View or ViewGroup on the display interface based on the obtained device parameter, so that a presentation effect of each View or ViewGroup on the display interface matches a device feature (for example, a device type, a size, an interaction mode, or a function) of the current running device.

The music app is still used as an example. Similar to that in running the music app on the mobile phone, when the user installs the application installation package of the music app on a head unit 1, the head unit 1 may also store the layout file of each display interface in the application installation package in a folder in a specified path.

The layout file 302 of the playing interface is still used as an example. When the music app needs to display the playing interface, the music app may trigger, by invoking the corresponding interface, the head unit 1 to obtain the layout file 302 corresponding to the playing interface. The layout file 302 includes the ViewGroup 1 corresponding to the operation bar, the ViewGroup 2 corresponding to the playing status bar, and the ViewGroup 3 corresponding to the title bar.

In this case, the head unit 1 may separately obtain the display resource of each View in the ViewGroup 1, the ViewGroup 2, and the ViewGroup 3 by reading the layout file 302.

Figure 6:
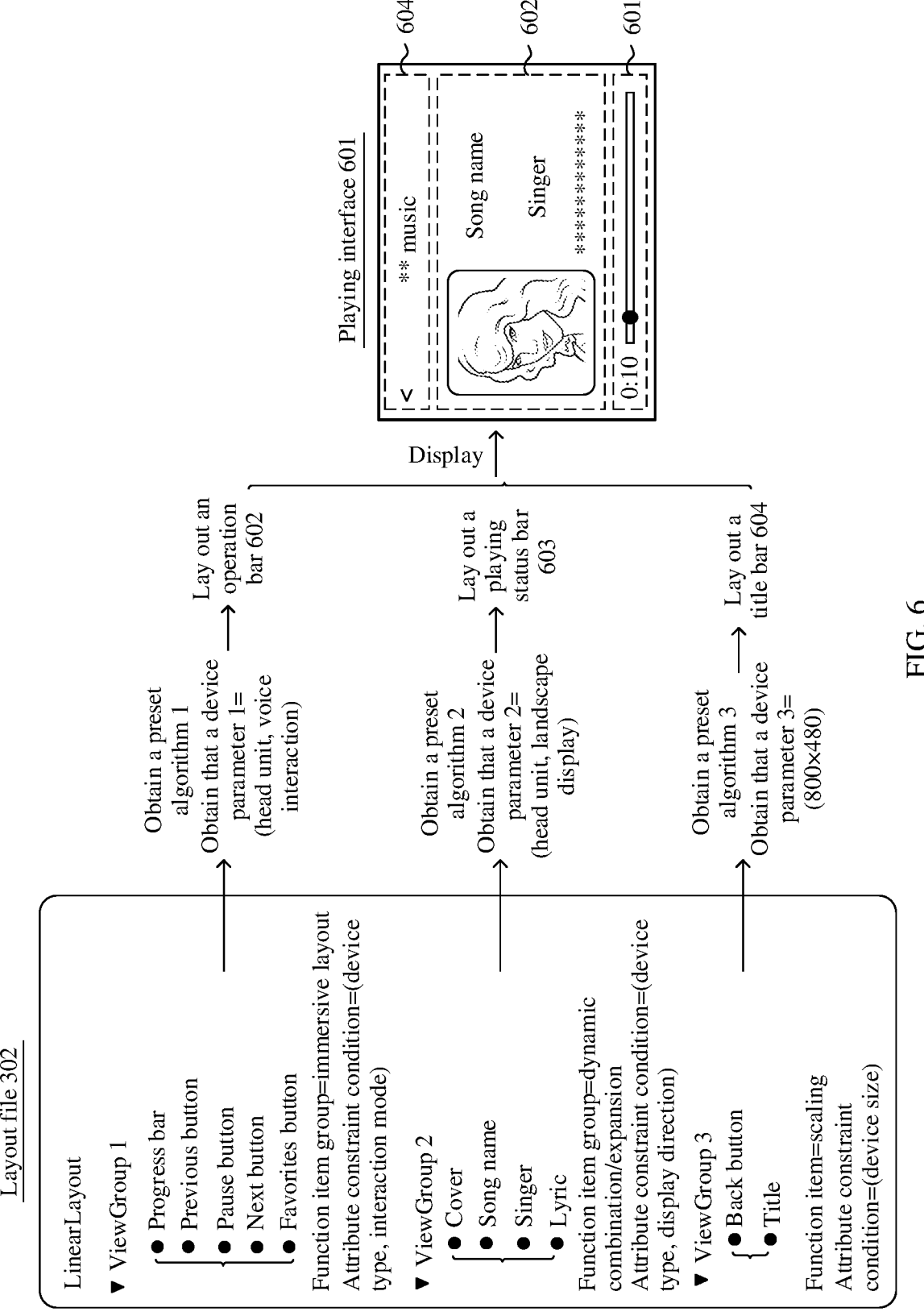
FIG. 6 is a schematic diagram 2 of application of a display interface layout method according to an embodiment of this application.

In addition, as shown in FIG. 6, the head unit 1 may determine, by reading the layout file 302, that the function item group of the ViewGroup 1 is "immersive layout", and the corresponding attribute constraint condition 1 includes the device type and the interaction mode. Then, as shown in FIG. 6, the head unit 1 may obtain the preset algorithm 1 for the corresponding control attribute based on the function item group "immersive layout". In addition, the head unit 1 may obtain the corresponding device parameter 1 (namely, the specific value of the attribute constraint condition 1) based on the attribute constraint condition 1. For example, the device parameter 1 includes a device parameter that is a head unit and that corresponds to the device type, that is, the device type=head unit, and the device parameter 1 includes a device parameter that is voice interaction and that corresponds to the interaction mode, that is, the interaction mode=voice interaction.

Then, the head unit 1 may input that the device parameter 1=(head unit 1, touch interaction) as an input parameter to the preset algorithm 1, and calculate specific attribute values of each View in the ViewGroup 1, for example, a size, a shape, and a display position of the View, by using the preset algorithm 1.

For example, in the device parameter 1, when the device type=head unit, and the interaction mode=voice interaction, the user does not need to tap a button in the ViewGroup 1. Therefore, the pause button, the previous button, the next button, and the favorites button in the ViewGroup 1 may be set to be hidden on a playing interface 601, and the progress bar in the ViewGroup 1 may be set to be displayed on the playing interface 601, to implement a display effect of immersive layout. Then, still as shown in FIG. 6, the head unit 1 may hide the corresponding Views in the ViewGroup 1 on the playing interface 601, and display the progress bar on the playing interface 601. In this case, an operation bar 602 of the playing interface 601 has only the View, namely, the progress bar.

Similarly, the head unit 1 may determine, by reading the layout file 302, that the function item group of the ViewGroup 2 is "dynamic combination/expansion", and the corresponding attribute constraint condition 2 includes the device type and the display direction. Then, still as shown in FIG. 6, the head unit 1 may obtain the preset algorithm 2 for the corresponding control attribute based on the function item group "dynamic combination/expansion". In addition, the head unit 1 may obtain the corresponding device parameter 2 (namely, the specific value of the attribute constraint condition 2) based on the attribute constraint condition 2. For example, the device parameter 2 includes a device parameter that is a head unit 1 and that corresponds to the device type, that is, the device type=head unit, and the device parameter 2 includes a device parameter that is landscape display and that corresponds to the display direction, that is, the display direction=landscape display.

Then, the head unit 1 may input that the device parameter 2=(head unit, landscape display) as an input parameter to the preset algorithm 2, and calculate specific attribute values of each View in the ViewGroup 2, for example, a size, a shape, and a display position of the View, by using the preset algorithm 2.

For example, in the device parameter 2, when the device type=head unit, and the display direction=landscape display, the Views in the ViewGroup 2 may be set to be expanded and arranged in a horizontal direction. Then, still as shown in FIG. 6, the head unit 1 may load, based on the calculated specific attribute values of each View, each View in the ViewGroup 2 to the playing interface 601 by using the display resource of each View, to display a playing status bar 603 on the playing interface 601.

Similarly, still as shown in FIG. 6, the head unit 1 may determine, by reading the layout file 302, that the function item of the ViewGroup 3 is "scaling", and the corresponding attribute constraint condition 3 includes the device size. Then, still as shown in FIG. 6, the head unit 1 may obtain the preset algorithm 3 for the corresponding control attribute based on the function item "scaling". In addition, the head unit 1 may obtain the corresponding device parameter 3 (namely, the specific value of the attribute constraint condition 3) based on the attribute constraint condition 3. For example, the device parameter 3 includes a device parameter that is 800×480 and that corresponds to the device size, that is, the device size=800×480.

Then, the head unit 1 may input that the device parameter 3=(800×480) as an input parameter to the preset algorithm 3, and calculate specific attribute values of each View in the ViewGroup 3, for example, a size, a shape, and a display position of the View, by using the preset algorithm 3. For example, in the device parameter 3, when the device size=800×480, the ViewGroup 3 may be set to be located at the top of the screen, and a font size of each View in the ViewGroup 3 may be set to 10. Then, still as shown in FIG. 6, the head unit 1 may load, based on the calculated specific attribute values of each View, each View in the ViewGroup 3 to the playing interface 601 by using the display resource of each View, to display a title bar 604 on the playing interface 601.

In this way, when displaying the playing interface 601 of the music app, the head unit 1 can obtain a corresponding device parameter based on the function item and the attribute constraint condition that are set for each View or ViewGroup in the layout file 302, then adaptively set an attribute value of each View or ViewGroup based on the obtained device parameter, to lay out each View or ViewGroup based on the attribute value, and finally display the corresponding playing interface 601.

It should be noted that the corresponding function items and attribute constraint conditions do not need to be set for all the Views or ViewGroups on the display interface. The developer may set a corresponding function item and attribute constraint condition for one or more Views or ViewGroups in the layout file 302 based on a specific application scenario or actual experience, and the developer may set specific attribute values (for example, a width, a height, and a display position) for another View or ViewGroup in the layout file 302. In this case, if the head unit 1 (or the mobile phone) reads, from the layout file 302, a View or a ViewGroup for which no function item and attribute constraint condition are set, the head unit 1 (or the mobile phone) may perform layout based on a specific attribute value set for the View or the ViewGroup in the layout file 302. This is not limited in this embodiment of this application.

It can be learned that, regardless of a process in which mobile phone displays the playing interface 501 of the music app based on the layout file 302 or a process in which the head unit 1 displays the playing interface 601 of the music app based on the layout file 302, although layout forms of controls on the playing interfaces finally displayed by the mobile phone and the head unit 1 are different, layout files used by the mobile phone and the head unit 1 are the same (that is, the layout file 302). In other words, when displaying a same display interface of the application, the different electronic devices may adaptively lay out each View or ViewGroup on the display interface based on a function item and an attribute constraint condition that are set for each View or ViewGroup in a related layout file. In this way, the developer does not need to separately create corresponding layout files for the different electronic devices. This reduces application development difficulty, and improves application development efficiency.

In some embodiments, the developer may further update a function item (or a function item group) and an attribute constraint condition that are set for a View or a ViewGroup in a layout file (for example, the layout file 302). The updated layout file 302 may be carried in an application installation package of a latest version of the music app and downloaded to an electronic device (for example, the mobile phone or the head unit 1) of the user, so that the electronic device of the user can obtain a latest layout file of a related display interface.

Figure 7:
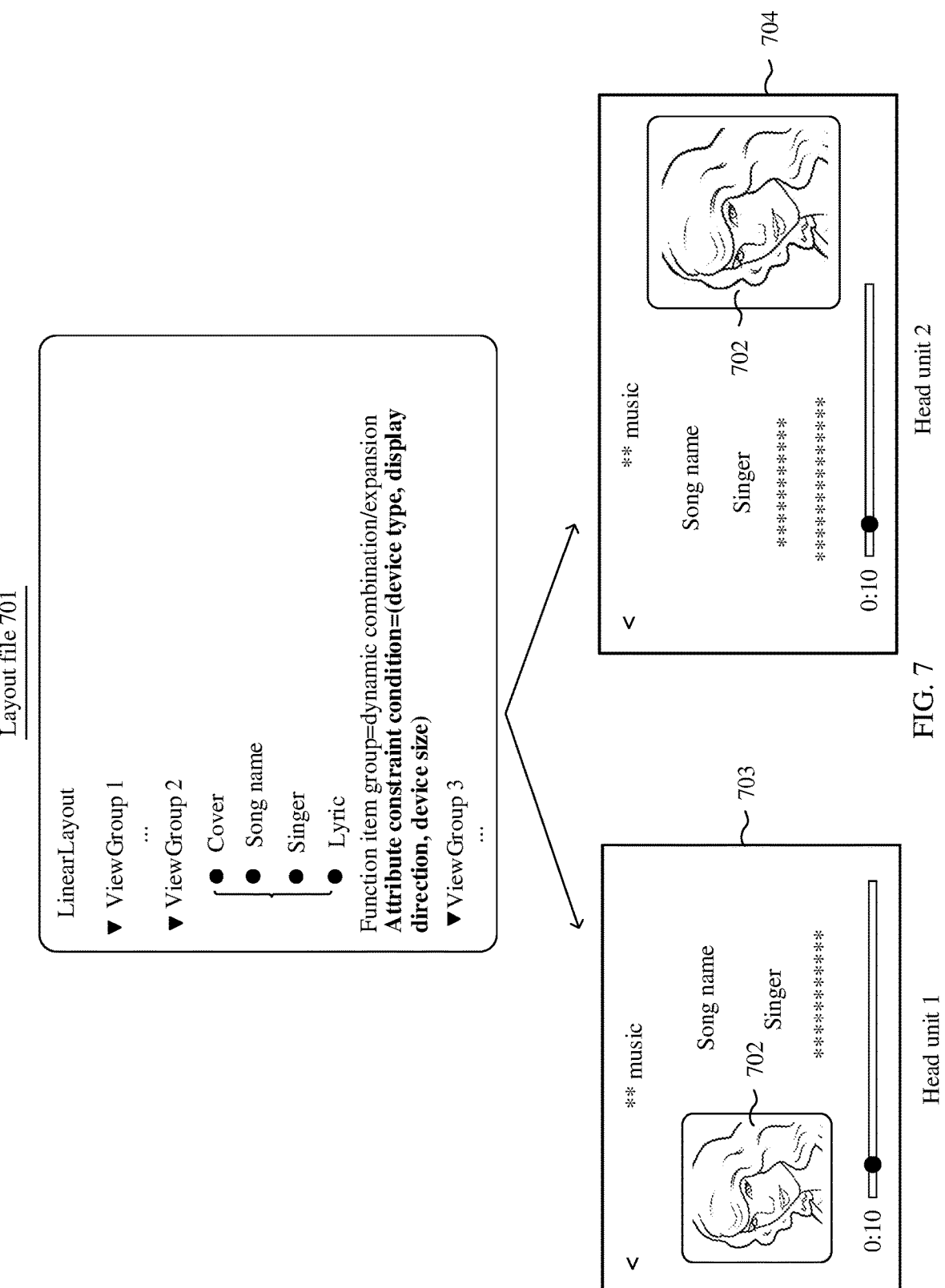
FIG. 7 is a schematic diagram 3 of application of a display interface layout method according to an embodiment of this application.

For example, as shown in FIG. 5 or FIG. 6, the function item group set by the developer for the ViewGroup 2 in the layout file 302 is "dynamic combination/expansion", and the corresponding attribute constraint condition 2 includes the device type and the display direction. As shown in FIG. 7, the developer may modify the attribute constraint condition 2 to a device type, a display direction, and a device size, to obtain an updated layout file 701. Then, the developer may add the updated layout file 701 to the application installation package of the latest version of the music app.

For example, the application installation package of the latest version of the music app is installed on both the head unit 1 and a head unit 2. In this case, both the head unit 1 and the head unit 2 may obtain the updated layout file 701 in the application installation package.

In this case, similar to that in a process of laying out each View or ViewGroup on the playing interface in the foregoing embodiment, when the head unit 1 displays the ViewGroup 2, the head unit 1 may determine, by reading the layout file 701, that the function item group of the ViewGroup 2 is "dynamic combination/expansion", and the corresponding attribute constraint condition 2 includes the device type, the display direction, and the device size. Then, the head unit 1 may obtain the corresponding device parameter 2 based on the attribute constraint condition 2. For example, the device parameter 2 includes that the device type=head unit, the display direction=landscape display, and the device size=800×480. In this case, the head unit 1 may calculate, based on the obtained device parameter 2, a specific attribute value of each View in the ViewGroup 2 by using the preset algorithm 2. For example, because a screen width (namely, 800) in the device size is less than a threshold, a cover 702 and other Views (namely, a song name, a singer, and a lyric) in the ViewGroup 2 may be transversely arranged side by side. Then, as shown in FIG. 7, the head unit 1 may transversely arrange the cover 702 and the other Views (namely, the song name, the singer, and the lyric) in the ViewGroup 2 side by side on a playing interface 703 for display.

Similarly, when the head unit 2 displays the ViewGroup 2, the head unit 2 may determine, by reading the layout file 701, that the function item group of the ViewGroup 2 is "dynamic combination/expansion", and the corresponding attribute constraint condition 2 includes the device type, the display direction, and the device size. Then, the head unit 2 may obtain the corresponding device parameter 2 based on the attribute constraint condition 2. For example, the device parameter 2 includes that the device type=head unit, the display direction=landscape display, and the device size=1080×480. In this case, the head unit 2 may calculate, based on the obtained device parameter 2, a specific attribute value of each View in the ViewGroup 2 by using the preset algorithm 2. In this case, because a screen width (namely, 1080) in the device size is greater than the threshold, the cover 702 in the ViewGroup 2 may be scaled up and then displayed on the right side of a screen. Then, as shown in FIG. 7, the head unit 2 may scale up the cover 702 in the ViewGroup 2 on a playing interface 704 and then lay out the cover 702 on the right side of the screen for display.

It can be learned that, when an attribute constraint condition of a View or a ViewGroup in the layout file changes, the different electronic devices may obtain a latest device parameter based on a latest attribute constraint condition, to adaptively adjust a layout of the View or the ViewGroup based on the latest device parameter, so that a presentation effect of each View or ViewGroup on the display interface matches a device feature (for example, a device type, a size, an interaction mode, or a function) of a current running device.

In some embodiments, a unified display style may be set when electronic devices of different brands display each View or ViewGroup. For example, mobile phones of a brand A uniformly use a first font to display each View or ViewGroup on the display interface, and mobile phones of a brand B uniformly use a second font to display each View or ViewGroup on the display interface. In this case, when laying out a corresponding display interface based on a layout file of the music app, the running device of the music app may further obtain brand information of the current running device. Then, the running device may further adjust an attribute value of each View or ViewGroup on a current to-be-displayed display interface, for example, a color of a title, a font of the title, or a size of a rounded corner of a button, based on the obtained brand information. This is not limited in this embodiment of this application.

In addition, in the foregoing embodiments, the layout file of the music app is used as an example for description. It may be understood that the developer may further develop a layout file of each display interface of another app according to the foregoing method. In this way, after obtaining a corresponding layout file, the electronic device may obtain a corresponding device parameter according to the foregoing method based on to a function item and an attribute constraint condition of each View or ViewGroup in the layout file, to adaptively lay out each View or ViewGroup on the display interface based on the obtained device parameter.

In some other embodiments, the developer may further set, in the layout file, a device capability required by each View or ViewGroup. For example, a View used to play a video requires the running device to have a video display function. For another example, a View used to display a map requires the running device to have a positioning function. For still another example, a View used for payment requires the running device to have a security authentication running environment.

Figure 8:
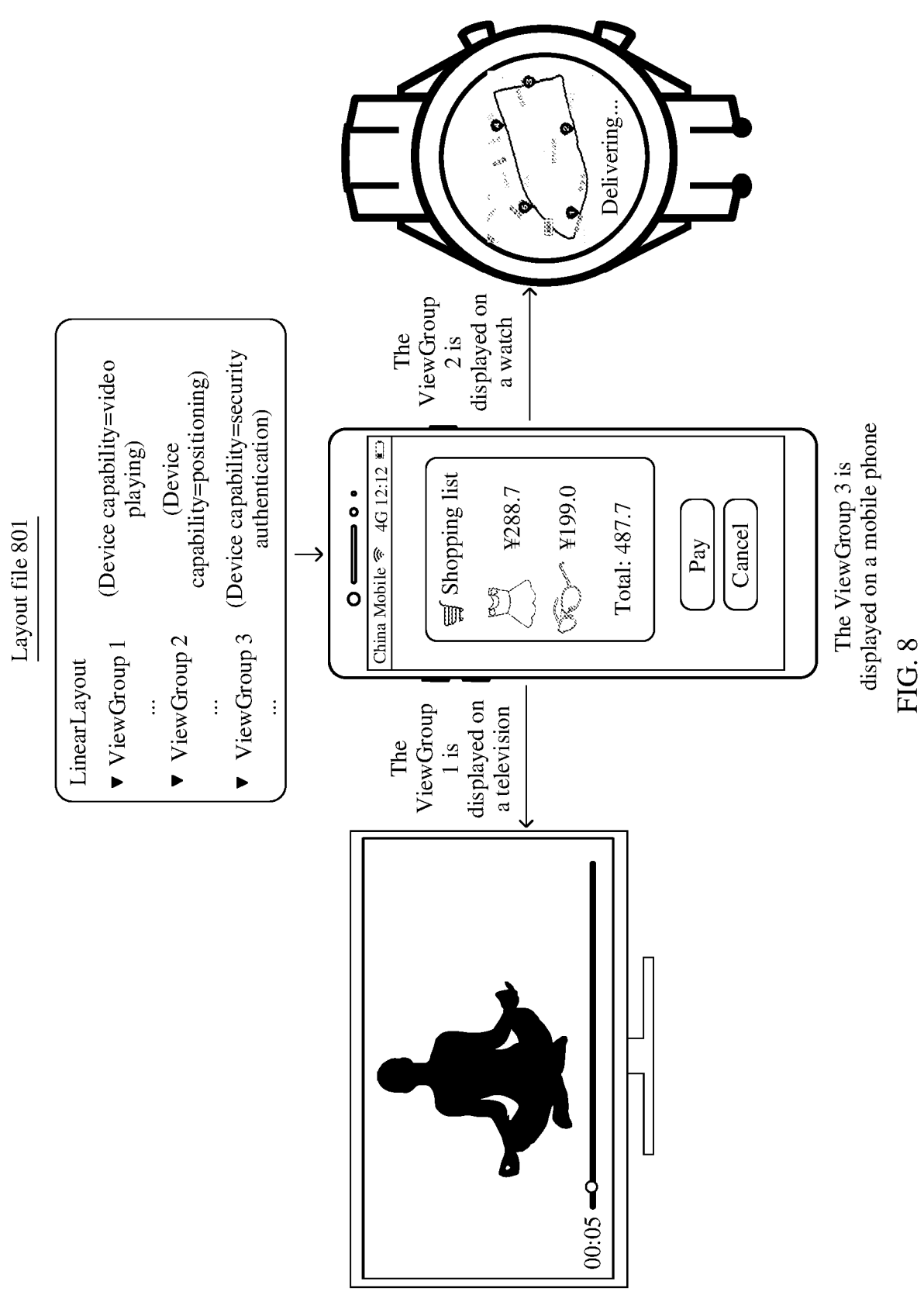
FIG. 8 is a schematic diagram 4 of application of a display interface layout method according to an embodiment of this application.

In this case, as shown in FIG. 8, it is assumed that a layout file (for example, a layout file 801) of a display interface includes a View 1 used to play a video, a View 2 used to display a map, and a View 3 used for payment. For example, the running device is a mobile phone. After obtaining the layout file 801, the mobile phone may query whether an electronic device having the video display function, an electronic device having the positioning function, and an electronic device having the security authentication running environment exist near the mobile phone.

For example, the mobile phone may communicate with an electronic device located in a same Wi-Fi network, to obtain a device capability of a nearby electronic device. If the mobile phone finds that a television located in the same Wi-Fi network has the video display function, the mobile phone may establish a network connection to the television.

Then, the mobile phone may send a display resource of the View 1 to the electronic device having the video display function (for example, the television), and the television displays the View 1.

For example, the mobile phone may further obtain a corresponding device parameter based on a function item and an attribute constraint condition that are set for the View 1 in the layout file 801, and calculate attribute values of the View 1, for example, a size, a shape, and a display position of the View 1, based on the obtained device parameter. Then, the mobile phone may also send the attribute values of the View 1 to the television, so that the television may display, based on the attribute values of the View 1, the View 1 by using the display resource of the View 1.

Alternatively, the mobile phone may send, to the television, the function item and the attribute constraint condition that are set for the View 1 in the layout file 801. Then, the television may obtain the corresponding device parameter based on the function item and the attribute constraint condition that are set for the View 1 in the layout file 801, and calculate the attribute value of the View 1 based on the obtained device parameter. Then, the television may display, based on the calculated attribute value of the View 1, the View 1 by using the display resource of the View 1.

Similarly, still as shown in FIG. 8, if the mobile phone finds that a watch located in the same Wi-Fi network has the positioning function, the mobile phone may establish a network connection to the watch. Then, the mobile phone may send a display resource of the View 2 to the electronic device having the positioning function (for example, the watch), and the watch displays the View 2. An attribute value of the View 2 may be calculated by the mobile phone based on a function item and an attribute constraint condition that are set in the layout file 801 and then sent to the watch, or the mobile phone may send, to the watch, the function item and the attribute constraint condition that are set for the View 2 in the layout file 801, and the watch obtains the attribute value of the View 2 through calculation based on the function item and the attribute constraint condition that are set in the layout file 801.

Still as shown in FIG. 8, if the mobile phone does not find that another electronic device located in the same Wi-Fi network has the security authentication running environment, but the mobile phone has the security authentication running environment, the mobile phone may obtain a corresponding device parameter based on a function item and an attribute constraint condition that are set for the View 3 in the layout file 801. Then, the mobile phone may calculate an attribute value of the View 3 based on the obtained device parameter, and display the View 3 on a screen of the mobile phone based on the calculated attribute value of the View 3.

Certainly, when the mobile phone has the video display function, the mobile phone may alternatively display the View 1 on the screen of the mobile phone. For another example, when the mobile phone has the positioning function, the mobile phone may alternatively display the View 2 on the screen of the mobile phone. This is not limited in this embodiment of this application.

In this way, the mobile phone can distribute, based on a device capability set for each View or ViewGroup in the layout file 801, different Views or ViewGroups to one or more electronic devices having a related device capability for display, so that different Views or ViewGroups on one display interface can be presented to the user on a corresponding electronic device that matches functions of the different Views or ViewGroups.

It should be noted that, in this embodiment of this application, the View or the ViewGroup for which the foregoing function item and attribute constraint condition are set may be referred to as a View or a ViewGroup that has an adaptive layout capability. In other words, in this embodiment of this application, each View or ViewGroup on the display interface has the adaptive layout capability. The adaptive layout capabilities of these Views or ViewGroups may be implemented by using a code module. The following describes an implementation process in detail by using a scaling capability as an example.

The View or the ViewGroup in the layout file may be stored in a layout container. In other words, the layout container is a layout structure used to store a control and another layout container. In other words, one layout container may include one or more controls, and nest one or more layout containers.

For example, the adaptive layout capabilities that the foregoing View and ViewGroup have include but are not limited to the scaling capability, a stretch capability, a hiding capability, a wrap capability (which may also be referred to as an automatic row breaking capability), an even distribution capability, a proportion capability, and an extension capability. The adaptive layout capabilities that the View and the ViewGroup have are briefly described herein, and are described in detail in the following.

The scaling capability means that the View or the ViewGroup has an adaptive scaling down or scaling up capability in a horizontal direction and a vertical direction in the layout container. For example, a proportion value of the View or the ViewGroup in a specified direction in the layout container may be set. In this way, when a size of the layout container changes, the View or the ViewGroup in the layout container maintains an original shape (for example, an aspect ratio) for scaling, so that a proportion of a scaled View or ViewGroup in the horizontal direction in the layout container reaches the specified proportion value, and/or a proportion of the scaled View or ViewGroup in the vertical direction in the layout container reaches the specified proportion value.

The stretch capability means that the View or the ViewGroup has an adaptive stretch capability in the specified direction in the layout container. For example, a margin value of the View or the ViewGroup in the specified direction (horizontal and/or vertical) in the layout container may be set. The margin value is a value of a distance between the View or the ViewGroup and an edge of the layout container. In this way, when the size of the layout container changes, the View or the ViewGroup in the layout container maintains a margin value with the layout container in the specified direction, and adaptively changes with the size of the layout container in the specified direction.

It should be noted that stretch in this embodiment of this application includes scaling up (a size increases) or scaling down (the size decreases) of the View or the ViewGroup in the specified direction. For example, stretching of the View or the ViewGroup in the horizontal direction includes that a width of the View or the ViewGroup increases or the width decreases. Stretching of the View or the ViewGroup in the vertical direction includes that a height of the View or the ViewGroup increases or the height decreases.

The hiding capability is a capability of automatically hiding the View or the ViewGroup during display based on a priority. For example, a hiding priority of the View or the ViewGroup in the layout container may be set. The hiding priority is used as an example. When the size of the layout container changes, and is insufficient to display all designed Views or ViewGroups, hiding is performed based on a hiding priority of each View or ViewGroup.

The wrap capability means that the View or the ViewGroup in the layout container has an adaptive wrap capability. For example, a wrap reference value of the layout container may be set. When a total width and spacing of a row of Views or ViewGroups in the layout container are greater than the wrap reference value, another View or ViewGroup greater than the wrap reference value is automatically wrapped for display.

It should be noted that the wrap capability herein includes wrap in the horizontal direction and wrap in the vertical direction. Wrap in the horizontal direction means that a plurality of child controls are originally arranged horizontally, and the electronic device may automatically determine, during display, to display the plurality of child controls in rows based on a width of the layout container. Wrap in the vertical direction means that a plurality of child controls are originally arranged vertically, and the electronic device may automatically determine, during display, to display the plurality of child controls in columns based on a height of the layout container. In some other examples, wrap in the vertical direction may also be considered as an inverse operation of wrap in the horizontal direction. Therefore, the wrap capability in this application may also be expressed as a row breaking capability, a column breaking capability, a segmentation capability, a section capability, or the like. This is not specifically limited in this embodiment of this application.

The even distribution capability means that the View or the ViewGroup in the layout container has an automatic spacing adjustment capability. For example, spacings between Views or ViewGroups in the specified direction in the layout container may be set to be equal. In this case, when the size of the layout container changes, the View or the ViewGroup in the layout container adaptively adjusts the spacing between the Views or the ViewGroups in the layout container based on the size of the View or the ViewGroup and the size of the layout container.

The proportion capability is a capability of the View or the ViewGroup to maintain a fixed proportion in the specified direction in the layout container. For example, a proportion value of the layout container in the specified direction (for example, the horizontal direction or the vertical direction) may be set. In this way, when the size of the layout container changes, the View or the ViewGroup in the layout container maintains the original shape (for example, the aspect ratio) for scaling, so that a proportion of a scaled View or View-Group in the specified direction in the layout container meets the specified proportion value.

The extension capability means that the View or the ViewGroup in the layout container has a capability of automatically adjusting a quantity of to-be-displayed controls. For example, a size of an exposure feature in the layout container may be set. In this case, when the size of the layout container changes, the View or the ViewGroup in the layout container determines, based on the size of the View or the ViewGroup, the size of the layout container, and the size of the exposure feature, a quantity of Views or ViewGroups to be displayed in the layout container. The exposure feature is a View that displays a part of content in the layout container.

Figure 9:
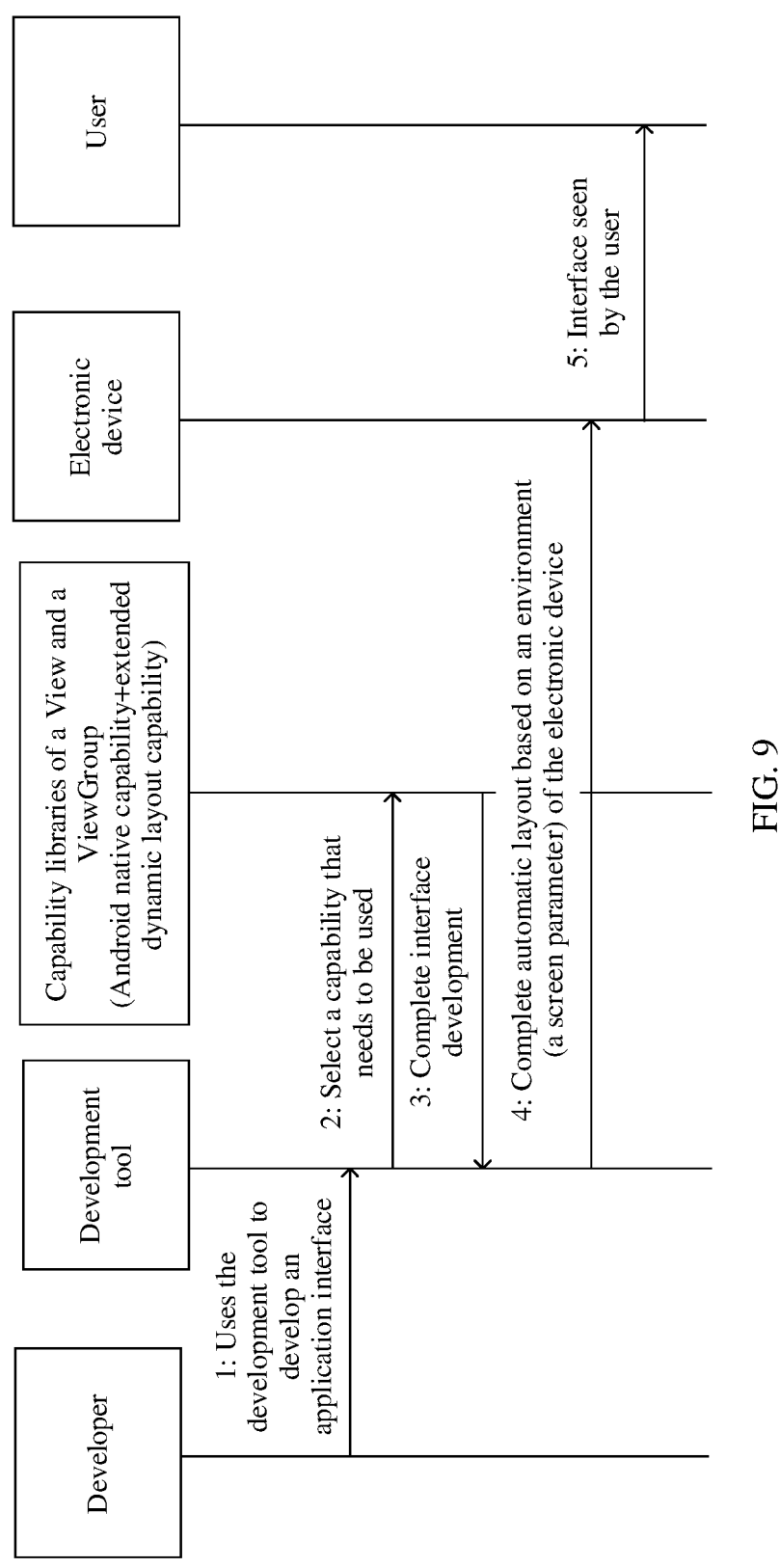
FIG. 9 is a schematic flowchart 1 of a display interface layout method according to an embodiment of this application.

FIG. 9 shows a general procedure of implementing an adaptive layout capability of a View or a ViewGroup in this application. First, a developer uses a development tool to develop an application interface. In a development process, a capability that needs to be used may be selected from capability libraries (which include an Android native capability and the extended adaptive layout capability in this application) of the View and the ViewGroup to obtain a layout file, and an installation package of an application is generated, to complete development of the application interface. Then, an electronic device may download the application installation package from AppGallery, and install and run the application installation package. When running the application, the electronic device completes automatic layout based on the layout file and an environment (for example, a screen parameter) of the electronic device, and draws the corresponding application interface, namely, an interface seen by the user.

The following describes a specific solution for implementing the adaptive layout capability of the View or the ViewGroup in this application.

When developing the application, the developer may use an integrated development environment (Integrated Development Environment, IDE) tool to develop the application. The IDE tool integrates a code writing function, an analysis function, a compilation function, a debugging function, and another integrated development software service suite. For example, a typical IDE tool of the Android system includes any one of Android Studio and DevEco Studio.

Figure 10:
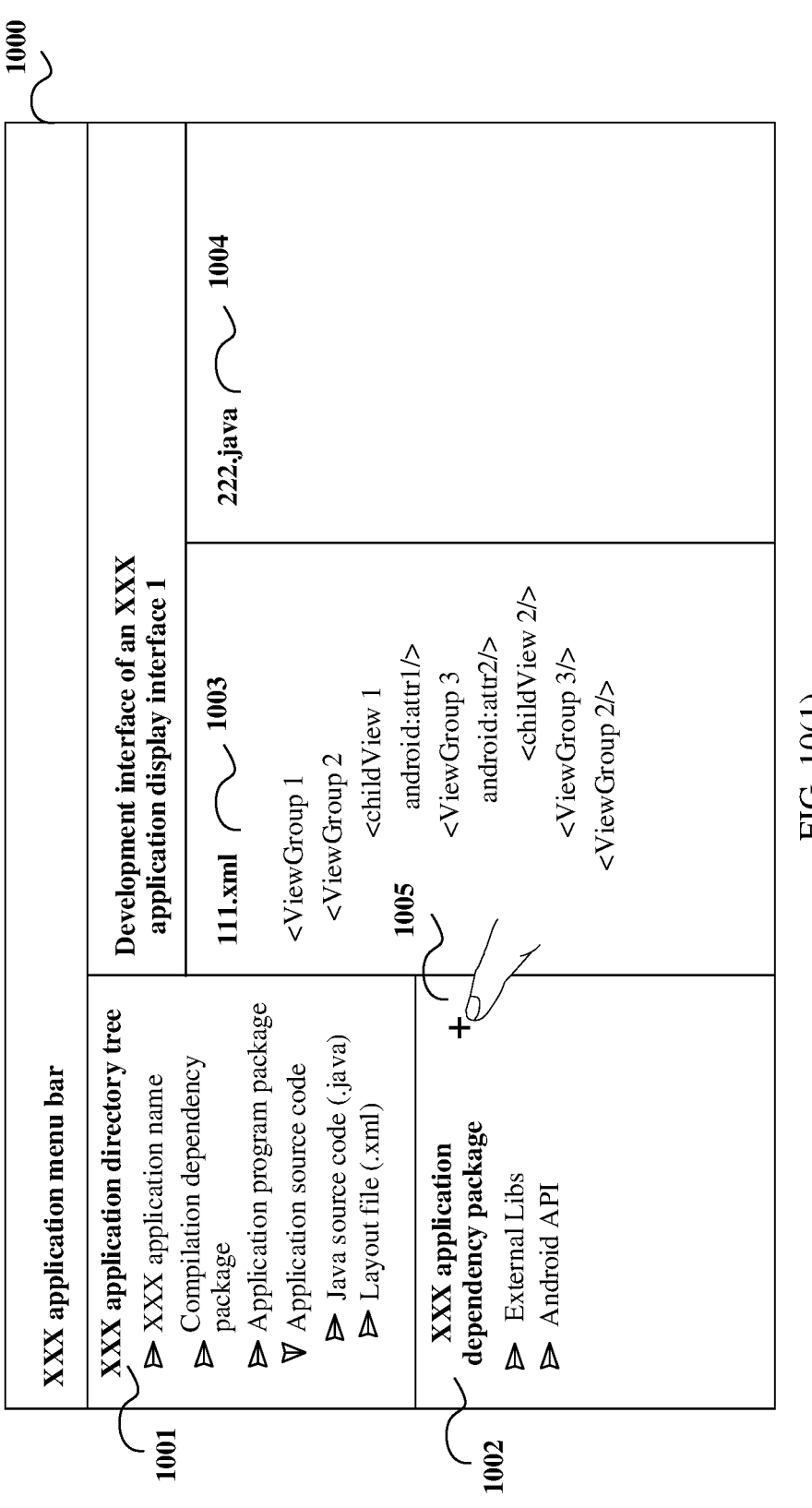
FIG. 10(1) and FIG. 10(2) are a schematic diagram 5 of a development interface according to an embodiment of this application.
Figure 10:
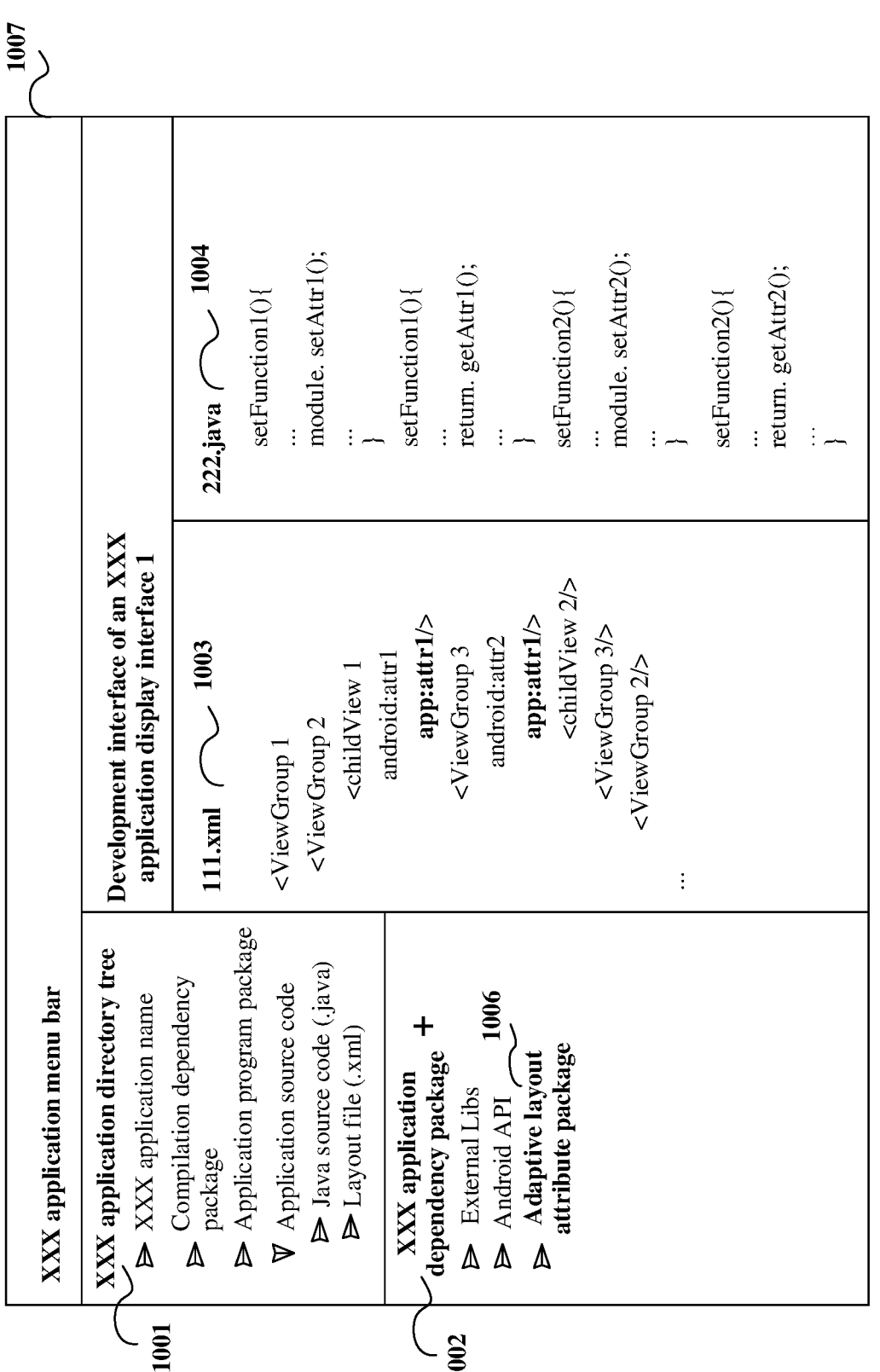

FIG. 10(1) shows an example of a development interface 1000 when the developer develops the application. The development interface 1000 includes an application directory tree 1001 (namely, the view tree 305 in the foregoing embodiment), an application dependency package 1002, and a development interface of an application display interface 1. The development interface of the application display interface 1 includes a layout file (for example, 111.xml) 1003 and Java source code (for example, 222.java) 1004.

The application directory tree 1001 includes an application name, a compilation dependency package, an application program package, and application source code. The developer may quickly open a corresponding file by using the application directory tree 1001, to facilitate editing by the developer. For example, the developer may quickly open a Java source code file or the layout file by using Java source code in the application source code or the layout file, and the developer may edit the Java source code file or the layout file to edit a layout of each display interface in the application.

It should be noted that, before a layout of a display interface is edited, a dependency library when the application is developed needs to be added. Specifically, the dependency library may be added to the application dependency package 1002. For example, an application in an Android system is developed. An external library (External Libs) and an Android API library need to be depended on.

After the dependency library is added, the developer may set, in a manner of invoking a corresponding API interface in the Java source code 1004, information such as hierarchical structures and attribute values of a View and a ViewGroup that are included in each display interface in the application and a display resource of each View. Alternatively, the developer may set, in the layout file 1003, the information such as the hierarchical structures and the attribute values of the View and the ViewGroup that are included in each display interface in the application and the display resource of each View.

It should be noted that the View and the ViewGroup provided in this embodiment of this application have the adaptive layout capability, and in addition to basic libraries (the External Libs and the Android API library) of the Android system, further need to depend on an extended library in this application, for example, an adaptive layout attribute package. The adaptive layout attribute package includes a declaration of each adaptive layout capability of the View and the ViewGroup, an interface invoked by each adaptive layout capability, a corresponding processing procedure during measurement and layout of each adaptive layout capability, and the like.

When designing the layout file, the developer needs to use the declaration of each adaptive layout capability, to set the corresponding adaptive layout capability for the View or the ViewGroup on the display interface. The interface invoked by each adaptive layout capability, the corresponding processing procedure during measurement and layout of each adaptive layout capability, and the like are carried in the installation package to be transferred to the electronic device. When subsequently running the application, the electronic device may obtain the attribute value of the View or the ViewGroup of the adaptive layout capability based on the interface invoked by each adaptive layout capability, invoke the corresponding processing procedure during measurement and layout of each adaptive layout capability to complete measurement and layout, and finally draw the display interface. The interface invoked by each adaptive layout capability and the corresponding processing procedure during measurement and layout of each adaptive layout capability are described in detail in the following when a processing procedure of the electronic device is described.

For example, as shown in FIG. 10(1), the developer may add the adaptive layout attribute package by using a control 1005. On a development interface 1007 shown in FIG. 10(2), an adaptive layout attribute package 1006 is newly added to the application dependency package, and the adaptive layout attribute package 1006 may correspond to each function item in the attribute window 306 in the foregoing embodiment.

It can be learned from the layout file 1003 that "android:" guides an attribute value of a native View or ViewGroup of the Android system, and "app:" guides an attribute value of an extended View or ViewGroup in this application, that is, the attribute value of the View or the ViewGroup having the adaptive layout capability. Alternatively, it can be learned from the Java source code 1004 that the API interface that corresponds to the adaptive layout capability and that is invoked by the developer includes, for example, setAttr1( ) getAttr1( ) setAttr2( ) and getAttr2( ).

Then, the developer uses the IDE tool to pack source code, a resource (including the layout file), the dependency library, and the like of the developed application into the installation package (for example, an APK file). In other words, the developer completes development work of the application. Then, the application installation package is released to AppGallery. The user may download and install the application on different electronic devices. It should be noted that electronic devices having different screen parameters draw the display interface of the application by using a same layout file.

When the electronic device runs the application, the electronic device obtains the screen parameter of the electronic device, and determines a display size and a display position of the application based on the screen parameter of the electronic device. Then, the electronic device determines sizes and positions of each View and ViewGroup on the display interface with reference to the attribute values (which include an Android native attribute value and an extended attribute value) of each View and ViewGroup in the layout file, and draws the corresponding display interface.

The screen parameter includes a screen specification parameter, a screen status parameter, and the like. A screen specification includes a size of a screen, namely, a width and a height of the screen. The screen specification determines a size of an area that is actually used to display application content and that is of the electronic device. In some examples, a form of a display also affects the size of the area that is actually used to display the application content and that is of the electronic device. For example, when the display is a notched screen, an area of the notch screen is not used to display the application content. For another example, when the display is a curved screen, a curved area on an edge is not used to display the application content.

In addition to the specification, the form, and the like of the screen configured for the electronic device that determine the size of the area that is actually used to display the application content and that is of the electronic device, a screen status of the electronic device also affects the area that is actually used to display the application content and that is of the electronic device. The screen status includes a landscape/portrait state, a folded state, a split-screen state, and the like of the electronic device. A half-folded state means that, when a foldable screen supports folding for a plurality of times, a part of the screen is in a folded state, and a part of the screen is in an unfolded state. The landscape/portrait state of the electronic device affects a width and a height of the display interface that is of the application and that is drawn by the electronic device. The split-screen state of the electronic device affects a size of the display interface that is of the application and that is drawn by the electronic device and a position of the display interface on the screen.

Specifically, in response to detecting an operation of starting an application, the electronic device creates an activity corresponding to the application. Then, a Phone- Window instance is generated by using an attach( ) method in the activity. A DecroView is created in the PhoneWindow instance, and the screen parameter of the electronic device is obtained to determine sizes and positions (positions of four vertexes, namely, positions of upper, lower, left, and right borders) of the PhoneWindow and the DecroView. Then, a setContentView( ) method of a window is invoked to load a corresponding layout file, sizes and positions of each ViewGroup and each View in the DecroView are determined level by level from a root based on a hierarchical structure of a view tree in the layout file, and all the Views are drawn, to obtain a display interface of the application.

The following uses a scaling capability as an example to describe in detail how the developer designs the layout file including the View or the ViewGroup having the adaptive layout capability, and a method for implementing adaptive layout based on the layout file when the electronic device runs the application.

First, when developing the application, after adding dependency of the adaptive layout attribute package, the developer may set a View or a ViewGroup having the scaling capability on the display interface. Specifically, when editing the layout file of the display interface, the developer may set an attribute value related to the scaling capability of the View or the ViewGroup in the layout file (for example, an XML file), or set the attribute value related to the scaling capability of the View or the ViewGroup in a manner of adding an invoking interface in the Java source code file.

Table 1 shows an example of an extended attribute of the scaling capability (namely, a layout parameter related to the scaling capability) in this embodiment of this application.

TABLE 1

| Attribute | Attribute type | Application scope | Meaning |
|---|---|---|---|
| Scaling capability enabling | Boolean (Boolean) | Layout container | Scaling function enabling/disabling |
| Horizontal available space proportion | Fraction (fraction) | Layout parameter of a child control | Proportion of the child control in horizontal space of the layer container |
| Vertical available space proportion | Fraction | Layout parameter of a child control | Proportion of the child control in vertical space of the layer container |
| Maximum scaling width | Dimension (size) | Layout parameter of the child control | Maximum scaling size of the child control in a horizontal direction |
| Maximum scaling height | Dimension | Layout parameter of the child control | Maximum scaling size of the child control in the vertical direction |
| Minimum scaling width | Dimension | Layout parameter of the child control | Minimum scaling size of the child control in the horizontal direction |
| Minimum scaling height | Dimension | Layout parameter of the child control | Minimum scaling size of the child control in the vertical direction |
| Maximum width | Dimension | Layout container | Maximum size of the layout container in the horizontal direction, namely, a maximum scaling size of all child controls in the layout container in the horizontal direction |
| Maximum height | Dimension | Layout container | Maximum size of the layout container in the vertical direction, namely, a maximum scaling size of all the child controls in the layout container in the vertical direction |
| Minimum width | Dimension | Layout container | Minimum size of the layout container in the horizontal direction, namely, a minimum scaling size of all the child controls in the layout container in the horizontal direction |
| Minimum height | Dimension | Layout container | Minimum size of the layout container in the vertical direction, namely, a minimum scaling size of all the child controls in the layout container in the vertical direction |

It should be noted that, when setting an attribute of the layout container, the developer may enable a scaling capability of the layout container by using scaling capability enabling. Then, an available space proportions in the horizontal direction and an available space proportion in the vertical direction are set for a child control (namely, a View or a ViewGroup stored in the layout container) included in the layout container.

Subsequently, when running the application and drawing the child control, the electronic device scales the child control based on a size of the layout container, so that a scaled child control meets, as much as possible, the available space proportions that are in the horizontal direction and the vertical direction and that are set by the developer. In some examples, the scaled child control can meet both the available space proportions in the horizontal direction and the vertical direction. In some other examples, the scaled child control cannot meet both the available space proportions in the horizontal direction and the vertical direction. In this case, in a scaling process, the child control may be stopped scaling after the child control reaches an available space proportion in a direction.

Figure 11:
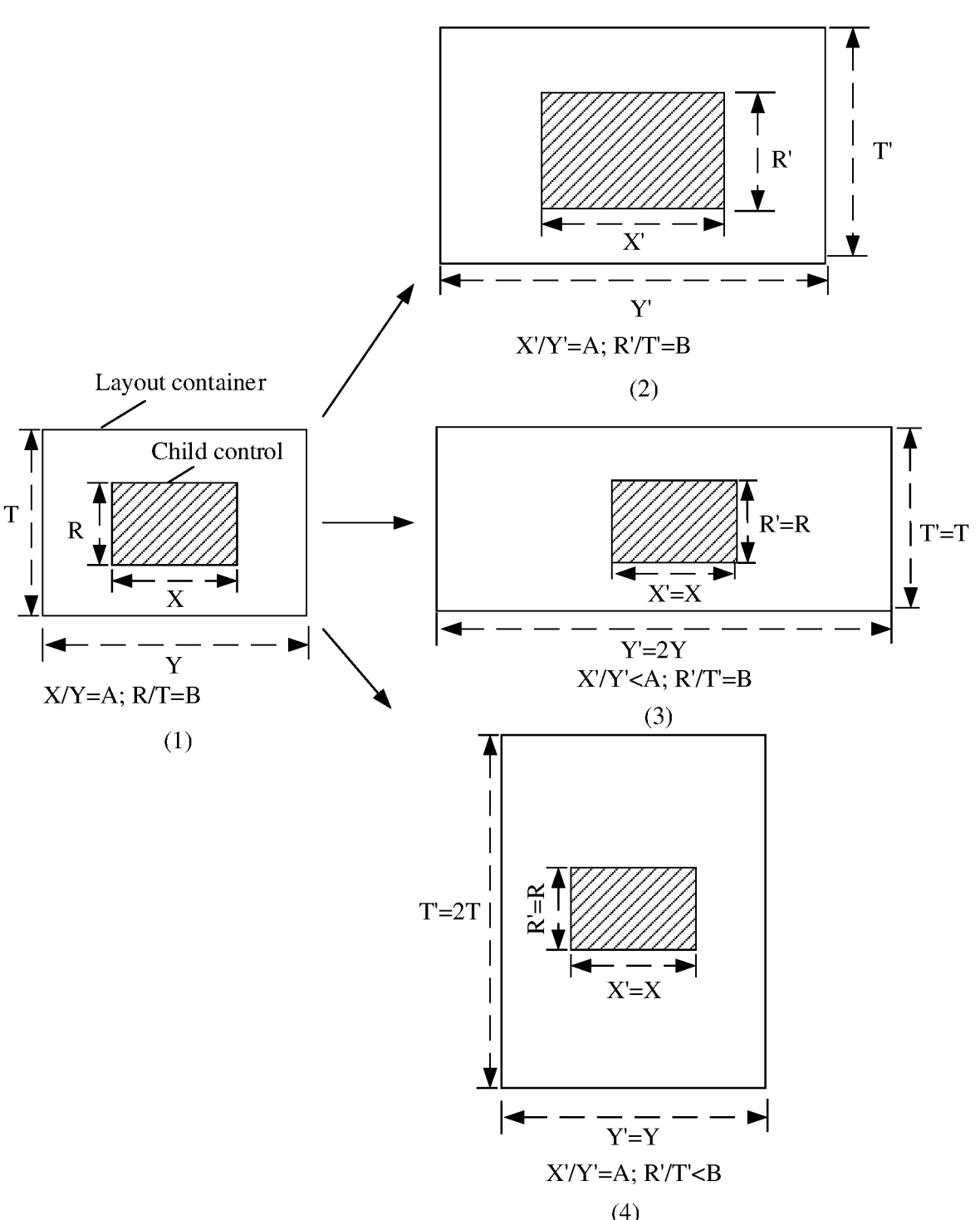
FIG. 11 is a schematic diagram 1 of a principle of a display interface layout method according to an embodiment of this application.

For example, as shown in (1) in FIG. 11, a proportion of the child control to the layout container in the horizontal direction (namely, the horizontal available space proportion) refers to a ratio of a width (X) of the child control to a total width (Y) of the layout container, namely, X/Y. A proportion of the child control to the layout container in the vertical direction (namely, the vertical available space proportion) refers to a ratio of a height (R) of the child control to a total height (T) of the layout container, namely, R/T.

When setting the attribute of the layout container, the developer may set an attribute value of scaling capability enabling to true. To be specific, the function item "scaling" is selected. Then, the horizontal available space proportion is set to A (that is, X/Y=A) for the child control, and the vertical available space proportion is set to B (that is, R/T=B) for the child control. In this case, when the size of the layout container changes, the child control in the layout container is scaled (an aspect ratio of the child control remains unchanged), until a ratio of a width of the scaled child control to a width of the changed layout container is A, and a ratio of a height of the scaled child control to a height of the changed layout container is B. For example, for the scaled child control, the width is X', and the height is R', and for the changed layout container, the width is Y', and the height is T. In this case, X'/Y'=A, and R'/T=B.

In some examples, the scaled child control cannot meet both that X'/Y'=A and that R'/T=B. In other words, the scaled child control meets that X'/Y'=A and that R'/T'<B. Alternatively, the scaled child control meets that X'/Y'<A and that R'/T'=B.

For example, the developer may set the scaling capability for the child control to the horizontal available space proportion (50%) and the vertical available control proportion (50%). As shown in (1) in FIG. 11, a size of the layout container on an electronic device 1 is 1080×540 (a width×a height, in a unit of a pixel), and a size of the child control is 540×270. In this case, both the horizontal available space proportion and the vertical available space proportion of the child control reach 50%.

As shown in (2) in FIG. 11, a size of the layout container on an electronic device 2 is 2160×1080 (in the unit of the pixel). In this case, a width and a height of the layout container on the electronic device 2 increase in direct proportion to those of the layout container on the electronic device 1. In this case, the child control is scaled in the horizontal available space proportion (50%) and the vertical available control proportion (50%). A size of the child control is calculated as 1080×540 (in the unit of the pixel).

As shown in (3) in FIG. 11, a size of the layout container on an electronic device 3 is 2160×540 (in the unit of the pixel) In this case, a height of the layout container on the electronic device 3 is the same as the height of the layout container on the electronic device 1, but a width increases. Because the vertical available space proportion of the child control has reached 50%, the child control is no longer scaled even if the horizontal available space proportion does not reach 50%. In other words, a size of the child control is still 540×270 (in the unit of the pixel).

As shown in (4) in FIG. 11, a size of the layout container on an electronic device 4 is 1080×1080 (in the unit of the pixel) In this case, a height of the layout container on the electronic device 4 is the same as the width of the layout container on the electronic device 1, but a height increases. Because the horizontal available space proportion of the child control has reached 50%, the child control is no longer scaled even if the vertical available space proportion does not reach 50%. In other words, a size of the child control is still 540×270 (in the unit of the pixel).

It can be learned that a scaling capability provided in this embodiment of this application can enable a control having the scaling capability to be adaptively scaled based on a change of a layout container, and ensure that an original shape of the control remains unchanged (that is, an aspect ratio remains unchanged). For example, the scaling capability may be set for a control of an image or a control that includes an image. The image may be deformed and distorted if the image is stretched in a single direction. This affects a display effect of the image. For another example, the scaling capability may be set for a button control having a rounded corner, to avoid loss of information about the rounded corner when the button control is stretched in a single direction.

In addition, different from a solution in which a width and a height of the image are simply scaled based on a same scaling ratio, to make a scaled width of the control the same as the width of the layout container, or make a scaled height of the control the same as the height of the layout container, this embodiment of this application provides a scaling capability of scaling a child control based on a horizontal available space proportion and a vertical available space proportion. In other words, when the child control is scaled, it can be ensured that a width and a height of the child control are in a specific proportion to a width and a height of the layout container. This ensures a stylish and aesthetic layout.

In still some other embodiments, in addition to setting the horizontal available space proportion and the vertical available space proportion of the child control, maximum and minimum values, for example, the maximum scaling width, the minimum scaling width, the maximum scaling height, and the minimum scaling height, may be further set for a size of the child control.

The maximum scaling width refers to a maximum value that the width of the scaled child control can reach. The minimum scaling width refers to a minimum value that the width of the scaled child control can reach. The maximum scaling height refers to a maximum value that the height of the scaled child control can reach. The minimum scaling height refers to a minimum value that the height of the scaled child control can reach. It should be noted that, in a process of scaling the child control, when the horizontal available space proportion and the vertical available space proportion conflict with the maximum and minimum values of the size, an actual scaling ratio of the child control may be determined based on the maximum and minimum values of the size. In still some examples, if the maximum and minimum values of the size of the child control are not set, a default value may be alternatively used. For example, the maximum scaling width is infinite by default. The minimum scaling width is o dp by default. The maximum scaling height is infinite by default. The minimum scaling height is o dp by default. Certainly, the default value may be alternatively another value. This is not limited in this embodiment of this application.

It should be noted that, when the child control is the View, when running the application, the electronic device scales the View based on an actual size of the layout container, the horizontal available space proportion, the vertical available space proportion, and the maximum and minimum values of the size, and displays the View. When the child control is the ViewGroup, when running the application, the electronic device scales the ViewGroup by using a same method. It should be noted that, for a View or a ViewGroup nested in the ViewGroup, an attribute corresponding to the View-Group is used for layout. For example, if enabling of scaling capability enabling is also set for the ViewGroup, a method corresponding to the scaling capability is used to draw the View or the ViewGroup nested in the ViewGroup. For another example, if enabling of scaling capability enabling is not set for the ViewGroup, the method corresponding to the scaling capability is not used to draw the View or the ViewGroup nested in the ViewGroup.

The following provides an example of a layout file (an XML file). A layout container whose scaling capability enabling is enabled is set in the layout file, and the layout container includes one child control (for example, an image control).

/*Example of Scaling of a Single Child Control*/

For ease of description, in this example, only the horizontal available space proportion is used as an example for description, a limitation of the vertical available space proportion on scaling of the child control 1 and the child control 2 is not considered, and height changes of the child control 1 and the child control 2 in a scaling process are not described.

Figure 12:
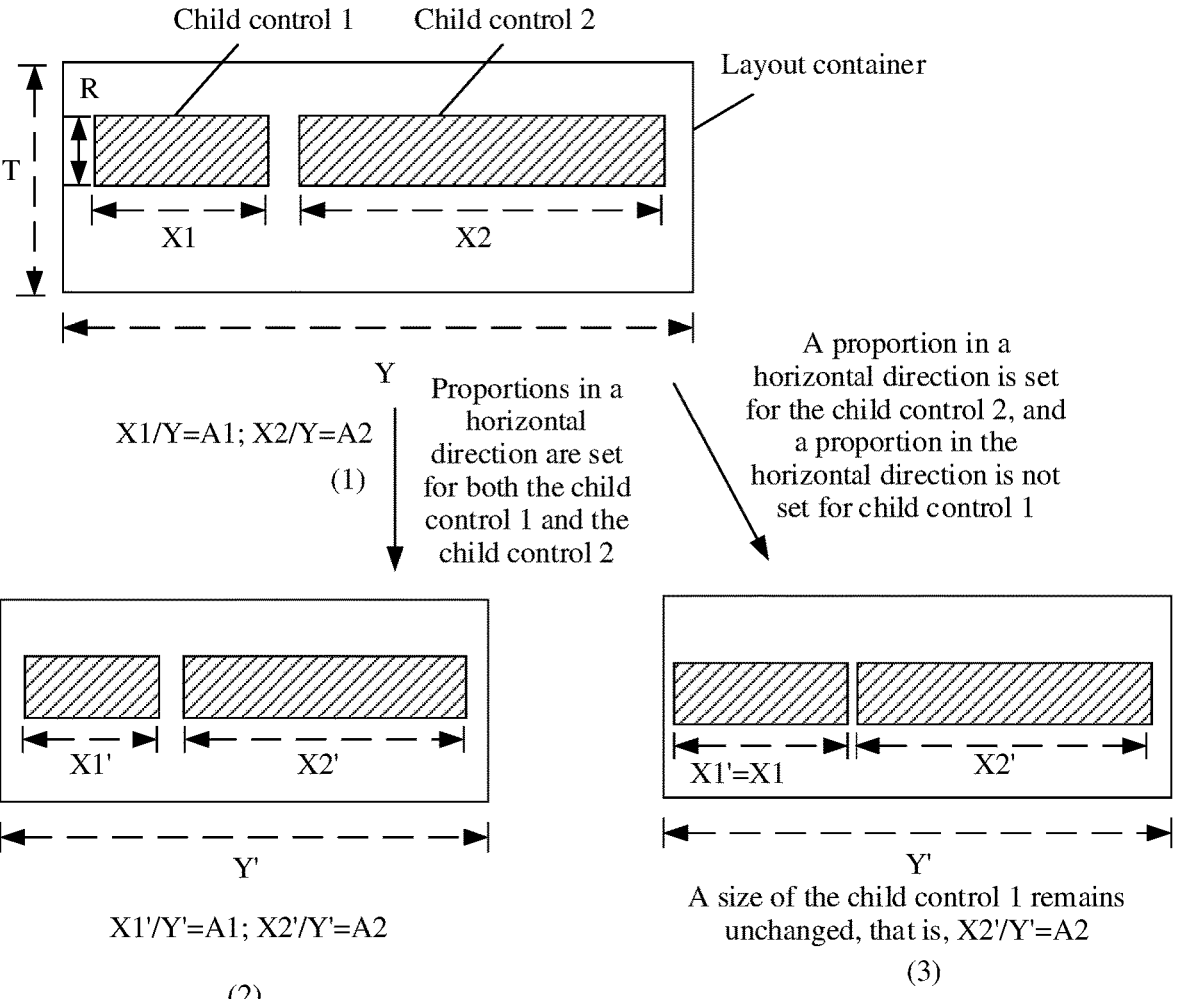
FIG. 12 is a schematic diagram 2 of a principle of a display interface layout method according to an embodiment of this application.

As shown in (2) in FIG. 12, if the developer sets a horizontal available space proportion (X1/Y=A1) and a vertical available space proportion of the child control 1, and sets a horizontal available space proportion and a vertical available space proportion (X2/Y=A2) of the child control 2, when the size of the layout container changes, the child control 1 and the child control 2 are separately scaled, by using the method described above, in the horizontal available space proportions and the vertical available control proportions that correspond to the child control 1 and the child control 2. After scaling, X1'/Y'=A1, and X2'/Y'=A2.

As shown in (3) in FIG. 12, if the developer sets the horizontal available space proportion and the vertical available space proportion (X2/Y=A2) of the child control 2, but does not set the horizontal available space proportion and the vertical available control proportion of the child control 1, when the size of the layout container changes, the child control 2 is scaled, by using the method described above, in the horizontal available space proportion and the vertical available control proportion that correspond to the child control 2. After scaling, X2'/Y'=A2. The child control 1 is not scaled. Certainly, the child control 1 may be alternatively set to have another adaptive layout capability, or have the Android native attribute value. In other words, the scaling capability set in this embodiment is not applied to the child control 1, and the child control 1 is drawn based on an attribute of the child control 1.

In some other embodiments, when the attribute of the layout container is set, the attribute value of scaling capability enabling is set to true. Alternatively, the available

```
          <com.huawei. Adaptive scaling layout
            xmlns:android="http://schemas.android.com/apk/res/android"
            xmlns:app="http://schemas.android.com/apk/res-auto"
            android:layout_height="match_parent"          //Android native attribute: set
a height of a layout
            android:layout_width="match_parent"           //Android native attribute: set
a width of the layout
            app:scaling capability enabling="true">       // //extended attribute: enable the
scaling capability of the layout container
                  <ImageView        //image control
            android:layout_width="wrap_content" //Android native attribute: set a height
of the control
            android:layout_height="wrap_content" //Android native attribute: set a width
of the control
            app:horizontal available space proportion="100%"   //extend attribute
            app:vertical available space proportion="100%"     //extend attribute
            app:maximum scaling width="400 dp"                         //extended
attribute
            app:maximum scaling height="400 dp"                        //extended
attribute
            app:minimum scaling width="100 dp"    //extended attribute
            app:minimum scaling height="100 dp"   //extended attribute
            android:src="@drawable/imageView" />
          </com.huawei. Adaptive scaling layout>
```

In the foregoing embodiment, an example in which the layout container includes one control (View or ViewGroup) is used for description. In some other embodiments, the layout container may include a plurality of controls (Views or ViewGroups).

For example, as shown in (1) in FIG. 12, the layout container includes a child control 1 and a child control 2. A size of the layout container on the electronic device 1 is Y×T.

space proportions in the horizontal direction and the vertical direction may not be set for the child control included in the layout container. In this case, both the horizontal available space proportion and the vertical available space proportion of the child control may be 100% by default. In other words, the child control in the layout container is scaled up or down equally proportionally based on a change of the layout container. In some examples, a scaled child control can satisfy that both the available space proportions in the horizontal direction and the vertical direction are 100%. In some examples, a scaled child control cannot satisfy that both the available space proportions in the horizontal direction and the vertical direction are 100%. In this case, in a scaling process, the child control may be stopped scaling after the child control reaches an available space proportion in a direction.

Figure 13:
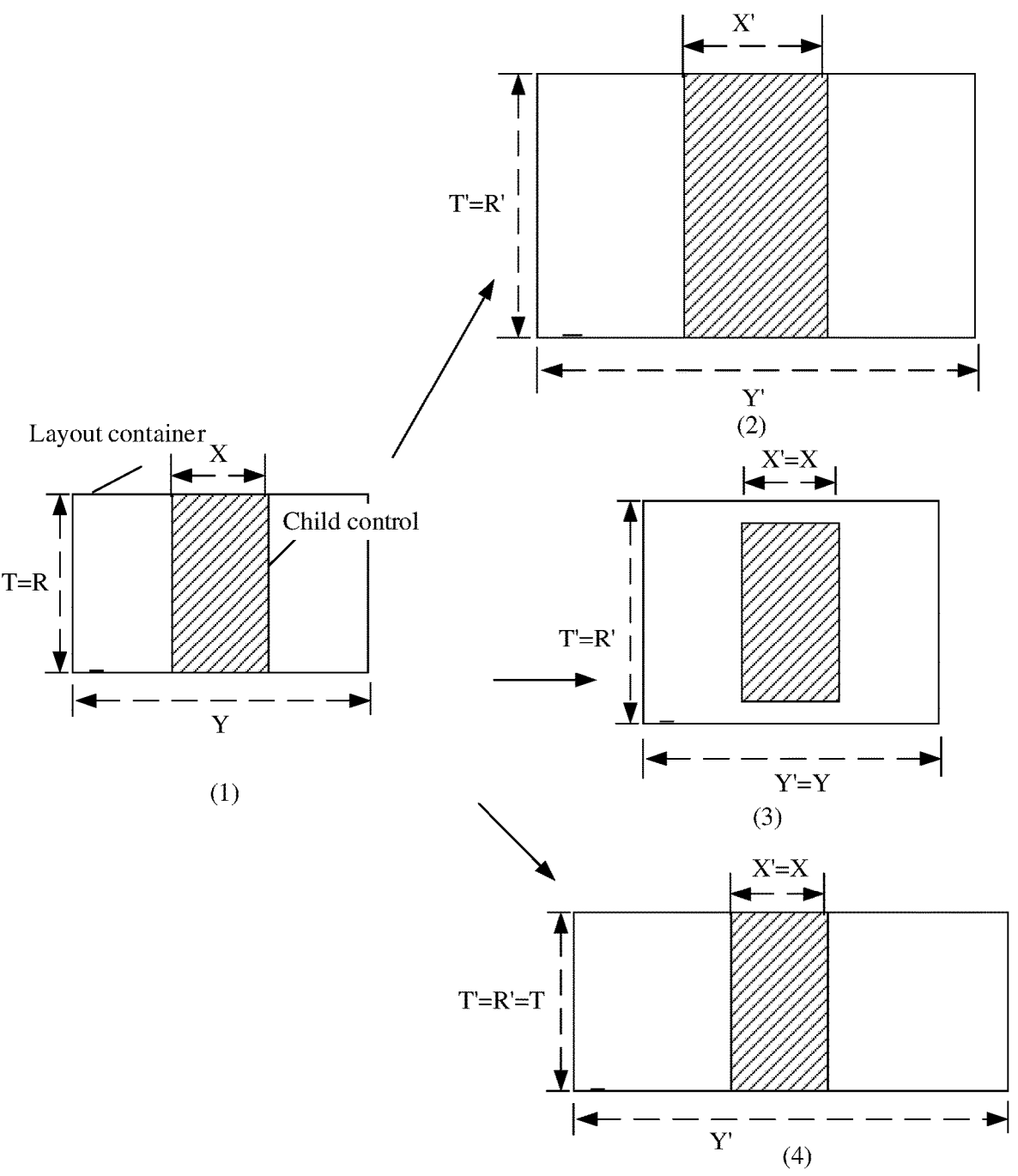
FIG. 13 is a schematic diagram 3 of a principle of a display interface layout method according to an embodiment of this application.

For example, as shown in (1) in FIG. 13, a layout container includes one child control. Scaling capability enabling of the layout container may be enabled, but a horizontal available space proportion and a vertical available space proportion are not set for the child control. In this case, both the horizontal available space proportion and the vertical available space proportion of the child control in the layout container on the electronic device 1 reach 100%.

As shown in (2) in FIG. 13, when a width and a height of the layout container on the electronic device 2 are in direct proportion to a width and a height of the layout container on the electronic device 1, when the child control is drawn on the electronic device 2, the child control is scaled. Both a horizontal available space proportion and a vertical available space proportion of a scaled child control reach 100%.

As shown in (3) in FIG. 13, when a width of the layout container on the electronic device 3 is the same as the width When the layout container includes a plurality of child controls, the horizontal available space proportion herein refers to a ratio of a sum of widths of all the child controls in the layout container and a spacing in a horizontal direction to a total width of the layout container. The vertical available space proportion herein refers to a ratio of a sum of heights of all the child controls in the layout container and a spacing in a vertical direction to a total height of the layout container.

In still some examples of this embodiment, maximum and minimum values of a size of the layout container may be further set. In other words, in an integral scaling process of all the child controls in the layout container, when the horizontal available space proportion and the vertical available space proportion conflict with the maximum and minimum values of the size of the layout container, an actual scaling ratio of all the child controls may be determined based on the maximum and minimum values of the size of the layout container.

The following provides an example of a layout file (an XML file). A layout container whose scaling capability enabling is enabled is set in the layout file, and the layout container includes two child controls (for example, two image controls).
/*Example of Integral Scaling of Child Controls in a Layout*/

```
<com.huawei. Adaptive scaling layout
    xmlns:android="http://schemas.android.com/apk/res/android"
    xmlns:app="http://schemas.android.com/apk/res-auto"
    android:layout_height="match_parent" //Android native attribute: set a height of
the layout
    android:layout_width="match_parent" //Android native attribute: set a width of
the layout
    app:scaling capability enabling="true" //extended attribute: enable the scaling
capability of the layout container
    app:maximum width="400 dp" //extended attribute: set the maximum width of
the layout container
    app:maximum height="400 dp" //extended attribute: set the maximum height of
the layout container
    app:minimum width="100 dp" //extended attribute: set the minimum width of
the layout container
    app:minimum height="100 dp"> //extended attribute: set the minimum height of
the layout container
        <ImageView//child control 1
        android:layout_width="wrap_content" //Android native attribute: set a width of
the child control 1
        android:layout height="wrap content" //Android native attribute: set a height
of the child control 1
        android:src="@drawable/imageView 1" />
        <ImageView//child control 2
        android:layout_width="wrap_content" //Android native attribute: set a width of
the child control 2
        android:layout_height="wrap_content" //Android native attribute: set a height
of the child control 2
        android:src-"@drawable/imageView 2" />
    </com.huawei. Adaptive scaling layout>
``` of the layout container on the electronic device 1, a height increases. However, because the horizontal available space proportion of the child control has reached 100%, the child control is no longer scaled even if there is space for scaling the height.

As shown in (4) in FIG. 13, when a height of the layout container on the electronic device 4 is the same as the height of the layout container on the electronic device 1, a width increases. However, because the vertical available space proportion of the child control has reached 100%, the child control is no longer scaled even if there is space for scaling the width.

The foregoing embodiment is a solution in which the developer designs adaptive layout of the display interface by setting the attribute value related to the scaling capability of the View or the ViewGroup in the layout file (for example, the XML file). The attribute value related to the scaling capability of the View or the ViewGroup may be alternatively set in the manner of adding the invoking interface in the Java source code file.

Table 2 shows an example of a corresponding interface for setting the attribute value related to the scaling capability of the View or the ViewGroup.

TABLE 2

| Qualifier and type | Name and description | Parameter description |
| --- | --- | --- |
| Public Boolean | Is layout scaling enabling ( ) Obtain status of scaling capability enabling of adaptive layout | Return an enabled/disabled state of scaling capability enabling |
| Public void | Set layout scaling enabling (Boolean isEnabled) Set the status of scaling capability enabling of adaptive layout | isEnabled: True: enabling enabled; false: enabling disabled |
| Public float | Get a horizontal available space proportion ( ) Obtain a horizontal scaling ratio of the child View in a LayoutParams inner class of adaptive layout | Return the horizontal scaling ratio of the child View |
| Public void | Set the horizontal available space proportion (float horizontalRatio) Set the horizontal scaling ratio of the child View in the LayoutParams inner class of adaptive layout | horizontalRatio: the horizontal scaling ratio of the child View |
| Public float | Get a vertical available space proportion ( ) Obtain a vertical scaling ratio of the child View in the LayoutParams inner class of adaptive layout | Return the vertical scaling ratio of the child View |
| Public void | Set the vertical available space proportion (float verticalRatio) Set the vertical scaling ratio of the child View in the LayoutParams inner class of adaptive layout | verticalRatio: the vertical scaling ratio of the child View Example value |
| . . . | . . . | . . . |

The meaning of the scaling capability is described in detail above. The developer may configure the layout file with reference to the scaling capability, another adaptive layout capability, and a basic layout capability (for example, the Android native attribute) based on a layout design of each display interface in the application, pack the layout file and other source code and a resource of the application into an installation package (for example, an APK file), and release the installation package to AppGallery. The electronic device downloads the installation package from App-Gallery, and installs the application.

The following describes in detail a solution of how to implement adaptive layout based on the foregoing layout file when the electronic device runs the application.

Figure 14:
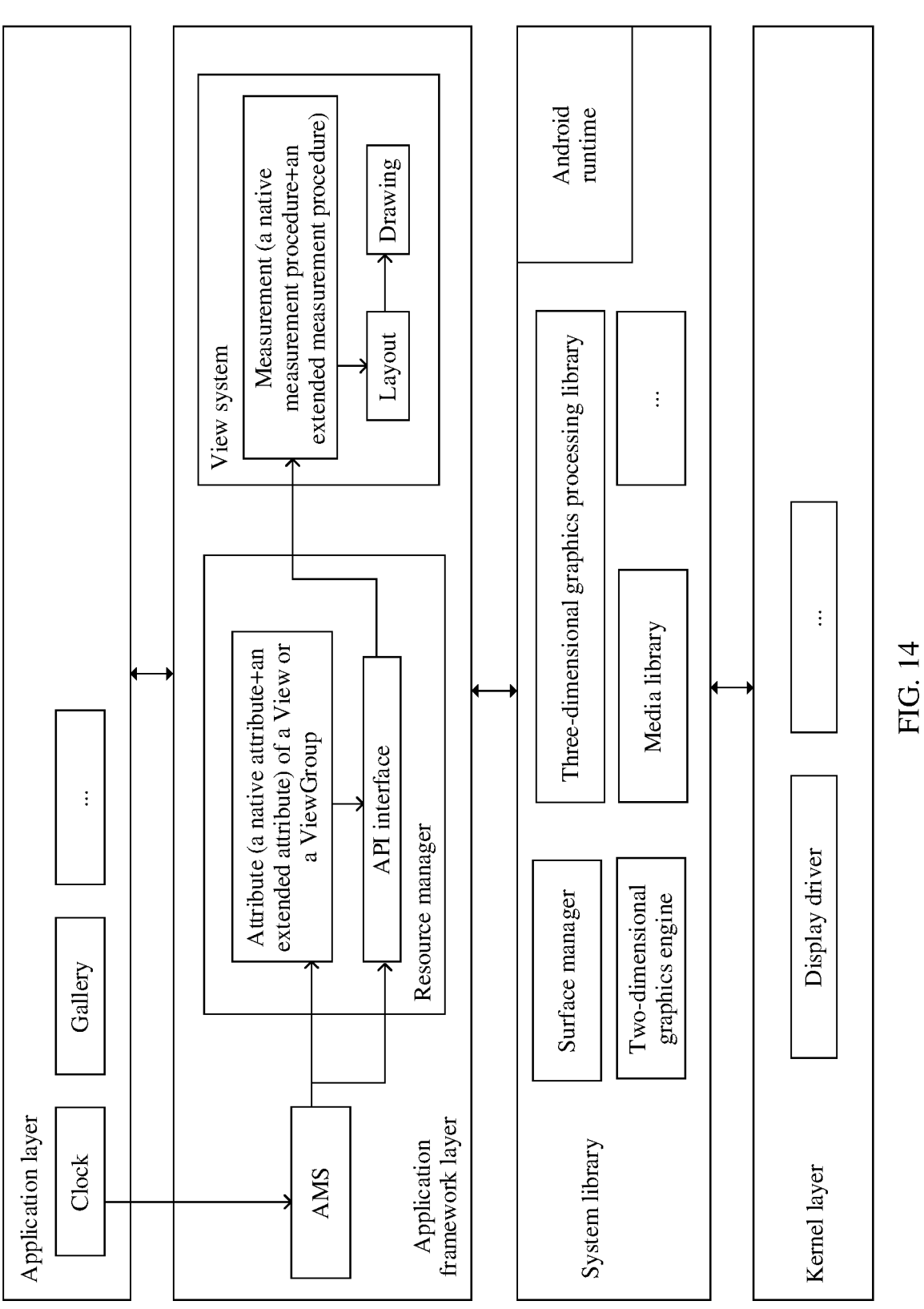
FIG. 14 is a schematic diagram 4 of a principle of a display interface layout method according to an embodiment of this application.

For example, FIG. 14 is a block diagram of a software structure of the electronic device according to an embodiment of the present invention.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages. As shown in FIG. 14, the application layer may include a gallery application, a clock application, and the like. It should be noted that the gallery application or the clock application herein is an application installed by using the foregoing application installation package. To be specific, a layout file corresponding to the gallery application, the clock application, or the like includes a View or a ViewGroup for which the foregoing adaptive layout capability is set.

The application framework layer provides an application programming interface (application programming interface, API) and a programming framework for an application at the application layer. The application framework layer includes some predefined functions. As shown in FIG. 14, the application framework layer may include an activity manager system (Activity Manager System, AMS), a resource manager (Resource Manager), a window manager system (Window Manager System, WMS) (not shown in the figure), and a view system (View System).

The AMS is used to control all aspects of an application life cycle and an activity stack. The resource manager is used to provide access to a non-code embedded resource, for example, a character string, a color setting, and a user interface layout. The WMS is used to obtain a size of a display, determine whether there is a status bar, perform screen locking, take a screenshot, and the like. The view system is used to provide a view set for creating an application user interface.

Specifically, still as shown in FIG. 14, after an application (for example, a clock application) is started, the AMS responds to a tap (Touch) event, and starts a main activity. In the main activity, an attribute value of a View or a ViewGroup included in a display interface is read from the resource manager by using an inflate procedure in setContentView. In some examples, a layout file is first read in the resource manager, and then a corresponding interface is invoked by using the layout file, to write attribute values of each View and ViewGroup included in the display interface. In some other examples, an interface may be alternatively directly invoked in the resource manager, to write the attribute values of each View and ViewGroup included in the display interface. It should be noted that the attribute values of the View and the ViewGroup herein include an Android native attribute value and an attribute value related to an extended adaptive layout capability in this application. Then, a window drawing procedure of the view system is entered, and drawing of the display interface is completed by using three procedures: measurement (Measure), layout (Layout), and drawing (Draw). The measurement procedure includes a measurement procedure of an Android element and an extended measurement procedure related to the adaptive layout capability in this application.

The Android runtime includes a kernel library and a virtual machine. The Android runtime is responsible for scheduling and management of the Android system.

The kernel library includes two parts: a function that needs to be called in a Java language, and a kernel library of Android.

The application layer and the application framework layer run on the virtual machine. The virtual machine executes Java files at the application layer and the application framework layer as binary files. The virtual machine is used to perform functions such as object lifecycle management, stack management, thread management, security and exception management, and garbage collection.

The system library may include a plurality of function modules, for example, a surface manager (surface manager), a media library (media library), a three-dimensional graphics processing library (for example, an OpenGL ES), and a 2D graphics engine (for example, an SGL).

The surface manager is used to manage a display subsystem and provide fusion of 2D and 3D layers for a plurality of applications. The media library supports playback and recording in a plurality of frequently used audio and video formats, a static image file, and the like. The media library may support a plurality of audio and video encoding formats, for example, MPEG-4, H.264, MP3, AAC, AMR, JPG, and PNG. The three-dimensional graphics processing library is used to implement three-dimensional graphics drawing, image rendering, composition, layer processing, and the like. The 2D graphics engine is a drawing engine for 2D drawing.

The kernel layer is a layer between hardware and software. The kernel layer includes at least a display driver and the like.

After the foregoing application is installed on the electronic device, the electronic device may store, in the memory, a layout file of each display interface of the application. When the electronic device detects an operation of running the application, the electronic device may start the application, and start to draw the display interface of the application based on the layout file of each display interface.

An example in which an electronic device using an Android system runs the clock application is still used for description.

Figure 15A:
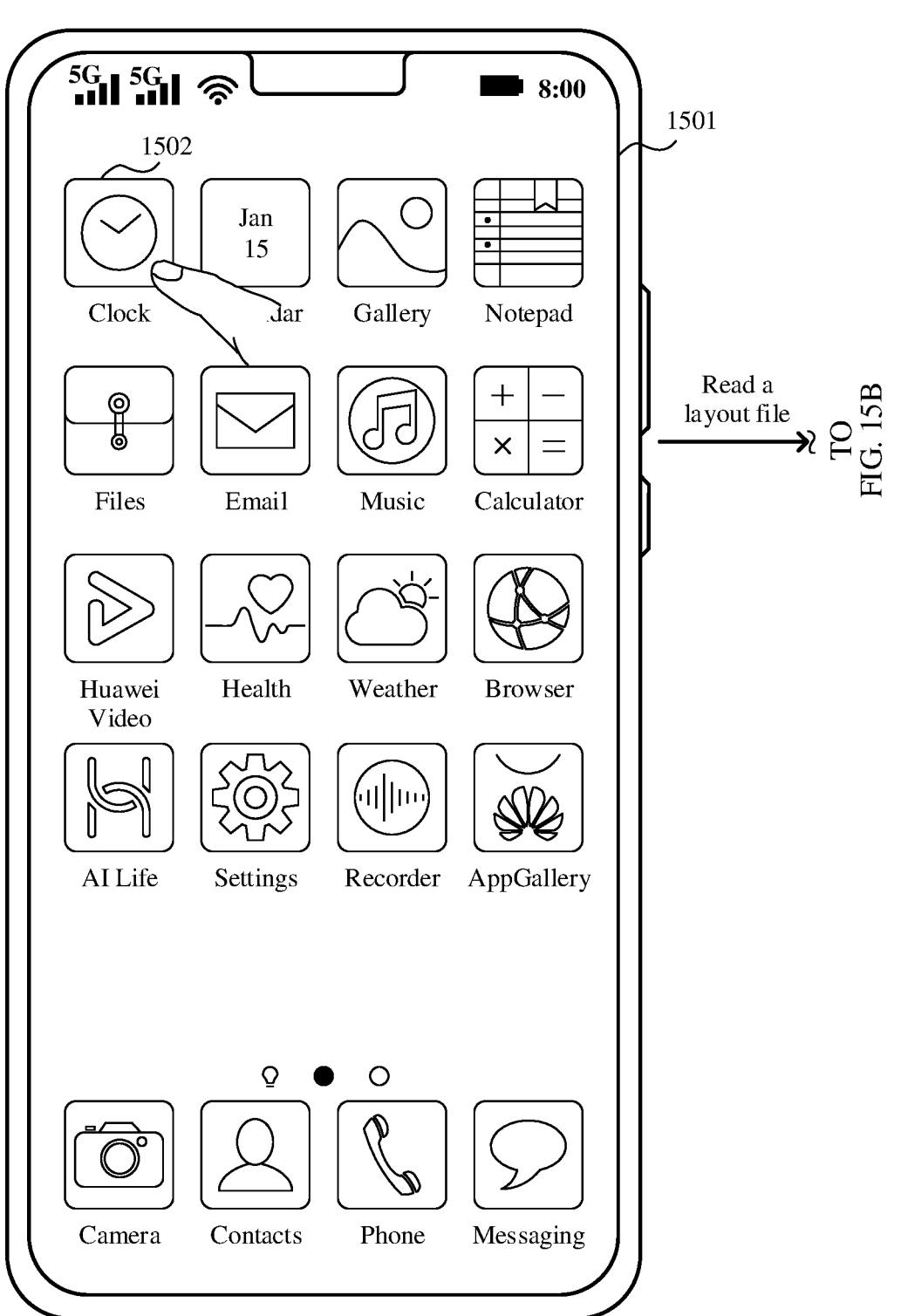
FIG. 15A and FIG. 15B are a schematic diagram 5 of application of a display interface layout method according to an embodiment of this application.
Figure 15B:
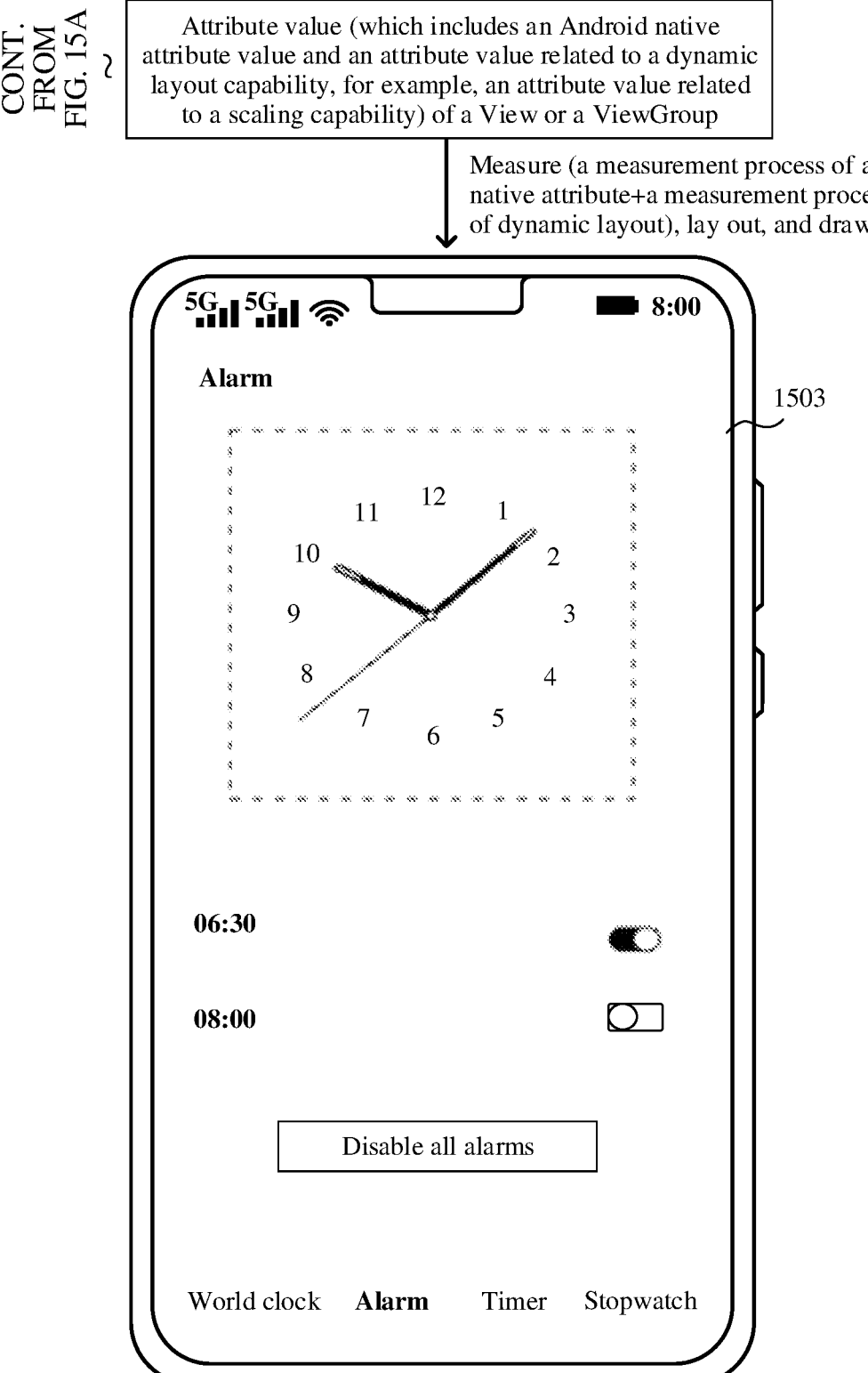

Refer to FIG. 15A and FIG. 15B. A display interface 1501 is a home screen interface displayed by the electronic device (for example, specifically a mobile phone). In response to an operation of detecting that a user operates an icon 1502 of the clock application on the display interface 1501, the mobile phone starts the clock application, and draws a home page 1503 of the clock application. The home page of the clock application may be understood as the first interface displayed after the clock application is run.

It should be further noted that an example in which the application is started to display the home page is used for description herein. After the application is started, in response to a user operation, the method provided in this application is also applicable when the mobile phone displays another interface (not the home page).

Specifically, after the clock application is started, the mobile phone starts a main activity, and reads a layout file of the clock application in the main activity by using an inflate procedure in setContentView. The layout file includes a View and a ViewGroup that are included in each display interface of the clock application (for example, the home page of the clock application), a hierarchical structure of these Views and ViewGroups, and attributes of these Views and ViewGroups. The mobile phone invokes a corresponding interface to write each attribute value of these Views and ViewGroups. It should be noted that the attributes of these Views and ViewGroups herein include an Android native attribute and an attribute related to an extended adaptive layout capability in this embodiment of this application. Then, the mobile phone enters a window drawing procedure, and completes drawing of the display interface by using three procedures: measurement (Measure), layout (Layout), and drawing (Draw).

The foregoing measurement is used to calculate an actual size of the View. Starting with a performMeasure method, a MeasureSpec parameter is included. MeasureSpec indicates a 32-bit integer. The most significant two bits indicate a measurement mode (SpecMode), and the least significant 30 bits indicate a specification size (SpecSize) in a measurement mode. In other words, MeasureSpec is used to describe how to measure this View. The foregoing layout is used to determine a position of the View in a parent layout container. This is implemented after the parent layout container obtains a position parameter of a child View, invokes a layout method of the child View, and transfers the position parameter. The foregoing draw is used to draw a control, starting from a performDraw method. For layout and drawing processes, refer to related content in the conventional technology. Details are not described herein again.

It should be noted that MeasureSpec of DecorView is determined based on both a window size and a layout parameter (LayoutParams), and MeasureSpec of a common View is determined based on both MeasureSpec of a layout container in which the View is located (namely, a parent layout container) and LayoutParams.

In this embodiment of this application, the window size is determined based on a screen parameter of the mobile phone. The screen parameter includes a size and resolution of a screen and a current status of the screen. The current status of the screen includes whether the screen is in a landscape state or a portrait state. If the screen is a foldable screen, the screen is in a folded state, a half-folded state, an unfolded state, or the like. If the screen supports screen splitting, a size of a window displayed by a current application.

LayoutParams of each of the View and the ViewGroup includes a native attribute of the Android system, an attribute related to the extended adaptive layout capability in this embodiment of this application (for example, an attribute related to a scaling capability), and the like. Therefore, in a measurement process, the mobile phone needs to perform measurement based on the native attributes of the Android system of the View and the ViewGroup in the layout file, and further needs to perform measurement based on the attribute related to the adaptive layout capabilities of the View and the ViewGroup in the layout file. For a process in which the mobile phone performs measurement based on the native attributes of the Android system of the View and the ViewGroup in the layout file, refer to related content in the conventional technology. Details are not described herein again. A process in which the mobile phone performs measurement based on the attributes related to the adaptive layout capabilities of the View and the ViewGroup in the layout file is described herein.

It should be noted that the scaling capability is used as an example for description herein. In the scaling capability, the measurement process involves performing measurement (measurement procedures in FIG. 16 to FIG. 18) based on the attribute related to the extended scaling capability, and the conventional technology may be used in both the layout and drawing processes. However, in another capability (for example, a wrap capability), the layout process further involves performing layout based on an attribute related to an extended capability, and the conventional technology may be used in the drawing process.

Figure 16:
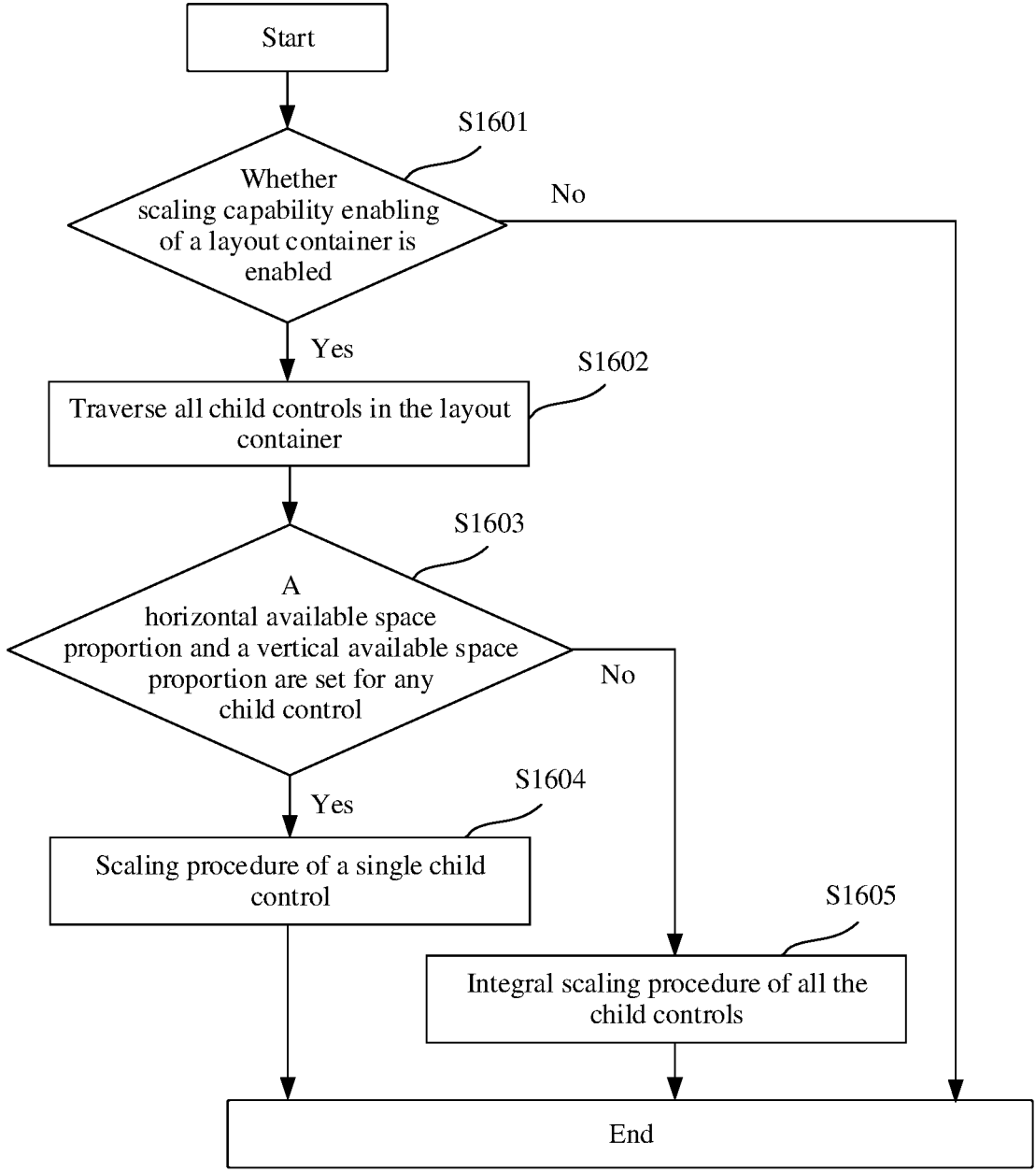
FIG. 16 is a schematic flowchart 2 of a display interface layout method according to an embodiment of this application.

Specifically, the mobile phone performs a measurement procedure shown in FIG. 16 for each layout container in the layout file. The method specifically includes the following steps.

S1601: Determine, based on a layout parameter of the layout container, whether scaling capability enabling of the layout container is enabled. If scaling capability enabling is enabled, step S1602 continues to be performed. Otherwise, the measurement procedure for the layout container for which the scaling capability is configured ends.

The layout container may be alternatively any ViewGroup for which the adaptive layout capability is set and that is in a ContentView. For example, the layout control may be a ViewGroup 1, a ViewGroup 2, or a ViewGroup 3.

S1602: Traverse all child controls in the layout container to obtain a layout parameter of each child control.

S1603: If a horizontal available space proportion and a vertical available space proportion are configured for any child control in the layout container, perform a scaling process of a single child control, that is, perform step S1604. If no horizontal available space proportion and vertical available space proportion are configured for all the child controls in the layout container, an integral scaling procedure of all the child controls is performed, that is, step S1605 is performed.

All the child controls in the layout container include a View or a ViewGroup of the layout in the layout container. It should be noted that all the child controls in the layout container do not include a child control (a View or a ViewGroup) nested in the ViewGroup in the layout container. For example, if the layout control is the ViewGroup 1, the ViewGroup 1 includes child controls: the ViewGroup 2, the ViewGroup 3, and a View 7, and does not include a View 3, a View 4, a View 5, and a View 6.

S1604: Perform a scaling procedure of a single child control.

In other words, scaling is performed, based on the specified horizontal available space proportion and vertical available space proportion, on each child control for which the horizontal available space proportion and the vertical available space proportion are set, and scaling is not performed on the child control for which the horizontal available space proportion and the vertical available space proportion are not set.

Then, the measurement procedure for the layout container for which the scaling capability is configured ends.

S1605: Perform the integral scaling process of all the child controls.

In other words, scaling is performed, based on a horizontal available space proportion of 100% and a vertical available space proportion of 100%, on all the child controls in the layout container.

Figure 17A:
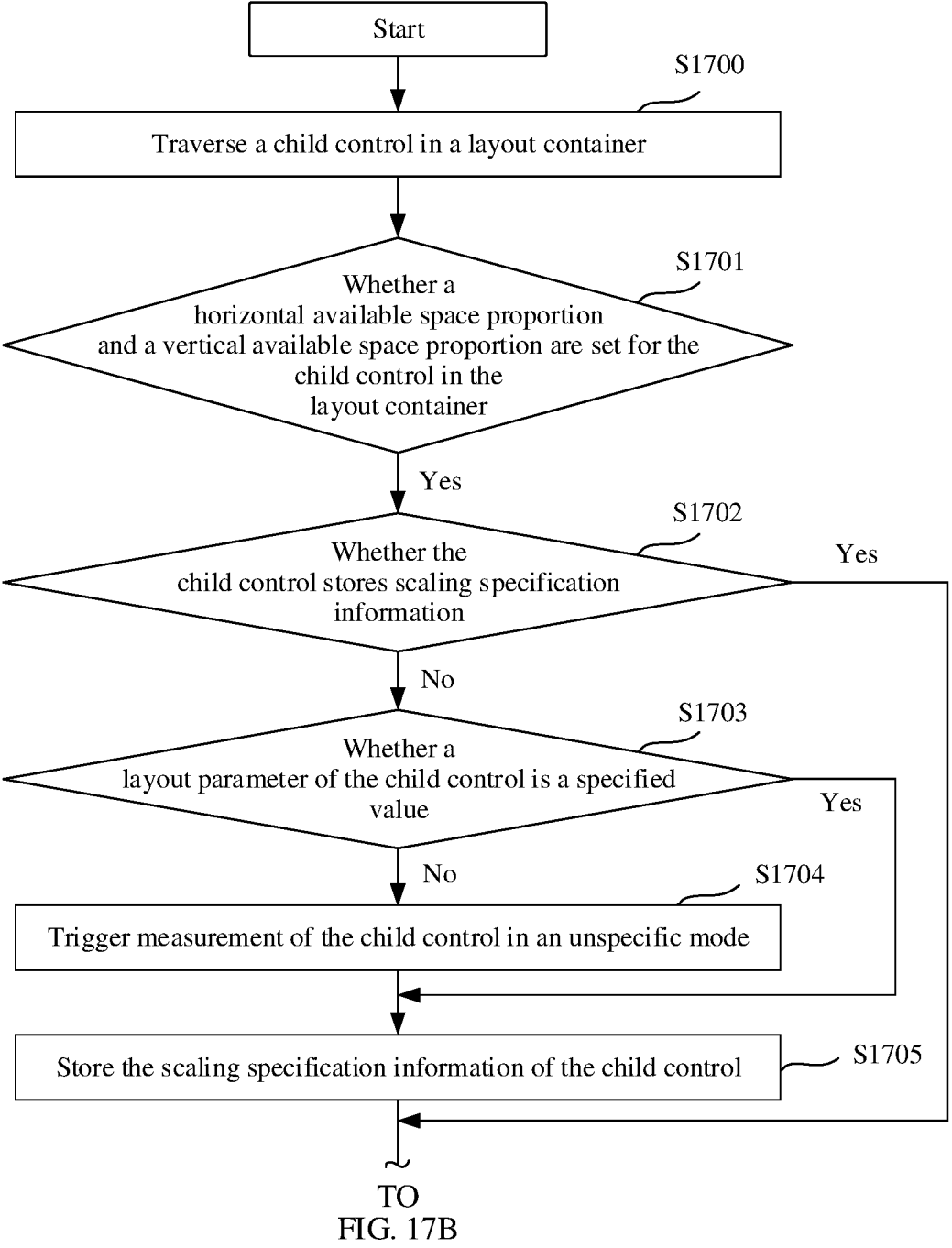

As shown in FIG. 17A and FIG. 17B, step S1604 includes step S1700 to step S1709, specifically including the following content.

S1700: Traverse the child control in the layout container.

S1701: Whether the horizontal available space proportion and the vertical available space proportion are set for the child control in the layout container. If the horizontal available space proportion and the vertical available space proportion are configured, step S1702 is performed. Otherwise, this procedure ends.

In some examples, if the horizontal available space proportion and the vertical available space proportion are configured for the child control in the layout container, a first flag bit may be set for the child control, to indicate that the scaling procedure of the single child control needs to be performed on the child control.

S1702: Whether the child control stores scaling specification information. If the scaling specification information is stored, step S1706 is performed. If the scaling specification information is not stored, step S1703 is performed.

The scaling specification information of the child control includes information such as a width, a height, an inner margin, and an outer margin of the child control. The width and the height of the child control may be an original width and height of the child control that are set by a developer. The inner margin refers to a distance between content (for example, a text or an image) of the child control and each border of the child control. The outer margin refers to a distance between the border of the child control and each border of the layout container.

It should be noted that, in this case, the scaling specification information of the child control may be an initial scaling specification of the child control obtained after preliminary measurement is performed based on an Android native attribute value configured in the layout file.

S1703: Determine whether the layout parameter of the child control is a specified value. If the layout parameter is the specified value, it is determined that the layout parameter of the child control is the scaling specification information of the child control, and step S1705 is performed. If the layout parameter is not the specified value, step S1704 is performed.

If the layout parameter (for example, the width and the height of the child control) of the child control is set to wrap_content or match_parent in the layout file, it is determined that the layout parameter of the child control is not the specified value. If the layout parameter (for example, the width and the height of the child control) of the child control is set to a specific value in the layout file, it is determined that the layout parameter of the child control is the specified value.

S1704: Trigger measurement of the child control in an unspecific (UNSPECIFIC) mode.

If the layout parameter (for example, the width and the height of the child control) of the child control is not set to the specified value in the layout file, measurement in the unspecific mode is triggered. Measurement in the unspecific mode means that a parent layout container does not limit a size of the child control, so that an original size of the child control can be obtained. In other words, the original size of the child control is subsequently scaled, to ensure that the content in the child control is not deformed and distorted.

S1705: Store the scaling specification information of the child control.

S1706: Calculate a size of available space of the layout container based on the specified horizontal available space proportion and vertical available space proportion of the child control.

The size of the layout container is determined based on the parent layout container of the layout container and the layout parameter of the layout container, and then the size of the available space of the layout container is calculated based on the specified horizontal available space proportion and vertical available space proportion of the child control.

S1707: Calculate a scaling ratio of the child control based on the size of the available space of the layout container and the scaling specification information of the child control.

In this case, a problem of a conflict between the horizontal available space proportion and the vertical available space proportion needs to be resolved. For a specific calculation method, refer to the foregoing descriptions.

S1708: Adjust the scaling ratio of the child control based on specified maximum and minimum scaling values of the child control.

The maximum and minimum scaling values of the child control include a maximum scaling width, a minimum scaling width, a maximum scaling height, a minimum scaling height, and the like.

S1709: Re-trigger measurement of the child control based on an adjusted scaling ratio.

To be specific, the specification information such as the width, the height, the inner margin, and the outer margin of the child control is re-determined based on the adjusted scaling ratio.

Figure 18:
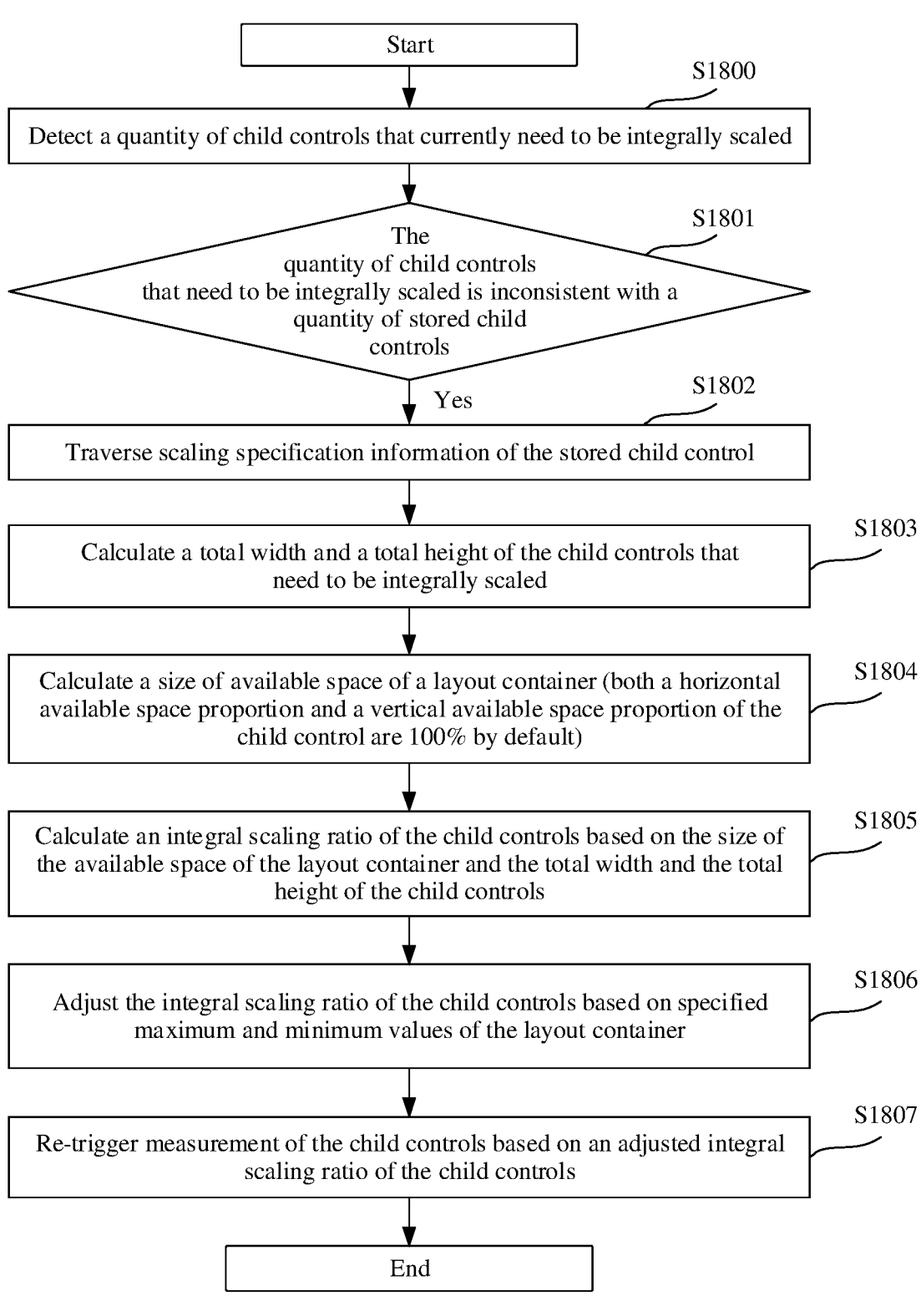
FIG. 18 is a schematic flowchart 4 of a display interface layout method according to an embodiment of this application.

As shown in FIG. 18, step S1605 includes step S1800 to step S1807, specifically including the following content.

S1800: Detect a quantity of child controls that currently need to be integrally scaled.

S1801: Determine whether the quantity of child controls that need to be integrally scaled is inconsistent with a quantity of stored child controls. If the quantities are inconsistent, a second flag bit may be set to mark that the quantity of the child controls that need to be integrally scaled is inconsistent with the quantity of stored child controls.

S1802: Traverse scaling specification information of the stored child control.

S1803: Calculate, based on the scaling specification information of the child controls, a total width and a total height of the child controls that needs to be integrally scaled.

The scaling specification information of the child control includes the information such as the width, the height, the inner margin, and the outer margin of the child control. The total width of the child controls that need to be integrally scaled is a sum of the widths of the child controls that need to be integrally scaled plus a sum of outer margins in a horizontal direction. The total height of the child controls that need to be integrally scaled is a sum of the heights of the child controls that need to be integrally scaled plus a sum of outer margins in a vertical direction.

S1804: Calculate the size of the available space of the layout container.

The size of the layout container is determined based on the parent layout container of the layout container and the layout parameter of the layout container, and then the size of the available space of the layout container is calculated based on the specified horizontal available space proportion (100% by default) and vertical available space proportion (100% by default) of the child control.

S1805: Calculate an integral scaling ratio of the child controls based on the size of the available space of the layout container and the total width and the total height of the child controls.

In this case, the problem of the conflict between the horizontal available space proportion and the vertical available space proportion needs to be resolved. For the specific calculation method, refer to the foregoing descriptions.

S1806: Adjust the integral scaling ratio of the child controls based on specified maximum and minimum values of the layout container.

The maximum and minimum values of the layout container include a maximum width, a minimum width, a maximum height, a minimum height, and the like of the layout container.

S1807: Re-trigger measurement of the child controls based on an adjusted integral scaling ratio of the child controls.

To be specific, the specification information such as a width, a height, an inner margin, and an outer margin of each child control is re-determined based on the adjusted integral scaling ratio of the child controls.

In conclusion, in an application development phase, a developer of the application sets, in a layout file, an attribute of an adaptive layout capability (for example, the scaling capability) for a View and a ViewGroup on a display interface. After the application is installed on electronic devices having different screen parameters, the electronic devices may adaptively scale the View and the ViewGroup with reference to the screen parameters of the electronic devices based on the attribute of the adaptive layout capabilities (for example, the scaling capability) of the View and the ViewGroup in the layout file, to implement adaptive layout of the display interface. In this way, the developer only needs to design one set of layout files, to meet display requirements of the electronic devices having the different screen parameters. This helps reduce development costs and maintenance costs of the developer.

In addition, compared with a solution in which an application installation package needs to carry a plurality of sets of layout files, this solution in which the application installation package carries one set of layout files helps improve traffic costs and time costs of downloading the application installation package by the electronic device. In addition, after the application is installed on the electronic device, the electronic device does not need to store another redundant layout file. This improves utilization of storage space of the electronic device.

To better understand an effect of adaptive layout implemented by the scaling capability in this embodiment of this application, an example in which electronic devices having different screen parameters run a clock application is used for description herein. In a layout file of the clock application, a scaling capability is enabled for a layout container in which a clock control is located, an aspect ratio of the clock control is 1:1, and the clock control has a horizontal available space proportion being a value P (for example, 80%), and a vertical available space proportion being a value Q (for example, 50%).

Figure 19A:
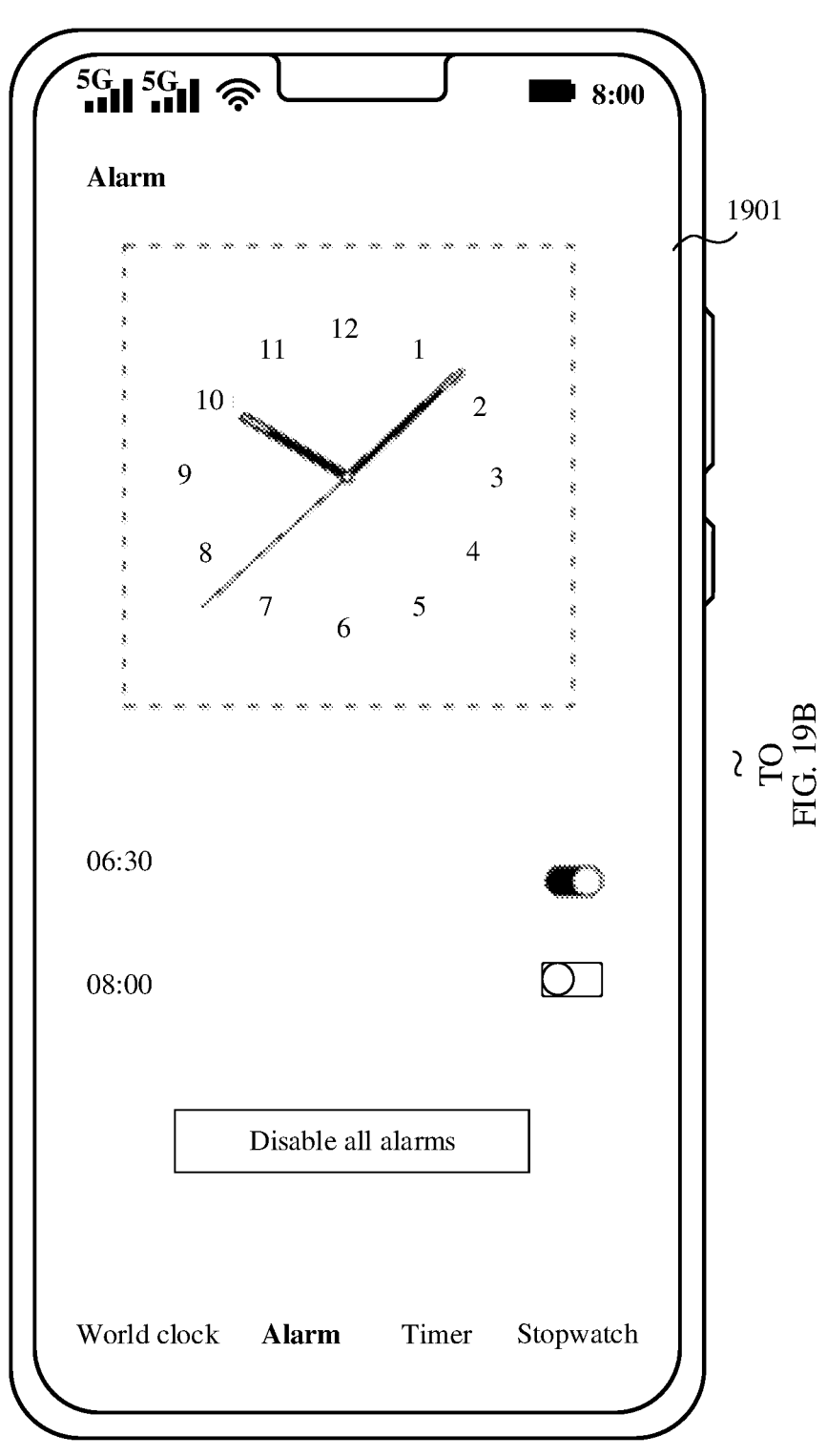
FIG. 19A and FIG. 19B are a schematic diagram 6 of application of a display interface layout method according to an embodiment of this application.
Figures 19A, 19B:
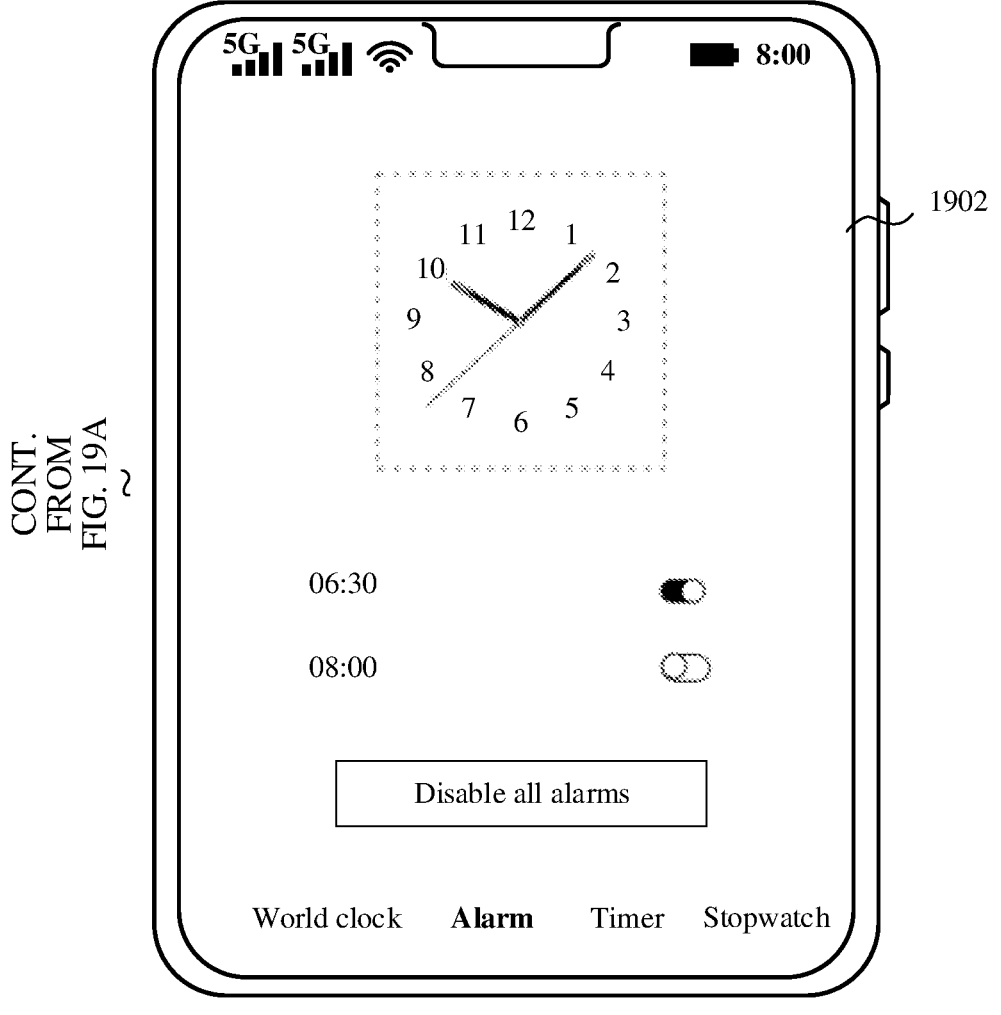

Refer to FIG. 19A and FIG. 19B. A screen size of a mobile phone 1 is 720×1280 (a width×a height, in a unit of a pixel). In this case, a size of the clock control being 576×576 (in the unit of the pixel), for example, an interface 1901 displayed by the mobile phone 1 in FIG. 19A and FIG. 19B, is obtained through calculation based on the horizontal available space proportion being the value P (for example, 80%) and the vertical available space proportion being the value Q (for example, 50%) of the clock control, and the aspect ratio of the clock control.

A screen size of a mobile phone 2 is 720×860 (in the unit of the pixel). In this case, the size of the clock control being 430×430 (in the unit of the pixel), for example, an interface 1902 displayed by the mobile phone 2 in FIG. 19A and FIG. 19B, is obtained through calculation based on the horizontal available space proportion being the value P (for example, 80%) and the vertical available space proportion being the value Q (for example, 50%) of the clock control, and the aspect ratio of the clock control.

It can be learned that, for a same layout file, different display interfaces are obtained after drawing by mobile phones having different screen parameters, and an original shape (an aspect ratio) of a control is maintained.

As described above, the plurality of extended adaptive layout capabilities in embodiments of this application may be used in combination with each other. Several examples of combinations of the scaling capability with another adaptive layout capability are provided herein.

Example 1: Scaling+Stretch+Hiding

A playing interface of a music application is used as an example for description.

Figure 20:
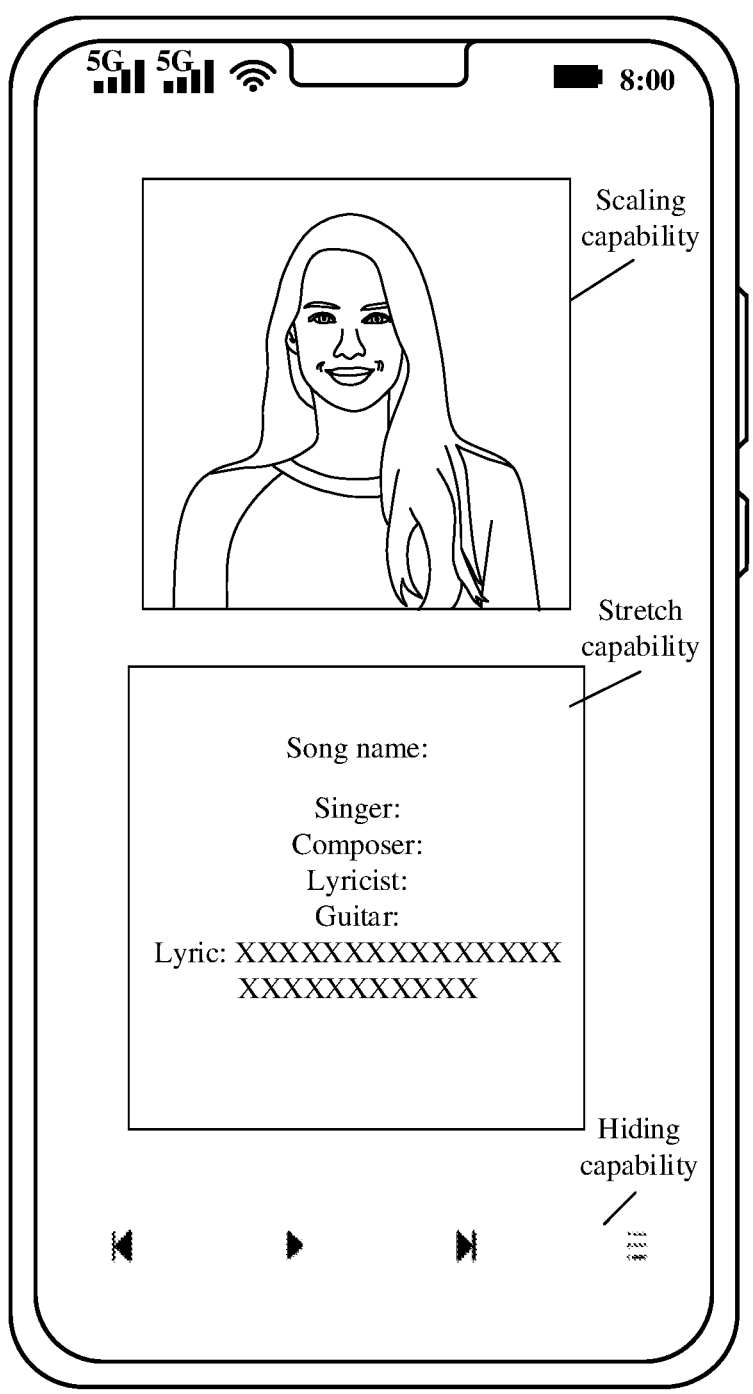
FIG. 20(1) and FIG. 20(2) are a schematic diagram 7 of application of a display interface layout method according to an embodiment of this application.
Figure 20:
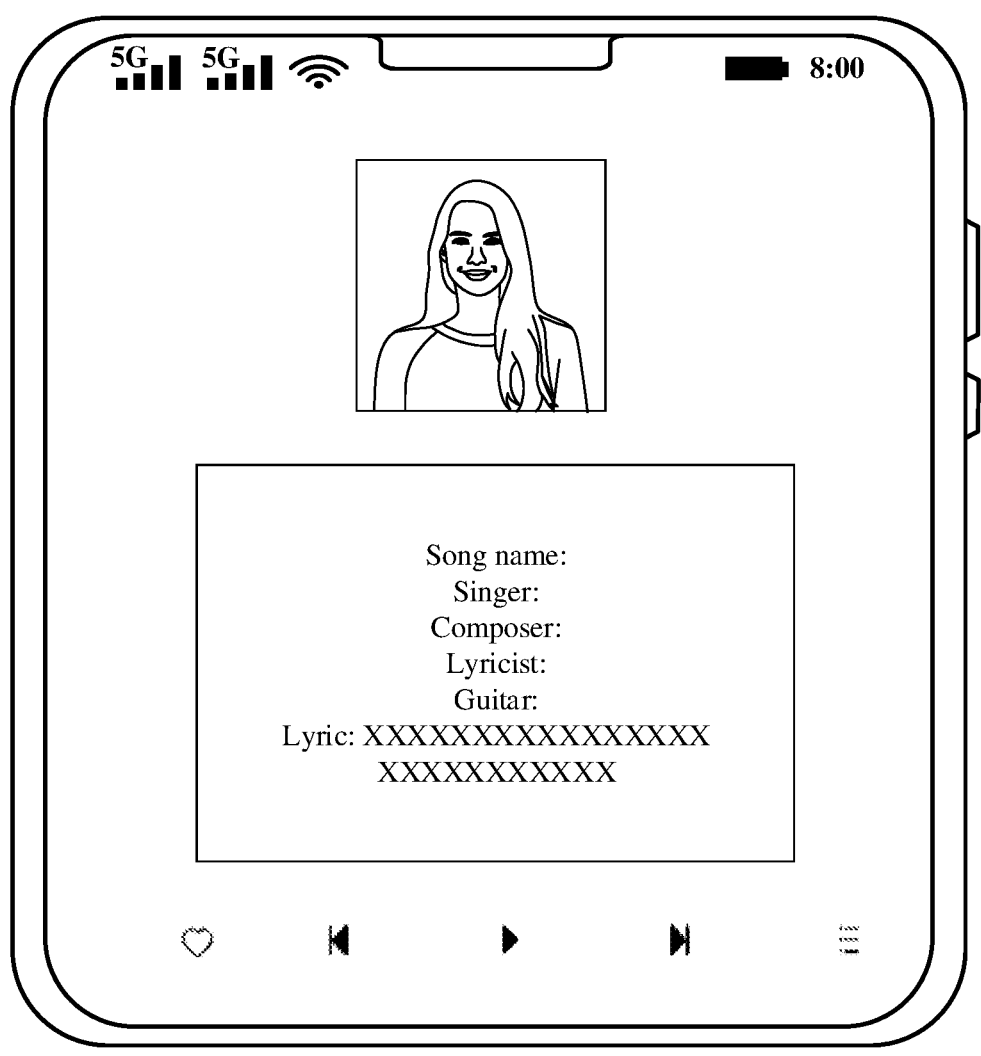

FIG. 20(1) shows a playing interface displayed when the mobile phone runs the music application. The music application includes an image control (for displaying an album cover), a text control (for displaying song information), and button controls (a previous control, a play control, a next control, and a playlist control). A scaling capability is set for the image control (both a horizontal available space proportion and a vertical available space proportion are set), a stretch capability is set for the text control, and a hiding capability is set for the button control.

FIG. 20(2) shows a playing interface displayed when a tablet computer runs the music application. It can be learned that a screen of the tablet computer is wider than a screen of the mobile phone, but a height is reduced. Therefore, the image control needs to be scaled down based on the scaling capability corresponding to the image control. Because the text control has the stretch capability, when a width of the screen of the tablet computer is increased, a width of the text control is also increased. When the width of the screen of the tablet computer is increased, a width of the button control is increased, and more button controls may be displayed, that is, some hidden button controls (for example, a favorites control) are displayed. In other words, when the width/ height of the screen changes, the scaling capability may implement scaling of the image control. In addition, the stretch capability implements, when the width/height of the screen changes, automatically stretching or shrinking the text control. The hiding capability implements, when the width/height of the screen changes, adaptively increasing or reducing a quantity of displayed button controls.

Example 2: Scaling+a Proportion

A browsing interface of a gallery application is used as an example for description.

Figure 21:
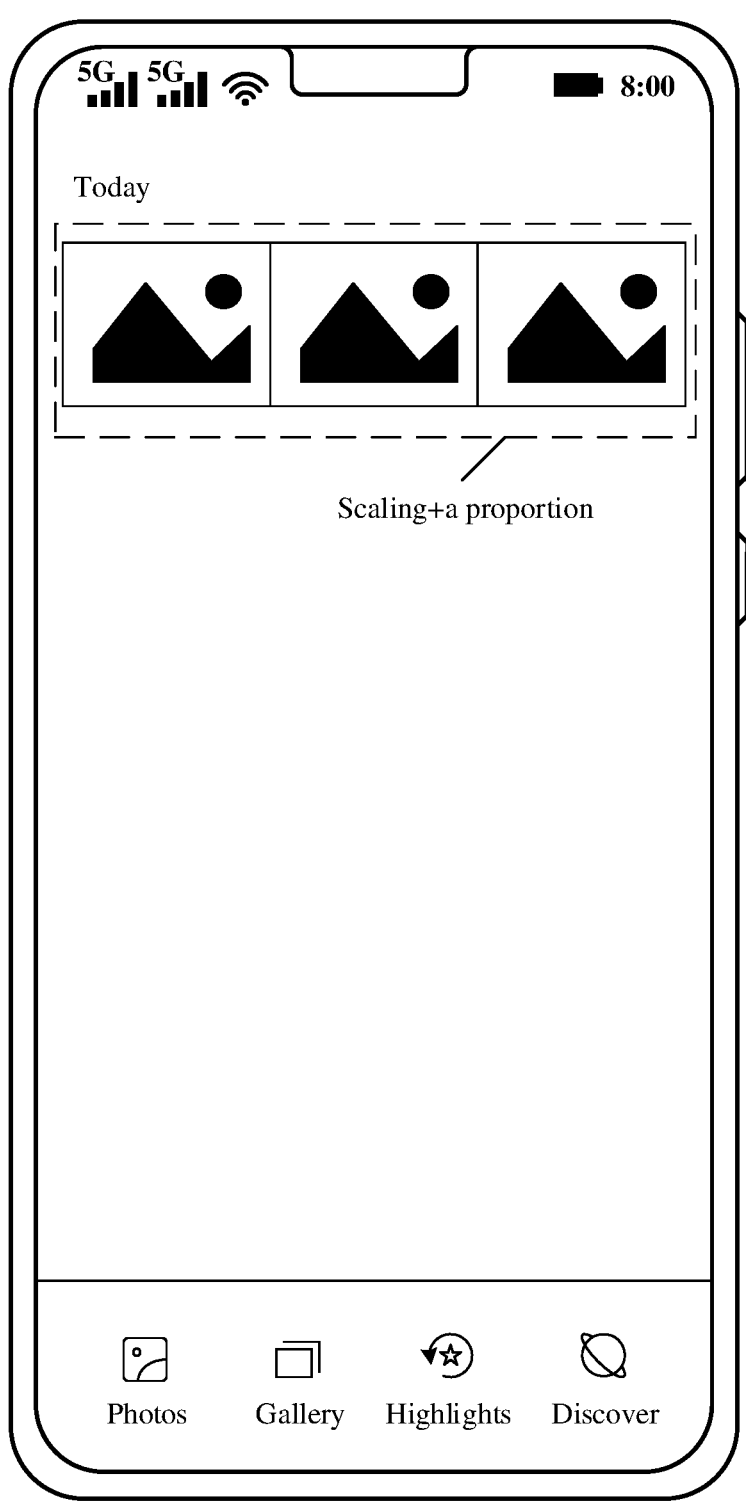
FIG. 21(1) and FIG. 21(2) are a schematic diagram 8 of application of a display interface layout method according to an embodiment of this application.
Figure 21:
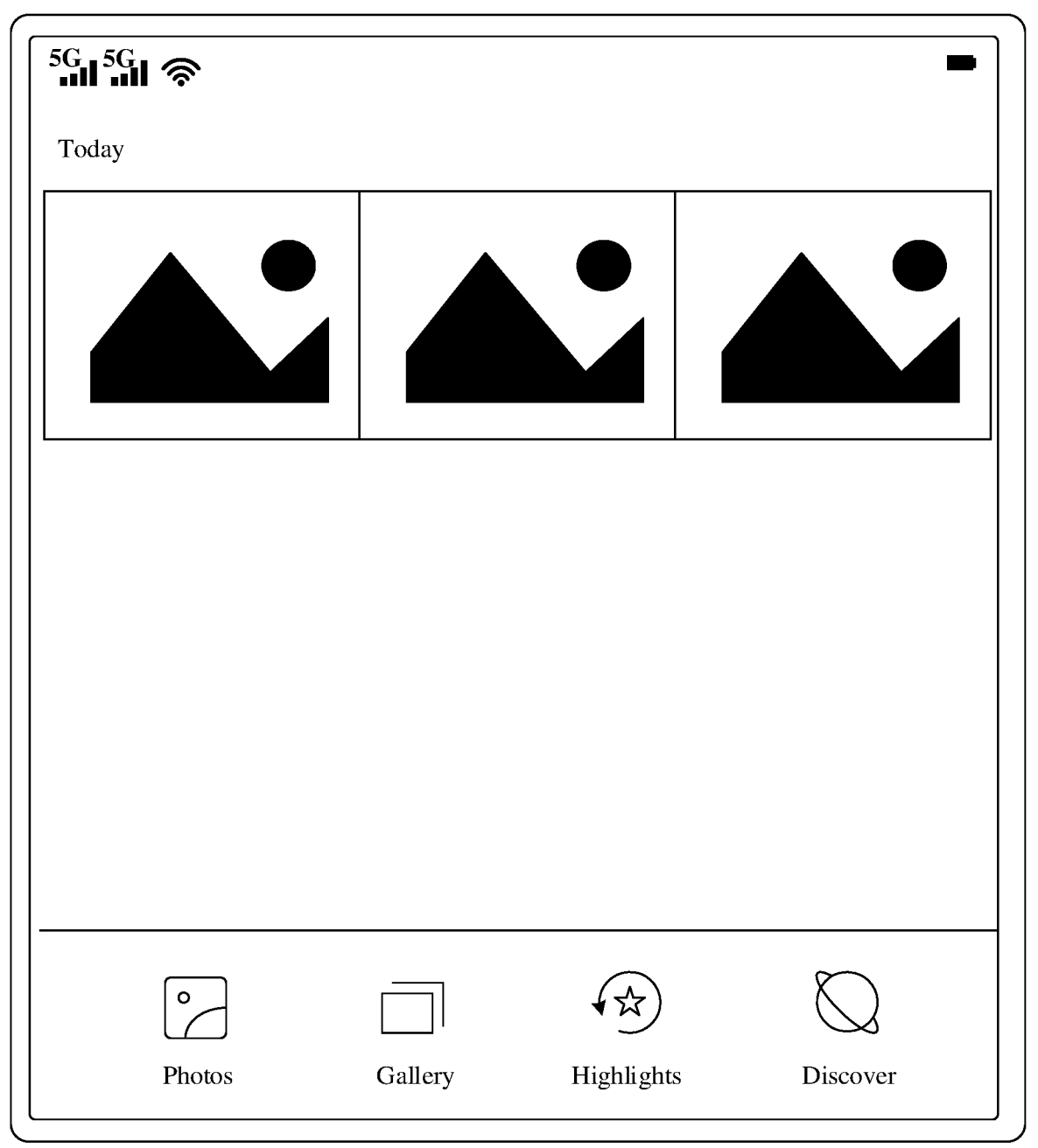

FIG. 21(1) shows a browsing interface displayed when the mobile phone runs the gallery application. The gallery application includes a layout container. The layout container includes a plurality of image controls (for displaying a thumbnail of a photo or a video). A scaling capability is set for the layout container (no horizontal available space proportion and vertical available space proportion are set for each image control). In addition, a proportion capability is further set for the layout container (for example, an average distribution proportion in a horizontal direction is set to, for example, 33.33%).

FIG. 21(2) shows a browsing interface displayed when the tablet computer runs the gallery application. It can be learned that available space of the tablet computer in the horizontal direction is equally divided by the image controls (a width of each image control is ⅓ of a total width of the tablet computer). The scaling capability of each image control enables each image control to be scaled to fully occupy the available space in the horizontal direction. In other words, the proportion capability controls a size of each image control in the horizontal direction. The scaling capability ensures that each image control is scaled based on an aspect ratio, to avoid deformation and distortion of the image.

Example 3: Scaling+Even Distribution

The browsing interface of the gallery application is still used as an example for description.

Figure 22:
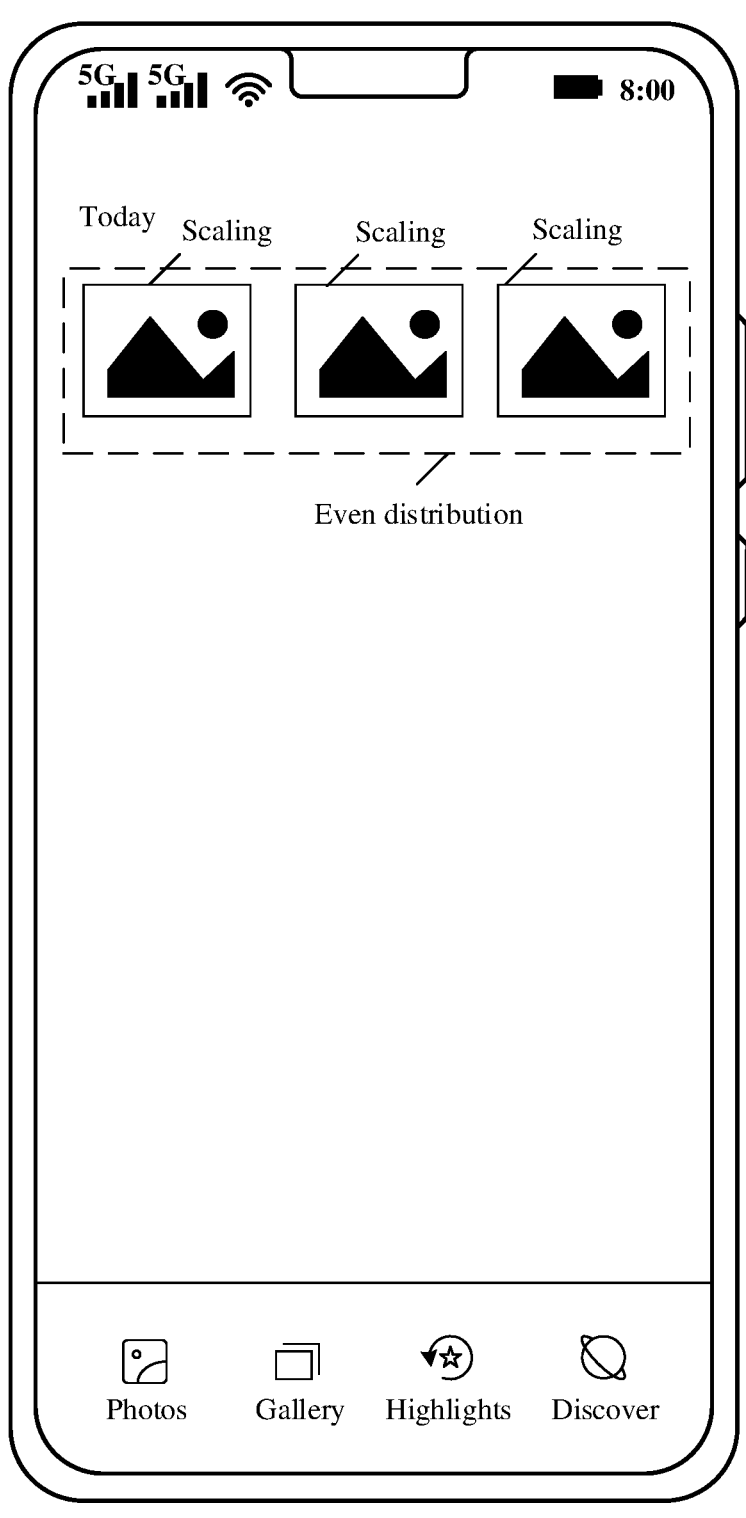
FIG. 22(1) and FIG. 22(2) are a schematic diagram 9 of application of a display interface layout method according to an embodiment of this application.
Figure 22:
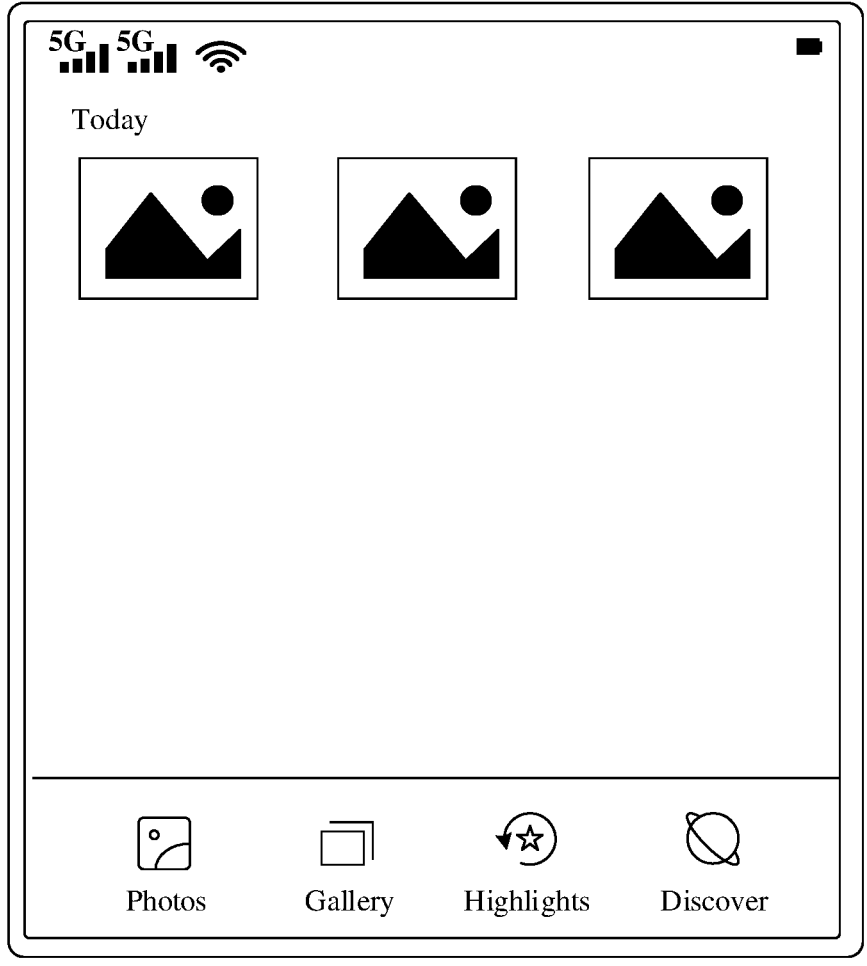

FIG. 22(1) shows the browsing interface displayed when the mobile phone runs the gallery application. The gallery application includes a layout container. The layout container includes a plurality of image controls (for displaying a thumbnail of a photo or a video). A scaling capability is set for the layout container, and a horizontal available space proportion and a vertical available space proportion are set for each image control. An even distribution capability is further set for the layout container (for example, a minimum margin value in a horizontal direction is set).

FIG. 22(2) shows a browsing interface displayed when the tablet computer runs the gallery application. Each image control is scaled based on the horizontal available space proportion and the vertical available space proportion, and a same spacing is maintained in the horizontal direction between two adjacent image controls.

Example 4: Scaling+Wrap+a Proportion

The browsing interface of the gallery application is still used as an example for description.

Figure 23:
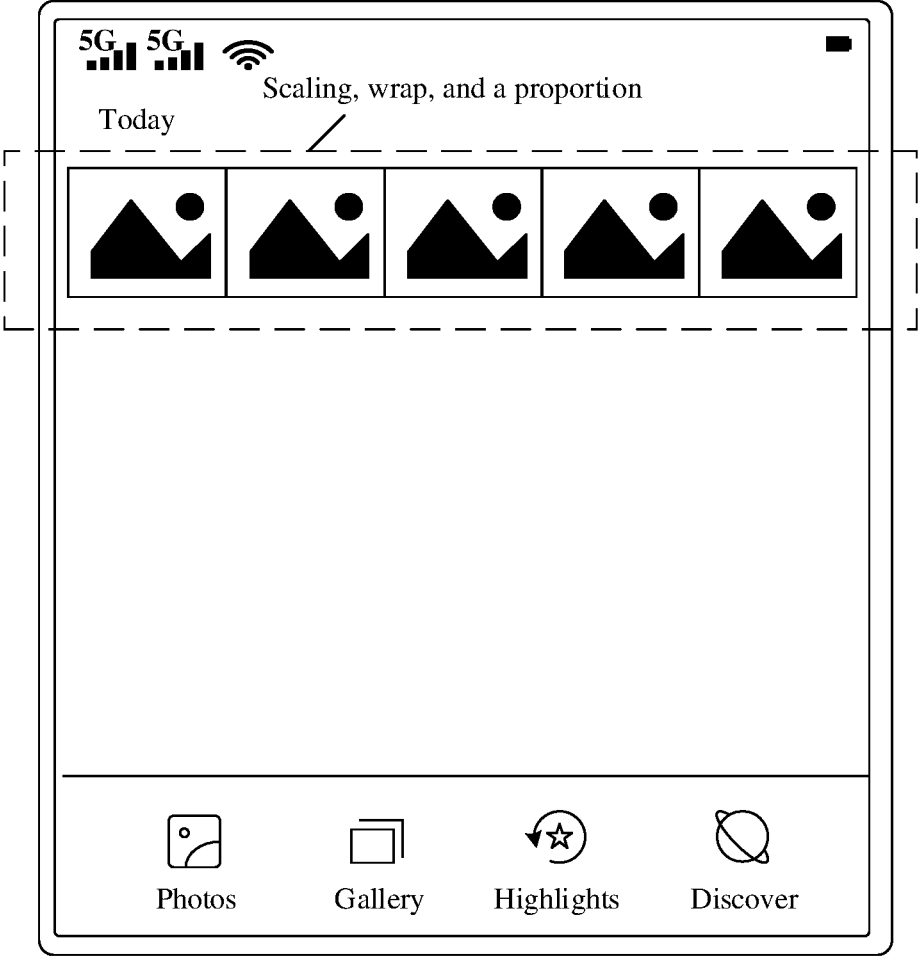
FIG. 23(1) and FIG. 23(2) are a schematic diagram 10 of application of a display interface layout method according to an embodiment of this application.
Figure 23:
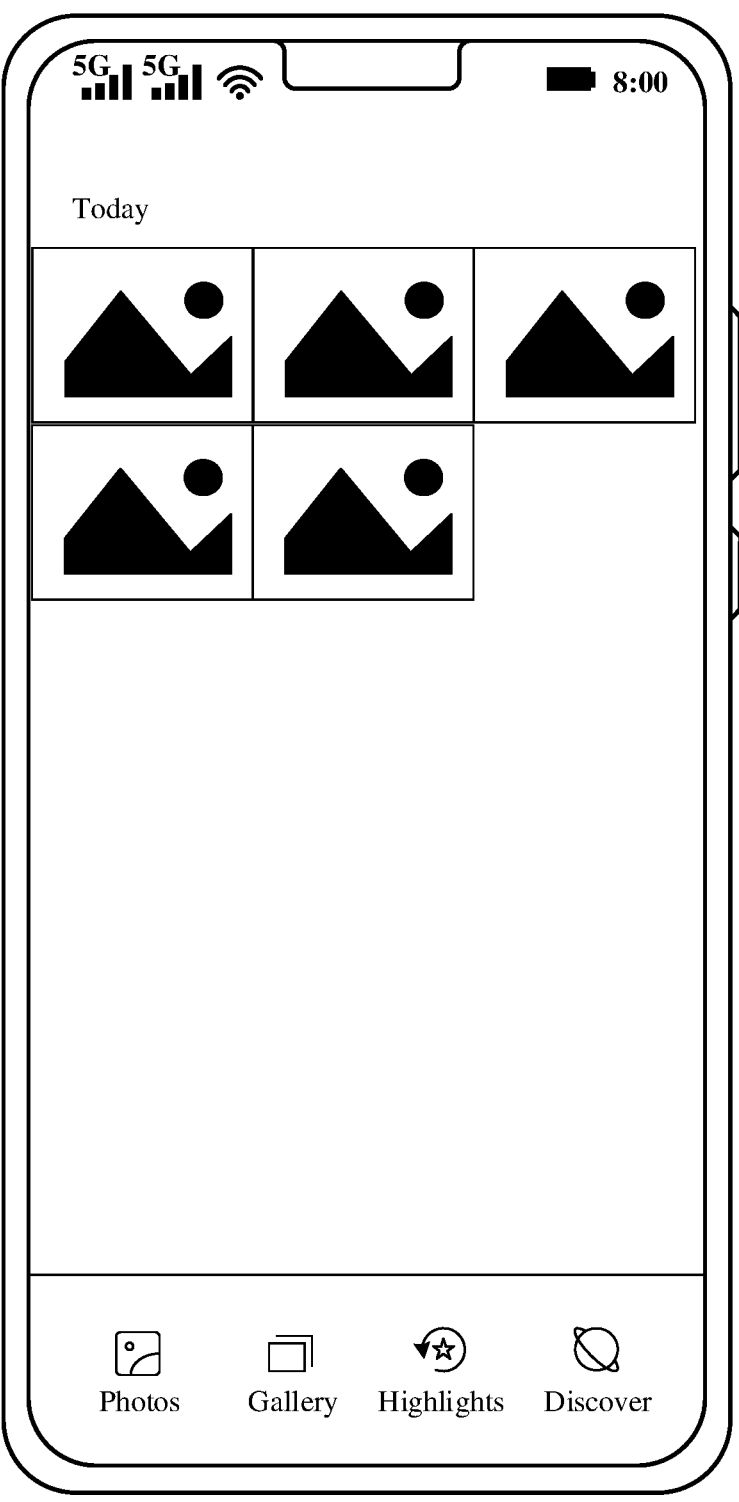

FIG. 23(1) shows a browsing interface displayed when the tablet computer runs the gallery application. The gallery application includes a layout container. The layout container includes a plurality of image controls (for displaying a thumbnail of a photo or a video). A scaling capability is set for the layout container (no horizontal available space proportion and vertical available space proportion are set for the image control). In addition, a proportion capability in a horizontal direction and a wrap capability in the horizontal direction are set for the layout container.

FIG. 23(2) shows the browsing interface displayed when the mobile phone runs the gallery application. First, the mobile phone determines, based on initial specification information of each image control in the layout container, a quantity of image controls to be displayed in each row. For example, it is determined that only three image controls can be displayed in each row on the mobile phone. Then, widths of the three image controls in the first row are determined based on the proportion capability in the horizontal direction, and then a shape of the image control is maintained for scaling based on the scaling capability of the image control. For a proportion of the image control in another row in the horizontal direction, refer to the width of the image control in the first row. By comparing the browsing interface in FIG. 23(2) with the browsing interface in FIG. 23(1), it can be found that, although a width of the mobile phone is smaller than that of the tablet computer, the image control in each row is enlarged.

In conclusion, different display interfaces are drawn, based on a same layout file, by electronic devices having different screen parameters. In other words, the electronic devices having the different screen parameters can adaptively adjust a layout of a display interface based on the layout file, to meet different display requirements.

In the foregoing embodiment, the scaling capability is as an example to describe how the developer designs the layout file including the View or the ViewGroup having the adaptive layout capability, and a specific process of implementing adaptive layout based on the layout file when the electronic device runs the application.

The following uses a wrap capability as an example to describe in detail how the developer designs the layout file including the View or the ViewGroup having the adaptive layout capability, and a method for implementing adaptive layout based on the layout file when the electronic device runs the application.

First, when developing the application, after adding dependency of the adaptive layout attribute package, the developer may set a ViewGroup having the wrap capability (the wrap function item) on the display interface. Specifically, when editing the layout file of the display interface, the developer may set an attribute value related to the wrap capability of the ViewGroup in the layout file (for example, the XML file), or set the attribute value related to the wrap capability of the ViewGroup in a manner of adding an invoking interface in the Java source code file.

Table 3 shows an example of an attribute related to the wrap capability.

If the layout container has wrap in a horizontal direction, that is, single-row arrangement is changed to multi-row arrangement, whether to display in rows and how to divide each row (for example, which child controls are included in each row) are determined based on a width of the layout container and the wrap reference value (the expected display width of the child control) of the child control.

If the layout container has wrap in a vertical direction, that is, single-column arrangement is changed to multi-column arrangement, whether to display in columns and how to divide each column (for example, which child controls are included in each column) are determined based on a height of the layout container and the wrap reference value (the expected display height of the child control) of the child control.

It should be noted that, in this specification, implementation of the wrap capability of the layout container is described in detail by using wrap in the horizontal direction as an example. For wrap in the vertical direction, refer to the specific implementation of the wrap in the horizontal direction. Details are not described in this specification.

S2403: Determine a position of each child control in the layout container based on the divided row (or column).

Optionally, if the wrap direction, the alignment mode, and the like are further set in the layout parameter of the layout container, the position of each child control in the layout

TABLE 3

| Attribute | Attribute type | Application scope. | Meaning |
| --- | --- | --- | --- |
| Wrap capability enabling | Boolean (Boolean) | Layout container | Wrap function enabling/disabling |
| Wrap direction | Enum (enumeration type) | Layout container | After wrap is triggered, how to change horizontal relative positions of child controls to vertical relative positions or how to change vertical relative positions of child controls to horizontal relative positions |
| Wrap alignment mode | Flag (bit flag) | Layout container | Alignment mode between the d controls, including but not limited to left alignment, vertical alignment, right alignment, top alignment, bottom alignment, and horizontal alignment |
| Wrap reference value | Dimension (size) | Child control | Expected display width (or height) of a child control in the layout container |

It should be noted that, when setting an attribute of the layout container, the developer may enable the wrap capability of the layout container by using wrap capability enabling, and set a wrap direction, a wrap alignment mode, and the like. A wrap reference value of a child control (namely, a View or a ViewGroup stored in the layout container) included in the layout container may be further set.

Figure 24:
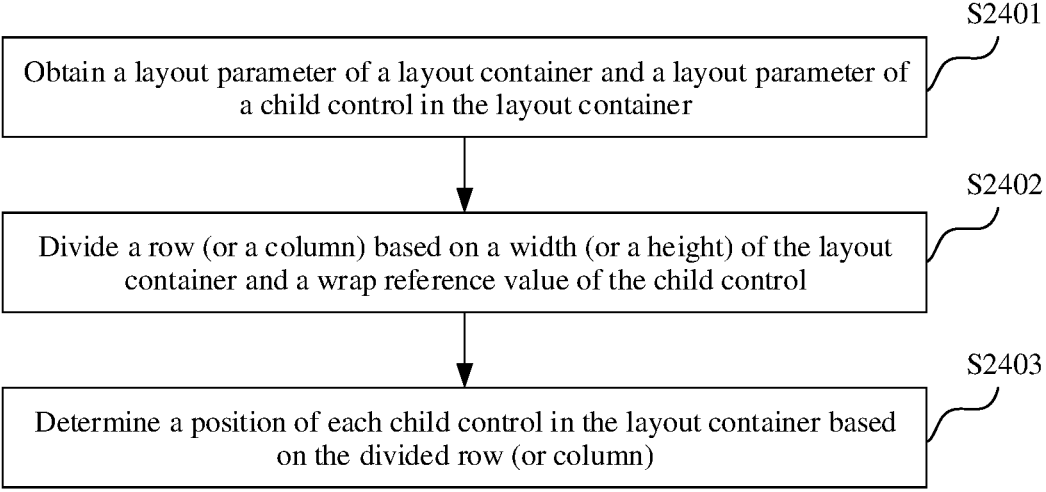
FIG. 24 is a schematic flowchart 5 of a display interface layout method according to an embodiment of this application.

Subsequently, the electronic device runs the application, and performs the steps shown in FIG. 24, specifically including the following content.

S2401: Obtain a layout parameter of the layout container and a layout parameter of the child control in the layout container.

For example, the layout parameter of the layout container, the child control included in the layout container, and a layout parameter of each child control are read from the layout file.

S2402: Divide a row (or a column) based on a width (or a height) of the layout container and the wrap reference value of the child control.

container need to be further determined based on the layout parameter of the layout container.

Then, the electronic device performs drawing based on the determined size and position of each child control in the layout container, and displays a finally drawn display interface.

The following describes in detail a meaning of each attribute related to the wrap capability and display effects of the layout container and the child control with reference to the accompanying drawings.

In some embodiments, the developer may set to enable wrap capability enabling of the layout container, and set a wrap reference value for each child control in the layout container.

For example, it is set that a layout container includes a child control 1 and a child control 2, and the child control 1 and the child control 2 are horizontally arranged. A wrap reference width of the child control 1 is set to 100 pixels, and a wrap reference width of the child control 2 is set to 80 pixels.

Figure 25:
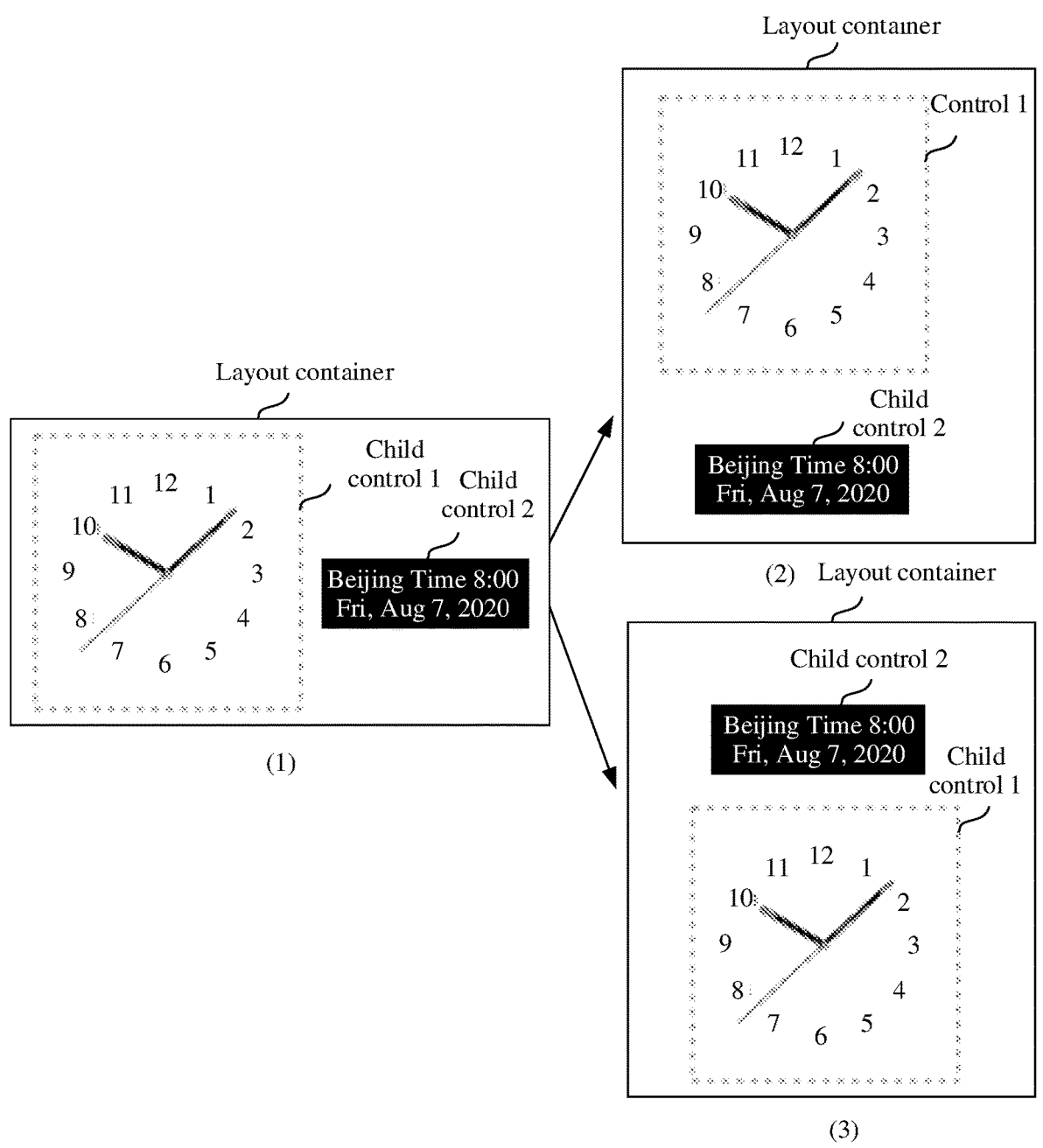
FIG. 25 is a schematic diagram 11 of application of a display interface layout method according to an embodiment of this application.

As shown in (1) in FIG. 25, a size of the layout container on an electronic device 1 is 200 pixels×120 pixels (a width×a height). In this case, because the width of the layout container on the electronic device 1 being 200 pixels>(100 pixels+80 pixels), the layout container on the electronic device 1 may horizontally display the child control 1 and the child control 2.

As shown in (2) in FIG. 25, a size of the layout container on an electronic device 2 is 140 pixels×160 pixels. In this case, because a width of the layout container on the electronic device 2 being 140 pixels<(100 pixels+80 pixels), the electronic device 2 needs to wrap to display the child control 1 and the child control 2, that is, display the child control 1 and the child control 2 in rows. For example, the electronic device 2 displays an interface shown in (2) in FIG. 25 or (3) in FIG. 25.

For another example, it is set that a layout container includes a child control 1 to a child control 5, and the child control 1 to the child control 5 are horizontally arranged, and a wrap reference width of each child control is set to 20 pixels.

Figure 26:
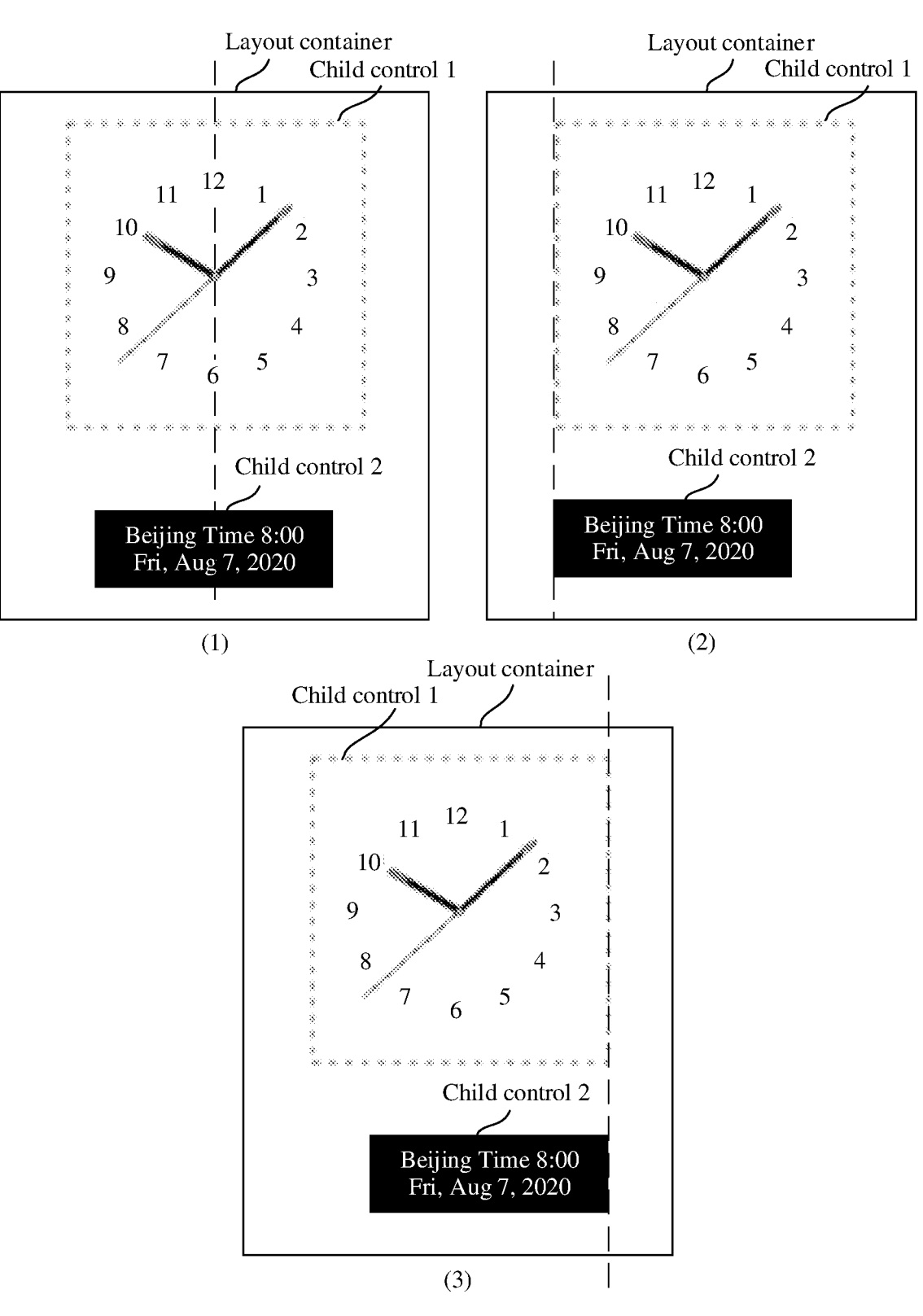
FIG. 26 is a schematic diagram 12 of application of a display interface layout method according to an embodiment of this application.

As shown in (1) in FIG. 26, a size of the layout container on an electronic device 3 is 120 pixels×80 pixels. In this case, because a width of the layout container on the electronic device 3 being 120 pixels>20 pixels×5, the layout container on the electronic device 3 may horizontally display the child control 1 to the child control 5.

As shown in (2) in FIG. 26, a size of the layout container on an electronic device 4 is 50 pixels×80 pixels. In this case, because a width of the layout container on the electronic device 4 being 50 pixels<20 pixels×5, the layout container on the electronic device 4 may wrap to display the child control 1 to the child control 5. Specifically, because 20 pixels×2<the width of the layout container on the electronic device 4 being 50 pixels<20 pixels×3, a maximum of two child controls are displayed in each row. In this case, the layout container on the electronic device 4 uses three rows to display the child control 1 to the child control 5. For example, the electronic device 4 displays an interface shown in (2) in FIG. 26, or displays an interface shown in (3) in FIG. 26.

It should be noted that, in this example, the wrap reference values of the child controls in the layout container are set to be the same. In some other examples, the wrap reference values of the child controls in the layout container may be alternatively set to be different. In this case, it is determined, based on a sum of wrap reference values of a plurality child controls, and whether to perform wrap and a quantity of child controls to be displayed and specific child controls to be displayed in each row are determined.

It can be learned that, by using the wrap capability provided in this embodiment of this application, the plurality of child controls having the wrap capability in the layout container can be adaptively displayed in rows based on a change of the layout container. In this way, electronic devices having different screen parameters can present different display effects based on a same layout setting, so that a development and maintenance workload of a developer is reduced, and display requirements of various types of electronic devices are met. For example, the wrap capability may be set for a layout container in which an image control, a button control, an icon button control (ImageButton View), and the like are located. When the width of the layout container changes, it may be automatically determined, based on the width of the layout container, to display a plurality of image controls, button controls, or icon button controls in rows, so as to achieve an effect of adaptively adjusting a layout.

In some other embodiments, the developer may further set the wrap direction of the layout container.

For example, the wrap direction may include forward wrap and reverse wrap. Forward wrap means that, when child controls that are horizontally arranged trigger wrap, a child control arranged later is located in a next row of a child control arranged earlier. For example, on the interface shown in (2) in FIG. 25, the child control 2 on the right side is displayed in a next row of the child control 1. Forward wrap also includes that, when child controls that are vertically arranged trigger wrap, a child control arranged later is located in a column on the right side of a child control arranged earlier.

Reverse wrap means that, when child controls that are horizontally arranged trigger wrap, a child control arranged later is located in a previous row of a child control arranged earlier. For example, on the interface shown in (3) in FIG. 25, the child control 2 on the right side may be alternatively displayed in a previous row of the child control 1. Reverse wrap also includes that, when child controls that are vertically arranged trigger wrap, a child control arranged later is located in a column on the left side of a child control arranged earlier.

It should be noted that an arrangement sequence of the child controls herein may be determined based on a habit of the user to read a text. For example, the reading habit of the user may be specifically determined based on a language of a text displayed on the child controls. Generally, for languages such as Chinese and English, the user is accustomed to reading from left to right and from top to bottom. Therefore, for the plurality of child controls that are horizontally arranged, it may be considered that a left child control is arranged first, and a right child control is arranged later. For the plurality of child controls that are vertically arranged, it may be considered that an upper child control is arranged first, and a lower child control is arranged later.

It should be further noted that forward wrap and reverse wrap herein are merely examples of a wrap direction provided in this embodiment of this application, and a specific definition of the wrap direction is not limited in this application.

In some other embodiments, the developer may further set the wrap alignment mode of the layout container.

Figure 27:
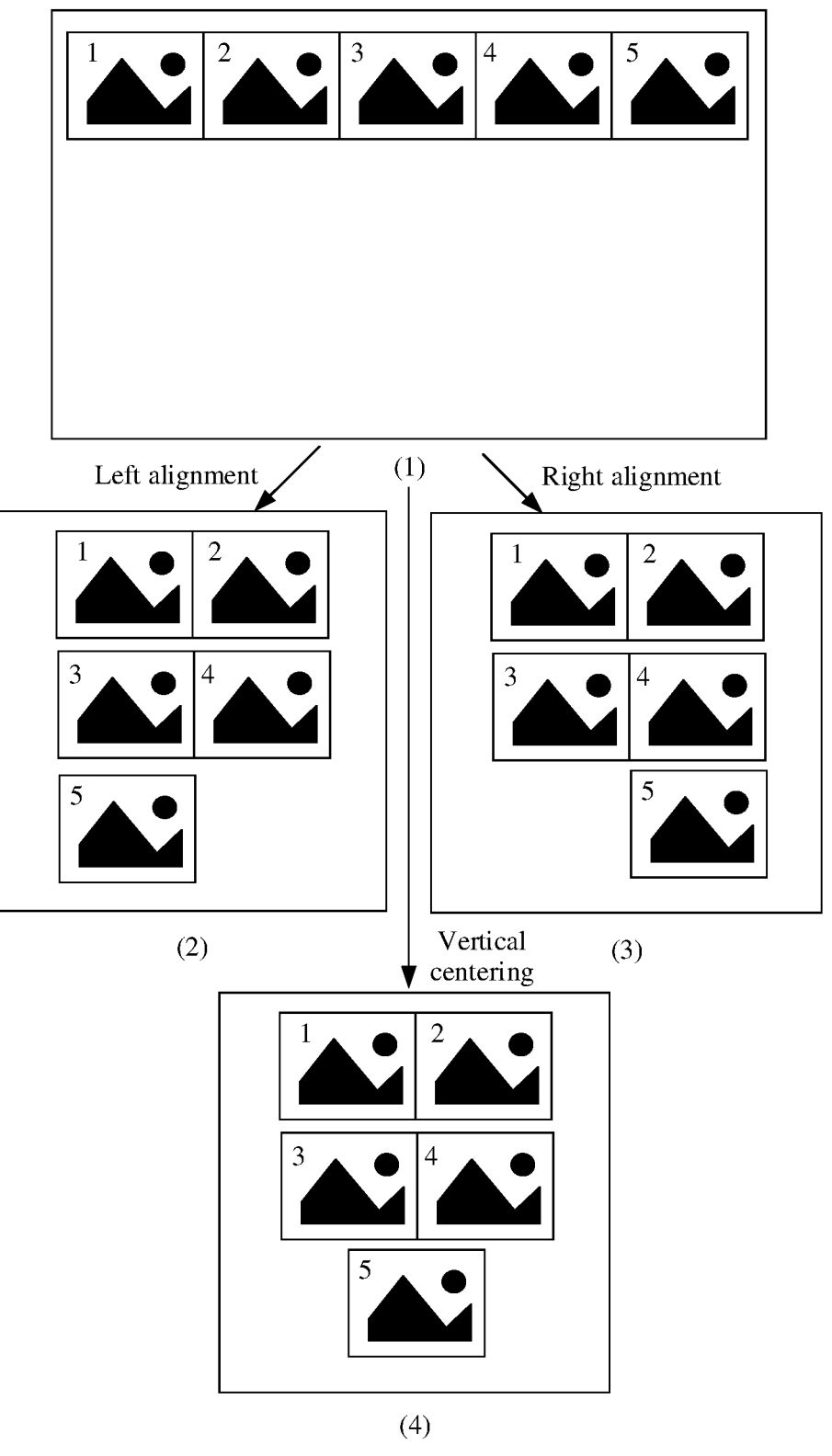
FIG. 27 is a schematic diagram 13 of application of a display interface layout method according to an embodiment of this application.

For example, child controls 1 to 5 shown in (1) in FIG. 27 are used as an example. The wrap alignment mode includes left alignment, vertical centering, right alignment, top alignment, horizontal centering, and bottom alignment.

Left alignment means that, when the horizontal relative positions of the child controls are changed to the vertical relative positions, the left edges of leftmost child controls in the rows are aligned in the vertical direction. For example, as shown in (2) in FIG. 26, the left edge of the child control 2 is aligned with the left edge of the child control 1. For another example, as shown in (2) in FIG. 27, the left edges of the child control 1 in the first row, the child control 3 in the second row, and the child control 5 in the third row are aligned.

Vertical centering means that, when the horizontal relative positions of the child controls are changed to the vertical relative positions, vertical center lines of all the child controls in the rows are aligned in the vertical direction. For example, as shown in (1) in FIG. 26, a vertical center line of the child control 2 is aligned with a vertical center line of the child control 1. For another example, as shown in (4) in FIG. 27, a vertical center line of the child control 1 and the child control 2 in the first row, a vertical center line of the child control 3 and the child control 4 in the second row, and a vertical center line of the child control 5 in the third row are aligned.

Right alignment means that, when the horizontal relative positions of the child controls are changed to the vertical relative positions, the right edges of rightmost child controls in the rows are aligned in the vertical direction. For example, as shown in (3) in FIG. 26, the right edge of the child control 2 is aligned with the right edge of the child control 1. For another example, as shown in (3) in FIG. 27, the right edges of the child control 2 in the first row, the child control 4 in the second row, and the child control 5 in the third row are aligned.

Figure 28:
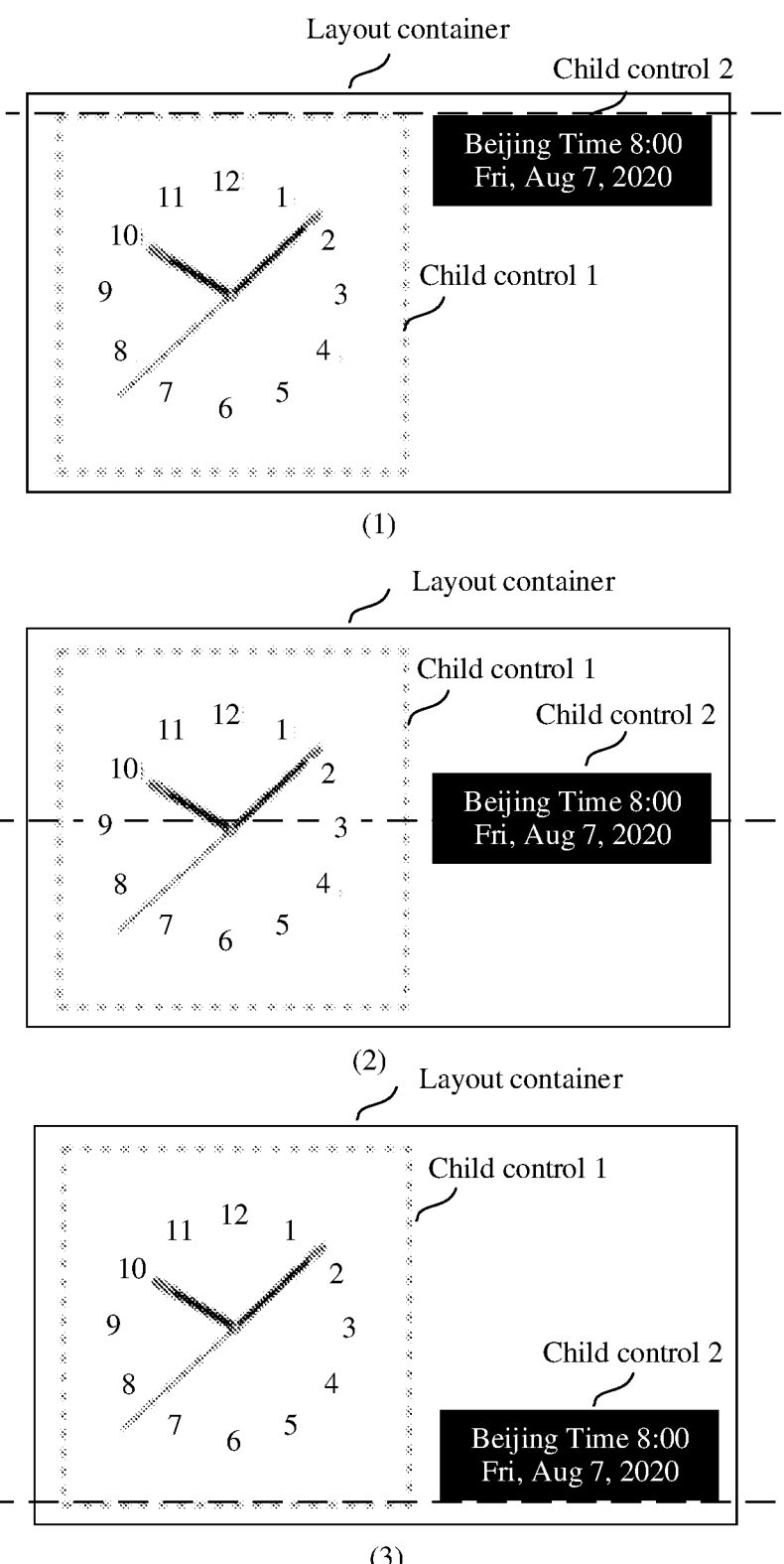
FIG. 28 is a schematic diagram 14 of application of a display interface layout method according to an embodiment of this application.

Top alignment means that, when the vertical relative positions of the child controls are changed to the horizontal relative positions, the upper edges of uppermost child controls in the columns are aligned in the horizontal direction. For example, as shown in (1) in FIG. 28, an upper edge of a child control 2 is aligned with the upper edge of a child control 1. Horizontal centering means that, when the vertical relative positions of the child controls are changed to the horizontal relative positions, horizontal center lines of all the child controls in the columns are aligned in the horizontal direction. For example, as shown in (2) in FIG. 28, a horizontal center line of the child control 2 is aligned with a horizontal center line of the child control 1. Bottom alignment means that, when the vertical relative positions of the child controls are changed to the horizontal relative positions, the bottom edges of bottommost child controls are aligned in the horizontal direction. For example, as shown in (3) in FIG. 28, the bottom edge of the child control 2 is aligned with the bottom edge of the child control 1.

The following provides an example of a layout file (an XML file). A layout container whose wrap capability enabling is enabled is set in the layout file, and the layout container includes two child controls: one image control and one relative layout container. The relative layout container stores two child controls: two text controls.

/*Example of Wrap Layout*/

```
<com.huawei. Adaptive wrap layout
    xmlns:android="http://schemas.android.com/apk/res/android"
    xmlns:app="http://schemas.android.com/apk/res-auto"
    android:layout_height="match_parent" //set a height of the layout container
    android:layout_width="match_parent"        //set a width of the layout container
    android:orientation="horizontal"               //set a layout direction to landscape
direction
    app:wrap capability enabling="true"           //enable a wrap capability
    app:wrap direction=forward direction //set the wrap direction to forward wrap
    app:wrap alignment mode=horizontal centering>       //set the wrap direction to
horizontal centering
        <ImageView       //set one child control, namely, the image control, in the layout
container
        android:layout_width="200 dp"        //set a width of the child control
        android:layout_height="200 dp"         //set a height of the child control
        android:src="@drawable/ImageView"
        android:layout_margin="10 dp"        //set an outer margin of the child control
        app:wrap reference value="160 dp"/> //set the wrap reference value of the child
control
        <RelativeLayout //set the other child control, namely, the relative layout container,
in the layout container
        android:layout_width="160 dp"        //set a width of the relative layout container
        android:layout_height="wrap_content"        //set a height of the relative layout
container
        android:layout_margin="20 dp"        //set an outer margin of the relative layout
container
        app:app:wrap reference value="160 dp">   //set the wrap reference value of the
relative layout container
        <TextView              //set one child control, namely, one text control, in the
relative layout container
            android:id="@+id/TextView 1"
            android:layout_width="wrap_content"
            android:layout_height="wrap_content"
            android:textSize="20 sp"
            android:layout_alignParentStart="true"
            android:text="TextView 1"/>
        <Text View              //set the other child control, namely, the other text control,
in the relative layout container
            android:id="@+id/TextView 2"
            android:layout_width="wrap_content"
            android:layout_height="wrap_content"
            android:textSize="20 sp"
            android:layout_alignParentStart="true"
            android:layout_below="@id/TextView 1"
            android:text="TextView 2"/>
    </RelativeLayout>
</com.huawei. Adaptive wrap layout>
```

The foregoing embodiment is a solution in which the developer designs adaptive layout of the display interface by setting the attribute value related to the wrap capability of the View or the ViewGroup in the layout file (for example, the XML file). The attribute value related to the wrap capability of the View or the ViewGroup may be alternatively set in the manner of adding the invoking interface in the Java source code file.

Table 4 shows an example of a corresponding interface for setting the attribute value related to the wrap capability of the View or the ViewGroup.

TABLE 4

| Modifier and type | Name and description | Parameter description |
| --- | --- | --- |
| Public Void | Set wrap capability enabling ( ) Set a wrap capability enabling status | True: enabling enabled; false: enabling disabled |
| Public Boolean | Is wrap capability enabling ( ) Obtain the status of wrap capability enabling | Return an enabled/disabled state of wrap capability enabling |
| Public Void | Set a wrap direction ( ) Set a wrap direction | 0: left to right, and top to bottom (forward wrap); 1: left to right, and bottom to top (reverse wrap) |
| Public Int | Get a wrap direction ( ) Obtain the wrap direction | Return the wrap direction 0: left to right, and top to bottom (forward wrap); 1: left to right, and bottom to top (reverse wrap) |
| Public Void | Set a wrap alignment mode ( ) Set the wrap alignment mode | Wrap alignment mode |
| Public Int | Get the wrap alignment mode ( ) Obtain the wrap alignment mode | Return the wrap alignment mode |
| Public Int | Get a wrap reference width ( ) An inner class obtains a wrap reference width of a child View | Return the wrap reference width of the child View |
| Public Void | Set a wrap reference width ( ) Set the wrap reference width of the child View | Wrap reference width of the child View |

The meaning of the wrap capability is described in detail above. The developer may configure the layout file with reference to the wrap capability, another adaptive layout capability, and a basic layout capability (for example, the Android native attribute) based on a layout design of each display interface in the application, pack the layout file and other source code and a resource of the application into an installation package (for example, an APK file), and release the installation package to AppGallery. The electronic device downloads the installation package from AppGallery, and installs the application.

The following describes in detail a solution of how to implement adaptive layout based on the foregoing layout file when the electronic device runs the application.

An example in which an electronic device using an Android system runs a clock application is still used for description.

Figure 29A:
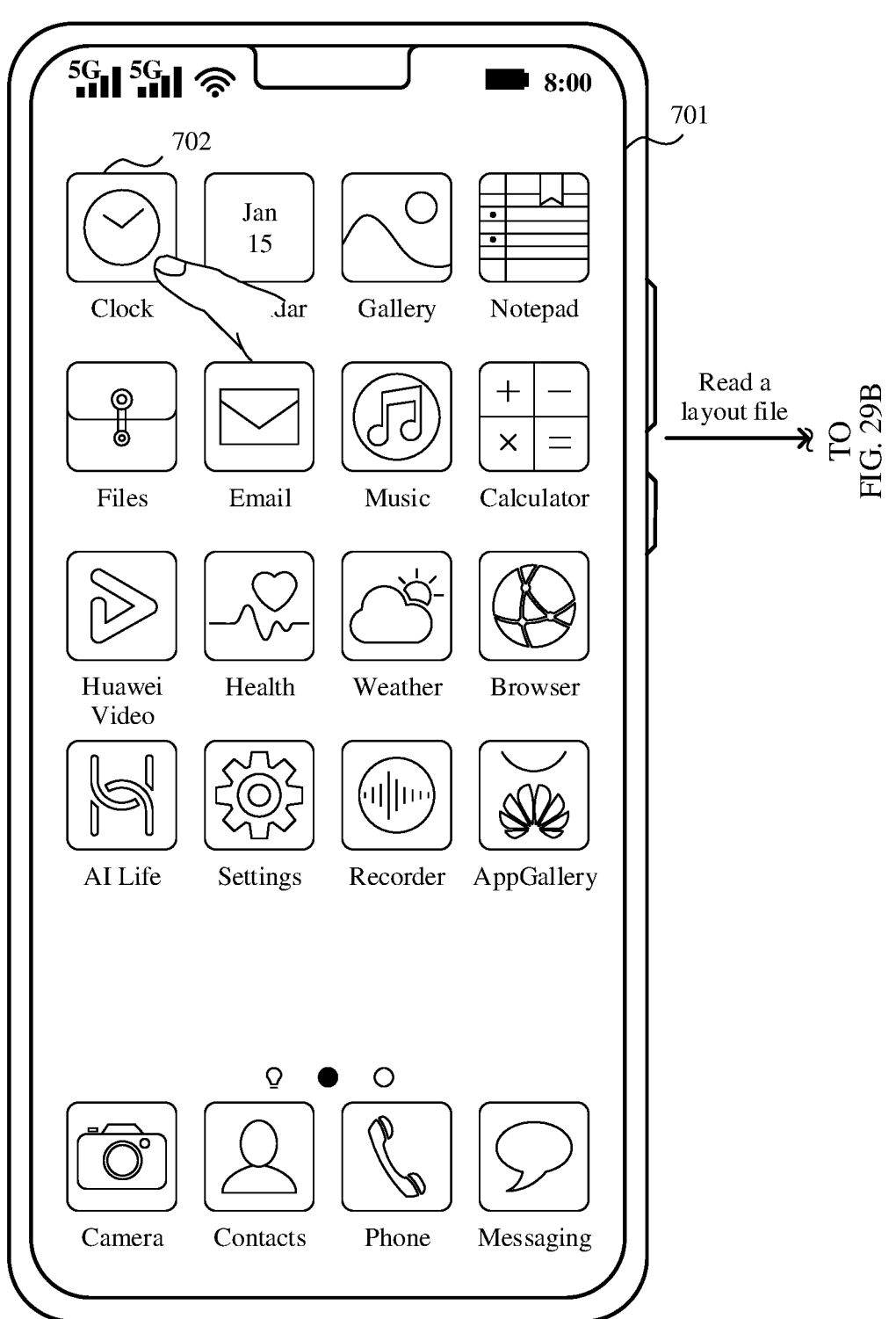

Refer to FIG. 29A and FIG. 29B. A display interface 2901 is a home screen interface displayed by the electronic device 100 (for example, specifically a mobile phone). In response to an operation of detecting that a user operates an icon 2902 of the clock application on the display interface 2901, the mobile phone starts the clock application, and draws a home page 2903 of the clock application. A layout container in which a control 2904 on the home page 2903 is located has a wrap capability. The control 2904 changes with the layout container. The home page of the clock application may be understood as the first interface displayed after the clock application is run.

It should be further noted that an example in which the application is started to display the home page is used for description herein. After the application is started, in response to a user operation, the method provided in this application is also applicable when the mobile phone displays another interface (not the home page).

Specifically, after the clock application is started, the mobile phone starts a main activity, and reads a layout file of the clock application in the main activity by using an inflate procedure in setContentView. The layout file includes a View and a ViewGroup that are included in each display interface of the clock application (for example, the home page of the clock application), a hierarchical structure of these Views and ViewGroups, and attributes of these Views and ViewGroups. The mobile phone invokes a corresponding interface to write each attribute value of these Views and ViewGroups. It should be noted that the attributes of these Views and ViewGroups herein include an Android native attribute and an attribute related to an extended adaptive layout capability in this embodiment of this application. Then, the mobile phone enters a window drawing procedure, and completes drawing of the display interface by using three procedures: measurement (Measure), layout (Layout), and drawing (Draw).

The foregoing measurement is used to calculate an actual size of the View. Starting with a performMeasure method, a MeasureSpec parameter is included. MeasureSpec indicates a 32-bit integer. The most significant two bits indicate a measurement mode (SpecMode), and the least significant 30 bits indicate a specification size (SpecSize) in a measurement mode. In other words, MeasureSpec is used to describe how to measure this View. The foregoing layout is used to determine a position of the View in a parent layout container. This is implemented after the parent layout container obtains a position parameter of a child View, invokes a layout method of the child View, and transfers the position parameter. The foregoing draw is used to draw a control, starting from a performDraw method. For layout and drawing processes, refer to related content in the conventional technology. Details are not described herein again.

It should be noted that MeasureSpec of DecorView is determined based on both a window size and a layout parameter (LayoutParams), and MeasureSpec of a common View is determined based on both MeasureSpec of a layout container in which the View is located (namely, a parent layout container) and LayoutParams.

In this embodiment of this application, the window size is determined based on a screen parameter of the mobile phone. The screen parameter includes a size and resolution of a screen and a current status of the screen. The current status of the screen includes whether the screen is in a landscape state or a portrait state. If the screen is a foldable screen, the screen is in a folded state, a half-folded state, an unfolded state, or the like. If the screen supports screen splitting, a size of a window displayed by a current application.

LayoutParams of each of the View and the ViewGroup includes a native attribute of the Android system, an attribute related to the extended adaptive layout capability in this embodiment of this application (for example, an attribute related to a wrap capability), and the like. Therefore, in a measurement process, the mobile phone performs measurement based on the native attributes of the Android system of the View and the ViewGroup in the layout file, and further needs to perform measurement based on the attribute related to the adaptive layout capabilities of the View and the ViewGroup in the layout file. In the layout process, the mobile phone needs to perform layout based on the native attributes of the Android system of the View and the ViewGroup in the layout file further needs to perform layout based on the attribute related to the adaptive layout capabilities of the View and the ViewGroup in the layout file. For both a process in which the mobile phone performs measurement based on the native attributes of the Android system of the View and the ViewGroup in the layout file and a process in which the mobile phone performs layout based on the native attributes of the Android system of the View and the ViewGroup in the layout file, refer to related content in the conventional technology. Details are not described herein again.

A process in which the mobile phone performs measurement and layout based on the attributes related to the adaptive layout capabilities of the View and the ViewGroup in the layout file is described herein.

Figure 30A:
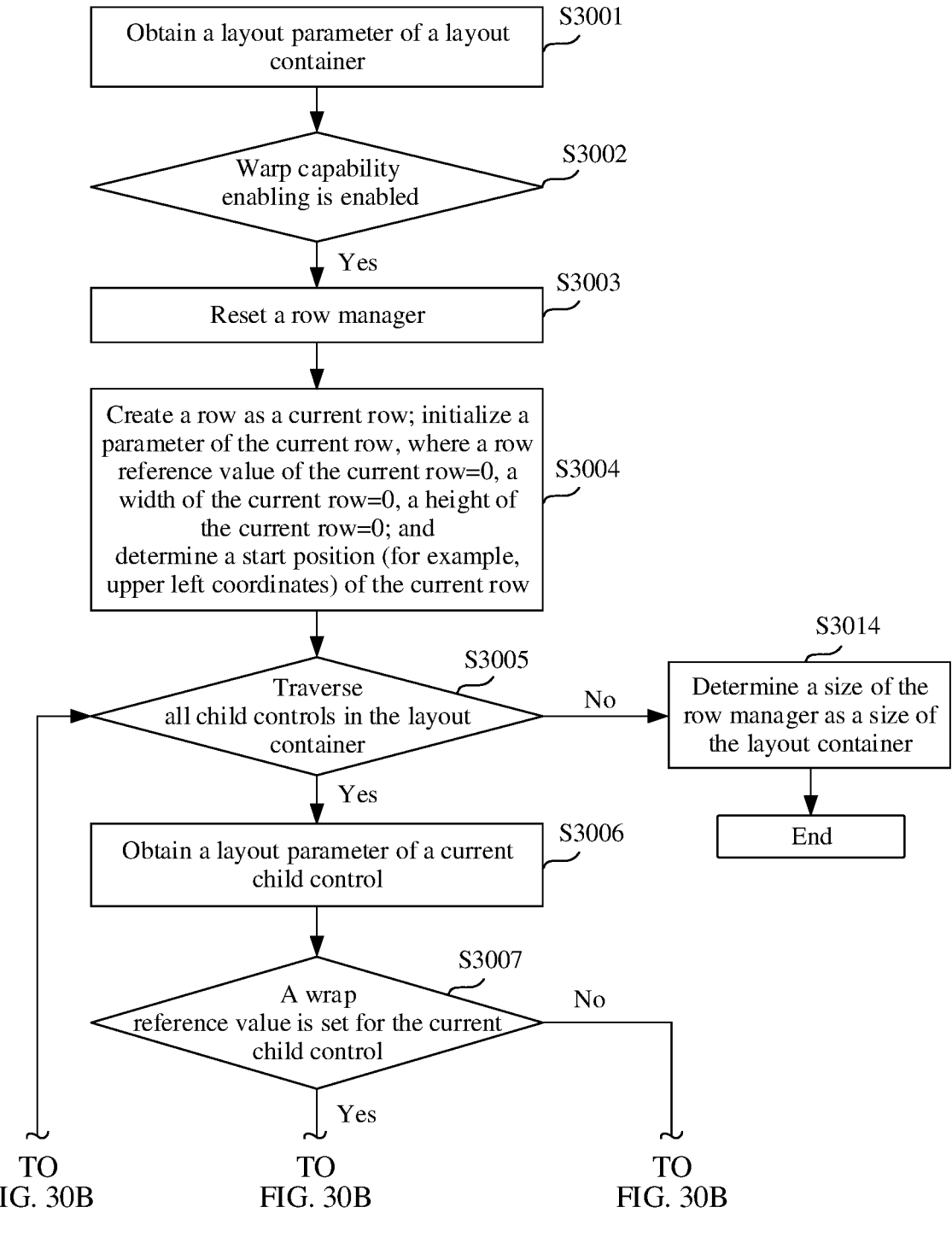
FIG. 30A and FIG. 30B are a schematic flowchart 5 of a display interface layout method according to an embodiment of this application.
Figure 30B:
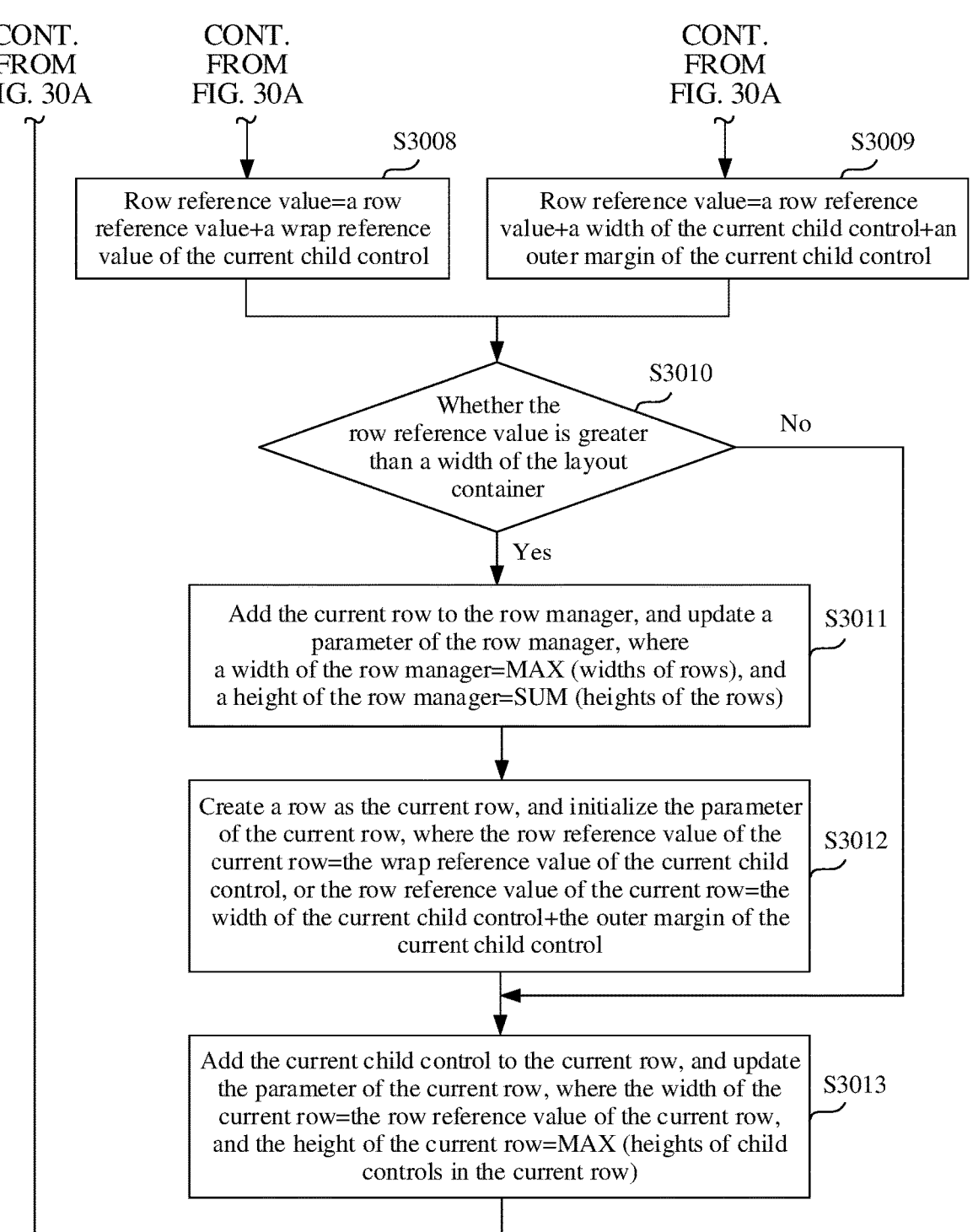

Specifically, the mobile phone performs a measurement procedure shown in FIG. 30A and FIG. 30B for each layout container in the layout file. The method specifically includes the following steps.

S3001: Obtain a layout parameter of the layout container.

The layout parameter of the layout container includes a wrap capability enabling, may further include a wrap direction and a wrap alignment mode, and may further include an initial size value of the layout container, and the like.

S3002: Determine whether wrap capability enabling of the layout container is enabled. If wrap capability enabling is enabled, step S3003 is performed. Otherwise, this procedure ends.

S3003: Reset a row manager.

The row manager (RowManager) is used to determine a layout of a child control in the layout container, including a quantity of rows (or columns) for displaying all the child controls in the layout container.

Figure 31:
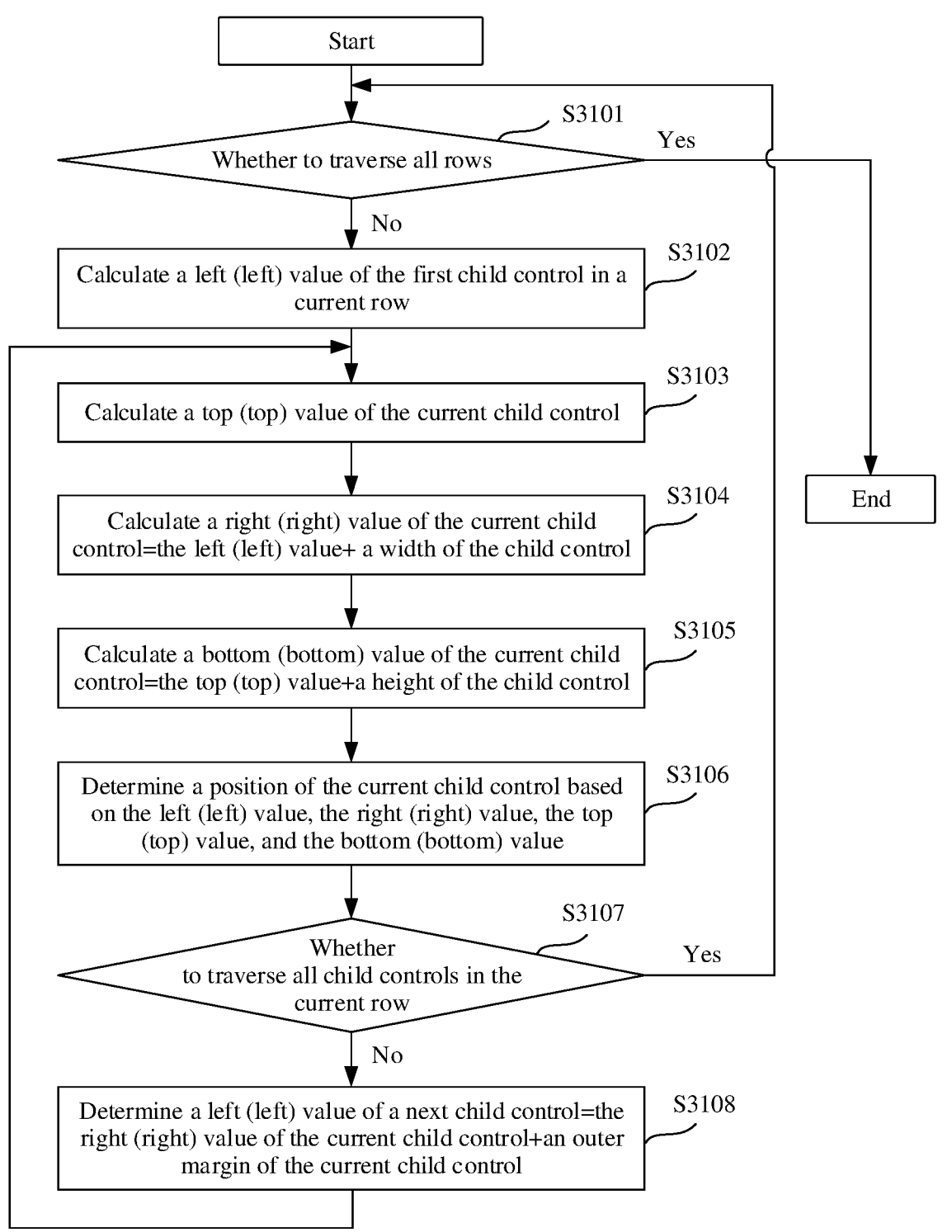
FIG. 31 is a schematic flowchart 6 of a display interface layout method according to an embodiment of this application.

It should be emphasized that, in FIG. 30A, FIG. 30B, and FIG. 31, wrap in a horizontal direction is used as an example to describe a measurement and layout procedure related to the wrap capability of the layout container.

S3004: Create a row as a current row, and initialize a parameter of the current row.

For example, a row reference value of the current row=o, a width of the current row=o, and a height of the current row=o. The row reference value of the current row is a variable, and is subsequently used to determine a quantity of child controls that can be placed in the current row. In this case, a start position of the current row may be further recorded, so that a position of the child control is determined during subsequent layout. For example, coordinate values (which may be referred to as upper left coordinates) of an upper left position of the current row is recorded as (Left, Top).

S3005: Whether to traverse all the child controls in the layout container. If yes, step S3006 is performed. Otherwise, step S3014 is performed.

S3006: Obtain a layout parameter of the child control.

The layout parameter of the child control may include a wrap reference value of the child control. A layout reference value of the child control may further include an initial size value, an outer margin, and the like of the child control.

S3007: Determine whether a wrap reference value is set for a current child control. If the wrap reference value is set, step S30030 is performed. If the wrap reference value is not set, step S3009 is performed.

It should be noted that, when this step is performed for the first time, the first child control in the layout container may be selected as the current child control, to perform this step and the following steps. When this step is performed in a subsequent circle, a next child control of the current child control may be selected as a new current child control for update.

S30030: Update the row reference value of the current row. The row reference value of the current row=the row reference value+the wrap reference value of the current child control.

Then, step S3010 is performed.

S3009: Update the row reference value of the current row. The row reference value of the current row=the row reference value+an initial width of the current child control+an outer margin of the current child control.

S3010: Determine whether the row reference value is greater than a width of the layout container. If the row reference value is greater than the width, step S3011 is performed. Otherwise, step S3014 is performed.

S3011: Add the current row to the row manager, and update a size value of the row manager.

If the row reference value is greater than the width of the layout container, it is determined that the current child control is not added to the current row, but to a next row. In this case, the width and the height of the current row may be determined, it is determined to add the current row to the row manager, and a size of the row manager is updated. In this case, a width of the row manager is a maximum value of widths of all rows included in the row manager, and a height of the row management is a sum of heights of all the rows in the row manager. In other words, the width of the row manager=MAX (the widths of the rows), and the height of the row manager=SUM (the heights of the rows).

S3012: Create a row as the current row, and initialize the parameter of the current row.

For example, the row reference value of the current row=the wrap reference value of the current child control, or the row reference value of the current row=a width of the current child control+the outer margin of the current child control. The start position of the current row, for example, the coordinate values of the upper left position of the current row, may be further determined.

S3013: Add the current child control the current row, and update the parameter of the current row The width of the current row is a sum of the widths of all the child controls included in the current row, and the height of the current row is a maximum value of the heights of all the child controls included in the current row. In other words, the width of the current row=the reference value of the current row, and the height of the current row=MAX (the heights of the child controls in the current row).

Then step S3005 is performed.

S3014: Determine the size of the row manager as a size of the layout container.

After all the child controls in the layout container are traversed, and a row included in row manager and a parameter of the row are determined, the size of row manager is determined, that is, the size of the layout container is determined. In this case, a measurement process of the layout container is completed.

After the measurement process is completed, the mobile phone performs a measurement procedure shown in FIG. 31 for each layout container in the layout file. The method specifically includes the following steps.

S3101: Determine whether to traverse all the rows. If yes, the layout process of the layout container ends. Otherwise, step S3102 is performed.

S3102: Calculate a left value of the first child control in the current row.

In the layout process, a position of each child control in the layout container needs to be determined. The position of each child control may be determined by coordinates of an upper left position, denoted as (Left, Top), and coordinates of a lower right position, denoted as (Right, Bottom). In other words, the position of each child control includes four parameter values: a left (left) value, a top (top) value, a right (right) value, and a bottom (bottom) value.

A position of each row in the layout container has been determined in the measurement process, including top left coordinates (Left, Top) of each row, and the width and the height of each row. Therefore, a left value of the first child control in each row may be determined based on the position of each row in the layout container and the wrap alignment mode set for the layout container.

For example, if the alignment mode is left alignment, the left edge of the first child control is aligned with the left edge of the current row. In this case, a left value of the current row is equal to the left value of the first child control in the current row. If the alignment mode is right alignment, the right edge of the last child control in the current row is aligned with the right edge of the current row. In this case, a left value of the first child control=the left value of the current row+the width of the current row-SUM (widths+ outer margins of the child controls included in the current row). If the alignment mode is vertical centering, vertical center lines of all the child controls in the current row are aligned with a vertical center line of the current row. In this case, the left value of the first child control=the left value of the current row+[the width of the current row/2-SUM (the widths+the outer margins of the child controls included in the current row)/2].

S3103: Calculate a top value of the current child control.

Similar to the determined left value of the current child control, a top value of a child control in each row is determined based on to the position of each row in the layout container and the wrap alignment mode set for the layout container.

For example, if the alignment mode is top alignment, the upper edge of the child control is aligned with the upper edge of the current row. In this case, a top value of the current row=a top value of the first child control in the current row. If the alignment mode is bottom alignment, the lower edge of a child control with a maximum size (namely, a maximum height) in a vertical direction in the current row is aligned with the lower edge of the current row. In this case, a top value of the child control=the top value of the current row+a height of the child control with the maximum height in the current row-the height of the current child control. If the alignment mode is horizontal centering, horizontal center lines of all the child controls in the current row are aligned with a horizontal center line of the current row. In this case, the top value of the current child control=the top value of the current row+[the height of the current row/2-SUM (the height of the child control with the maximum height in the current row/2)].

S3104: Calculate a right value of the current child control. The right value of the current child control=the left value+the width of the child control.

In the measurement process, the width of the child control has been determined. Therefore, the right value of the child control can be determined.

S3105: Calculate a bottom value of the current child control. The bottom value of the current child control=the top value+the height of the child control.

In the measurement process, the height of the child control has been determined. Therefore, the bottom value of the child control can be determined.

Certainly, an execution sequence of steps S3104 and S3105 is not limited in this embodiment of this application. Steps S3104 and S3105 may be performed at the same time, or an execution sequence may be exchanged.

S3106: Determine a position of the current child control based on the left value, the right value, the top value, and the bottom value.

S3107: Determine whether to traverse all current child controls. If yes, step S3101 is performed. Otherwise, step S3108 is performed.

S3108: Determine a left value of the next child control.

The left value of the next child control=the right value of the current child control+an outer margin of the current child control. Then, step S3103 is performed. To be specific, the next child control is used as the current child control, and a top value, a right value, and a bottom value of the next child control are determined. The measurement procedure is performed until all child controls in the row are traversed.

In conclusion, in an application development phase, the developer of the application sets, in the layout file, an attribute of an adaptive layout capability (for example, the wrap capability) for a View and a ViewGroup on a display interface. After the application is installed on electronic devices having different screen parameters, the electronic devices may determine a quantity of rows for displaying a View and a ViewGroup in each layout container with reference to the screen parameters of the electronic devices based on the attributes of the adaptive layout capabilities of the View and the ViewGroup in the layout file, to implement adaptive layout of the display interface. In this way, the developer only needs to design one set of layout files, to meet display requirements of the electronic devices having the different screen parameters. This helps reduce development costs and maintenance costs of the developer.

In addition, compared with a solution in which an application installation package needs to carry a plurality of sets of layout files, this solution in which the application installation package carries one set of layout files helps improve traffic costs and time costs of downloading the application installation package by the electronic device. In addition, after the application is installed on the electronic device, the electronic device does not need to store another redundant layout file. This improves utilization of storage space of the electronic device.

As described above, the plurality of extended adaptive layout capabilities in embodiments of this application may be used in combination with each other. Several examples of combinations of the wrap capability with another adaptive layout capability are provided herein.

1. The Wrap Capability+a Scaling Capability+an Even Distribution Capability

The browsing interface of the gallery application is still used as an example for description.

Figure 32:
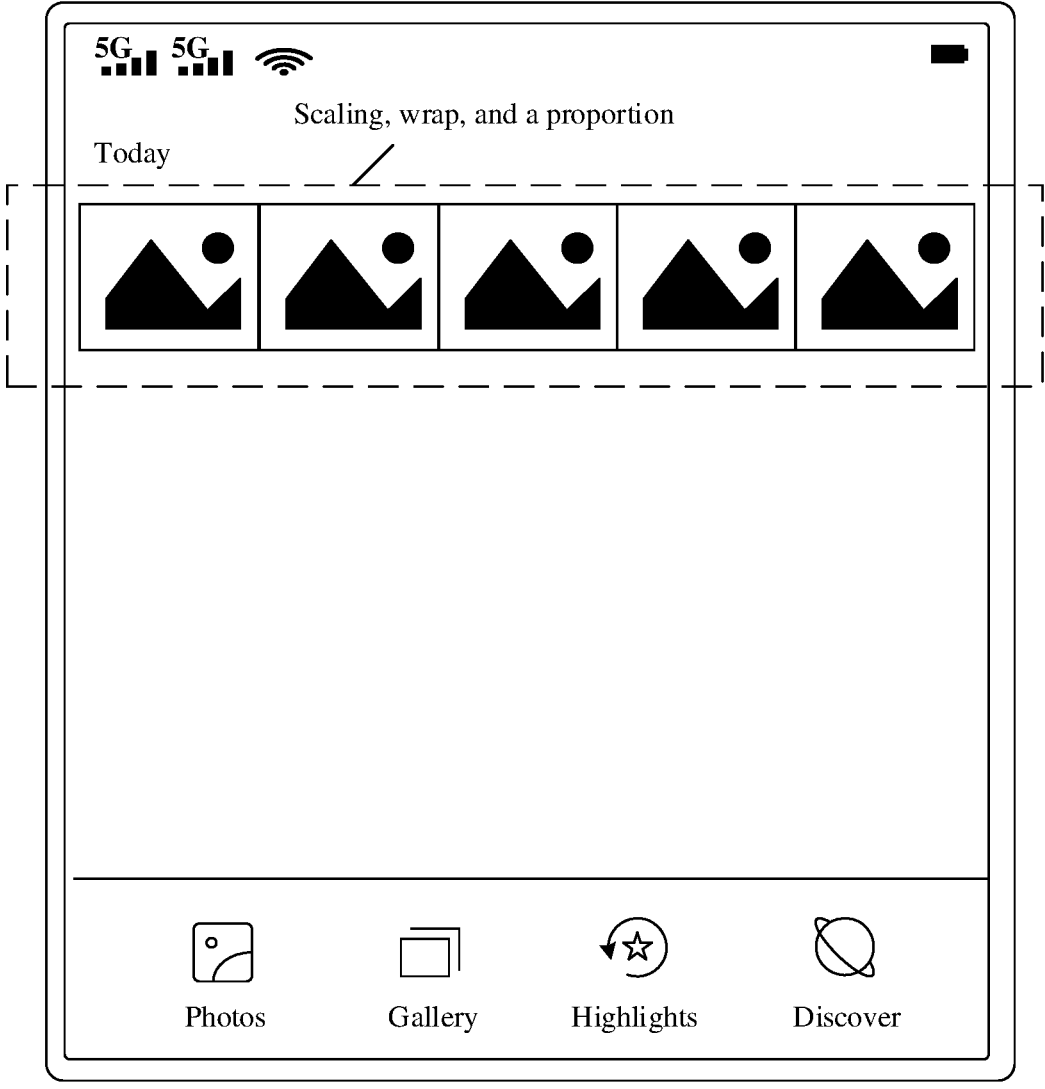
FIG. 32(1) and FIG. 32(2) are a schematic diagram 16 of application of a display interface layout method according to an embodiment of this application.
Figure 32:
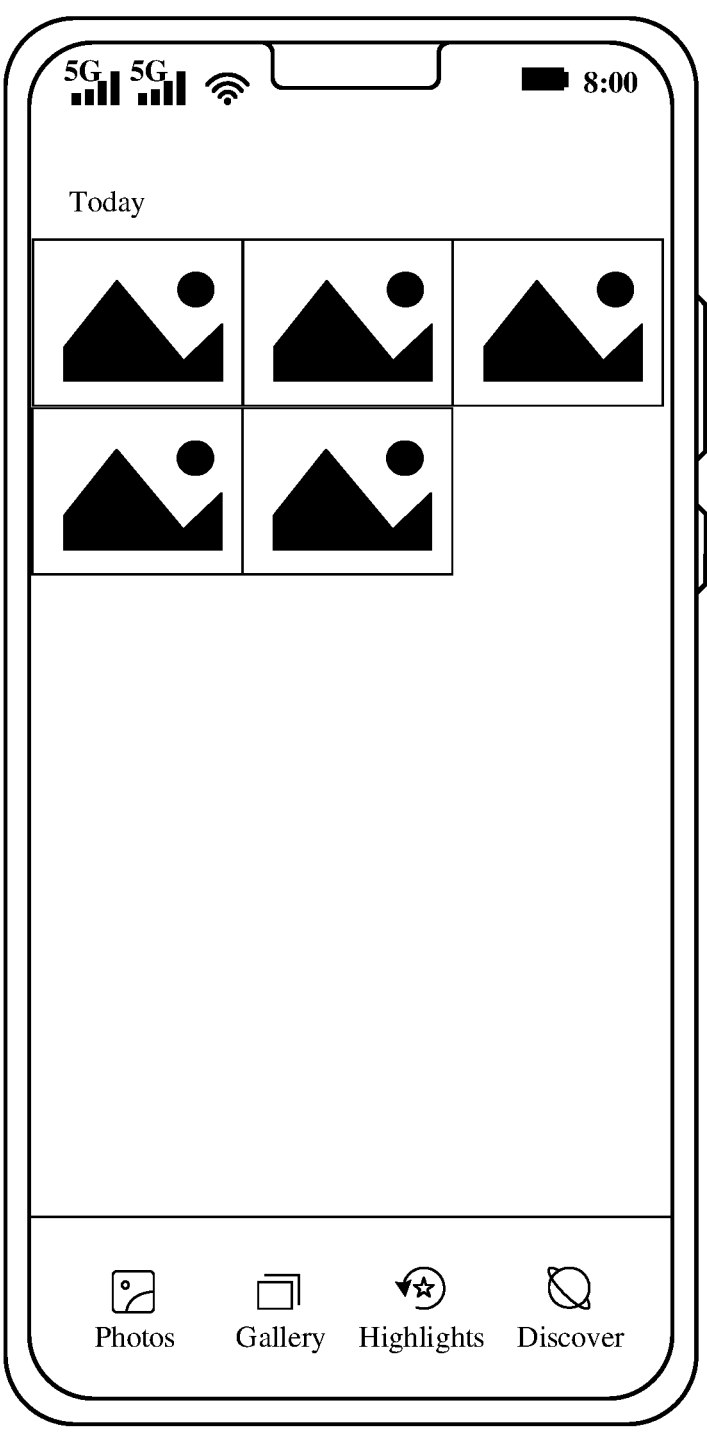

FIG. 32(1) shows a browsing interface displayed when a tablet computer runs the gallery application. The browsing interface includes a layout container. The layout container includes a plurality of image controls (for displaying a thumbnail of a photo or a video). A scaling capability is set for the layout container (no horizontal available space proportion and vertical available space proportion are set for the image control). In addition, a proportion capability in a horizontal direction and a wrap capability in the horizontal direction are set for the layout container.

FIG. 32(2) shows a browsing interface displayed when a mobile phone runs the gallery application. First, the mobile phone determines, based on initial specification information of each image control in the layout container, a quantity of rows of the layout container and a quantity of image controls to be displayed in each row. For example, it is determined that only three image controls can be displayed in each row on the mobile phone. Then, widths of the three image controls in the first row are determined based on the proportion capability in the horizontal direction, and then a shape of the image control is maintained for scaling based on the scaling capability of the image control. For a proportion of the image control in another row in the horizontal direction, refer to the width of the image control in the first row. By comparing the browsing interface in FIG. 32(2) with the browsing interface in FIG. 32(1), it can be found that, although a width of the mobile phone is smaller than that of the tablet computer, the image control in each row is enlarged.

2. The Wrap Capability+an Even Distribution Capability

A browsing interface of a gallery application is used as an example for description.

Figure 33:
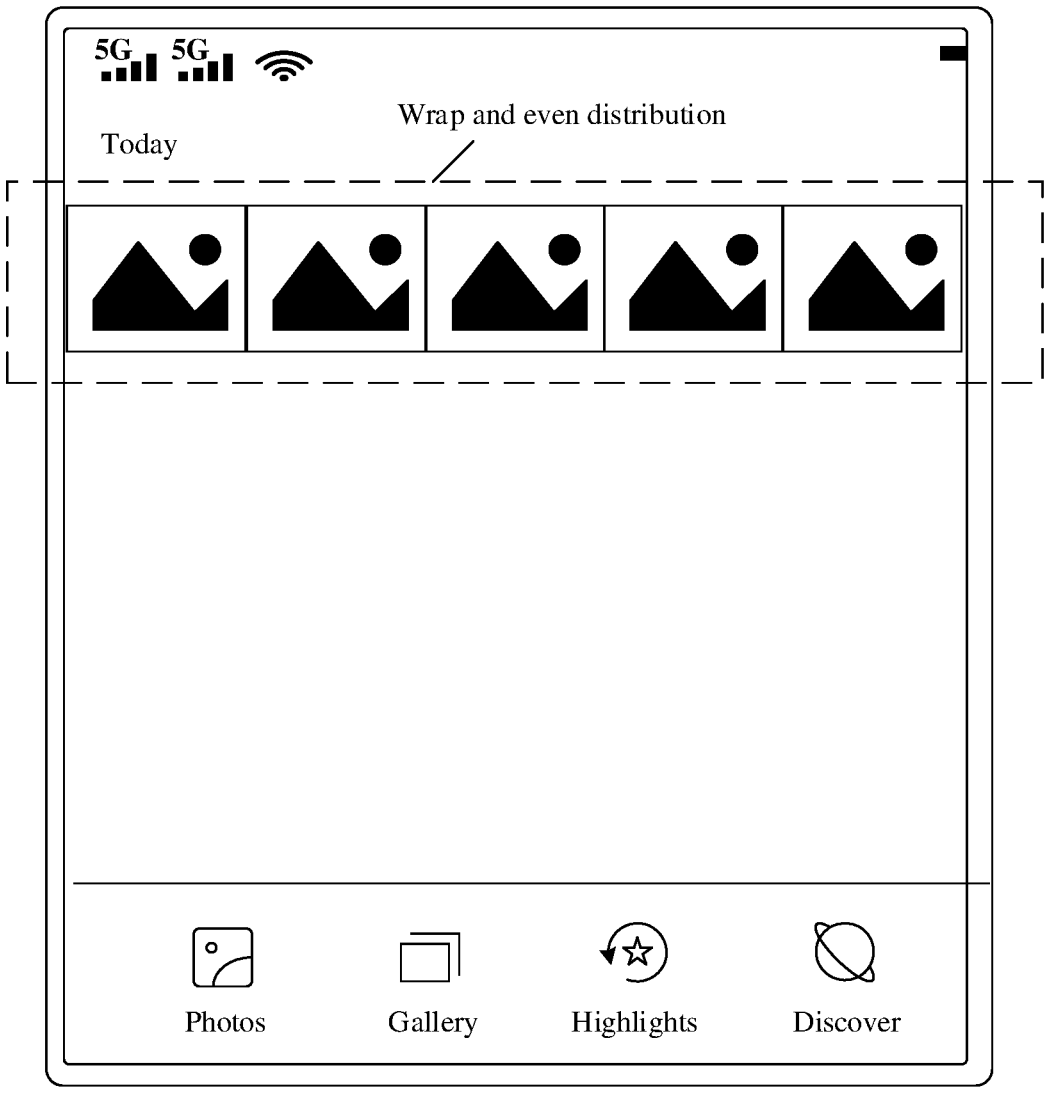
FIG. 33(1) and FIG. 33(2) are a schematic diagram 17 of application of a display interface layout method according to an embodiment of this application.
Figure 33:
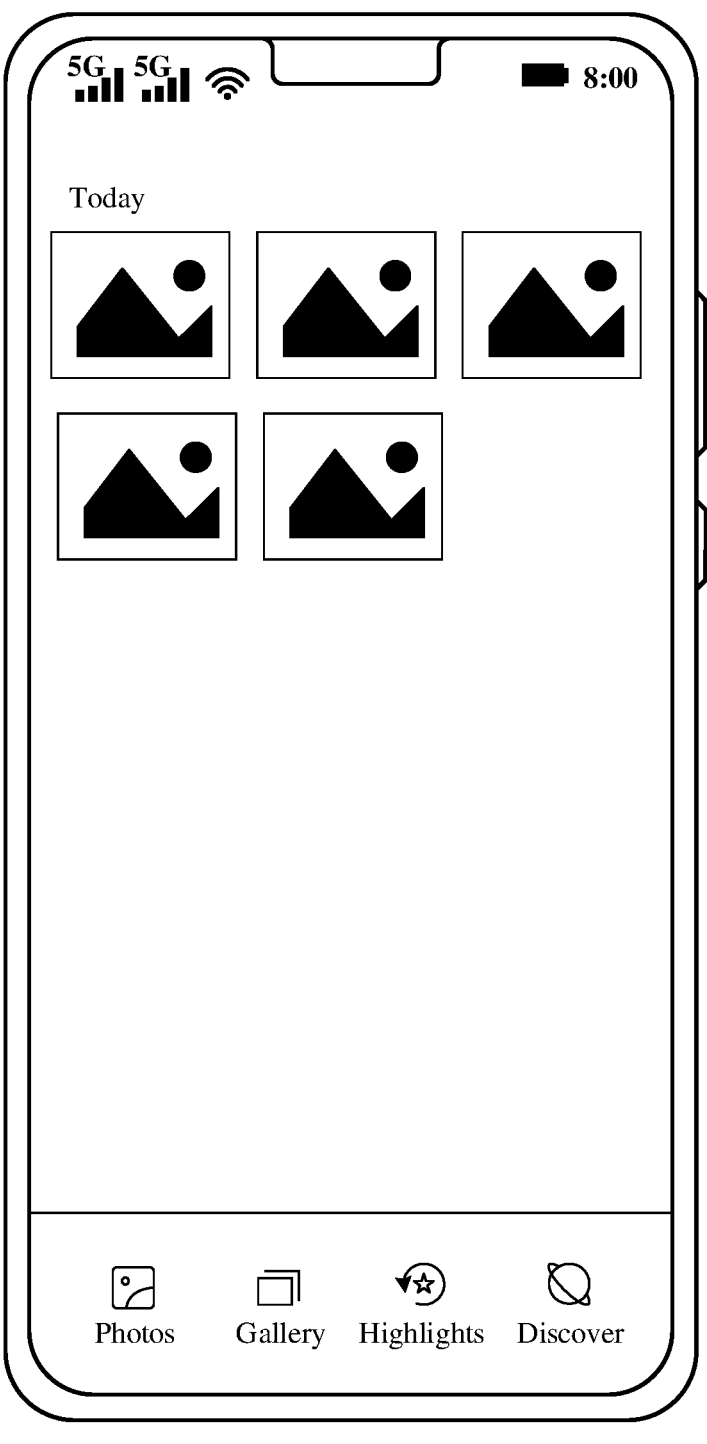

FIG. 33(1) shows a browsing interface displayed when a tablet computer runs the gallery application. The browsing interface includes a layout container. The layout container includes a plurality of image controls (for displaying a thumbnail of a photo or a video). A wrap capability and an even distribution capability are set for the layout container. In this case, widths of the plurality of image controls are wrap reference values.

FIG. 33(2) shows a browsing interface displayed when a mobile phone runs the gallery application. First, the mobile phone determines, based on the wrap reference value of each image control in the layout container, a quantity of rows of the layout container and a quantity of image controls to be displayed in each row. For example, it is determined that a maximum of three image controls are displayed in each row on the mobile phone. In this case, it may be determined that the five image controls need to be displayed in two rows on the mobile phone. In addition, because the even distribution capability is further set for the layout container, when displaying image controls in each row, the mobile phone further maintains a same spacing between the image controls in each row. By comparing the browsing interface in FIG. 33(2) with the browsing interface in FIG. 33(1), it can be found that, although a width of the mobile phone is smaller than that of the tablet computer, the quantity of image controls to be displayed in each row is reduced, and the spacing between the image controls in each row is adaptively adjusted.

It can be learned that a developer may not need to pay attention to a screen size of an electronic device, and do not need to pay attention to a quantity of image controls that can be displayed in one row, but directly uses the wrap capability to enable the electronic device to adaptively adjust a layout, so that a grid effect can be implemented.

3. The Wrap Capability+a Hiding Capability

The browsing interface of the gallery application is still used as an example for description.

Figure 34:
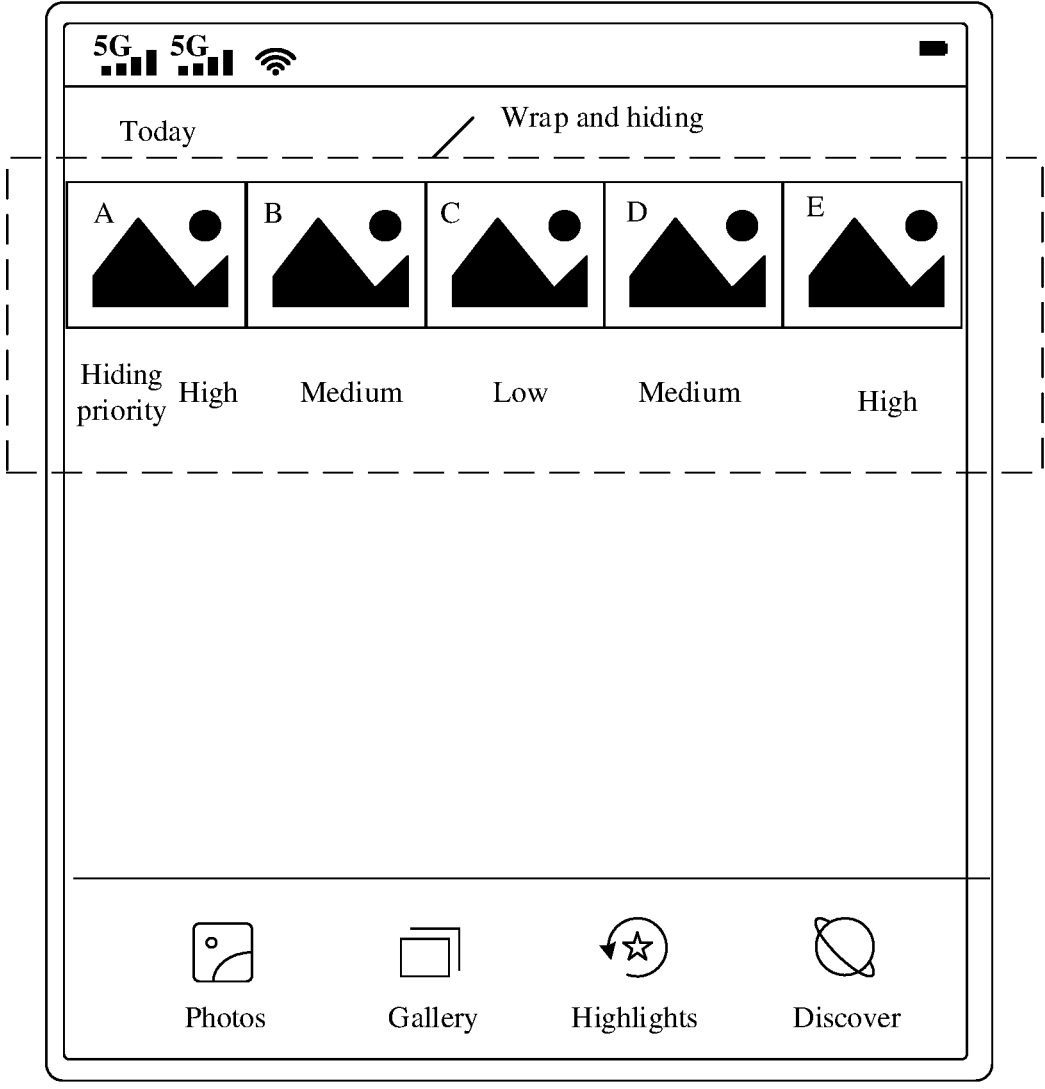
FIG. 34(1) and FIG. 34(3) are a schematic diagram 18 of application of a display interface layout method according to an embodiment of this application.
Figure 34:
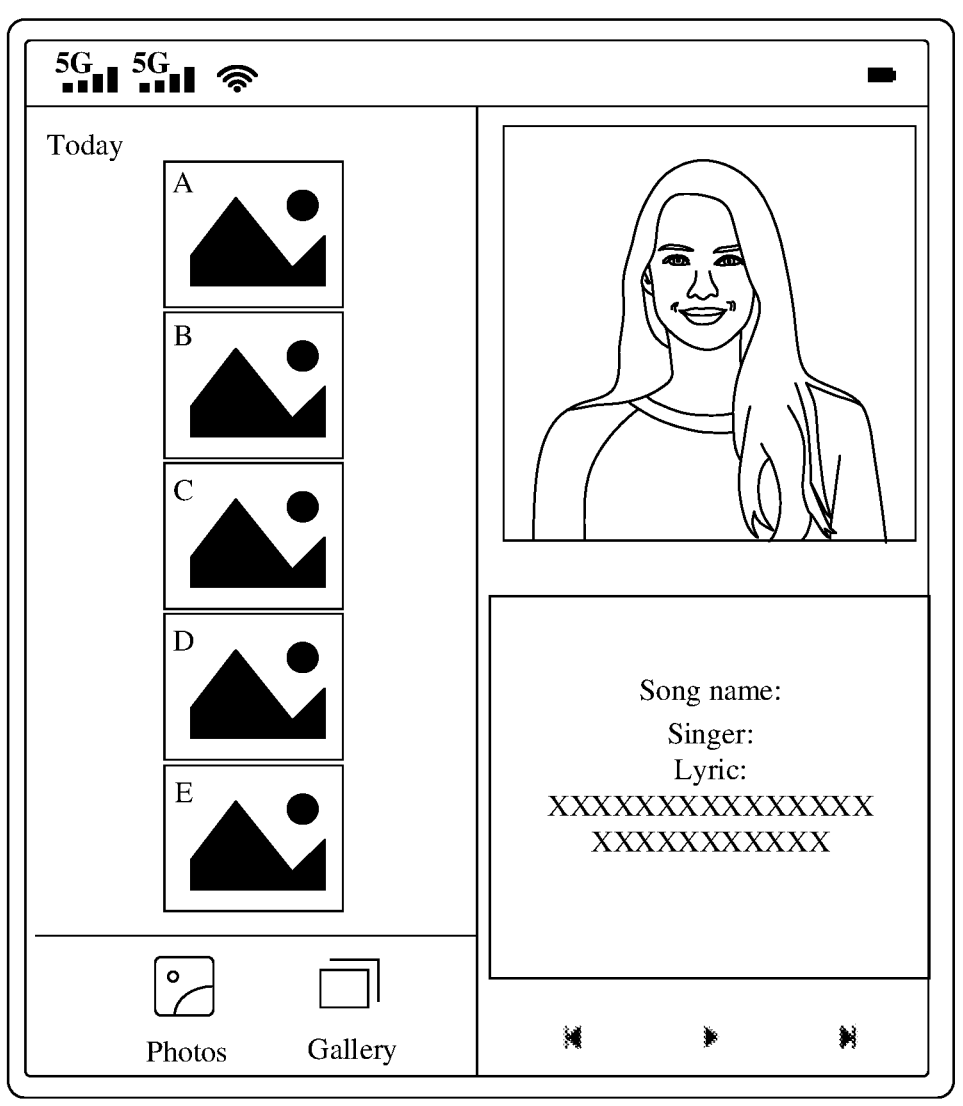
Figure 34:
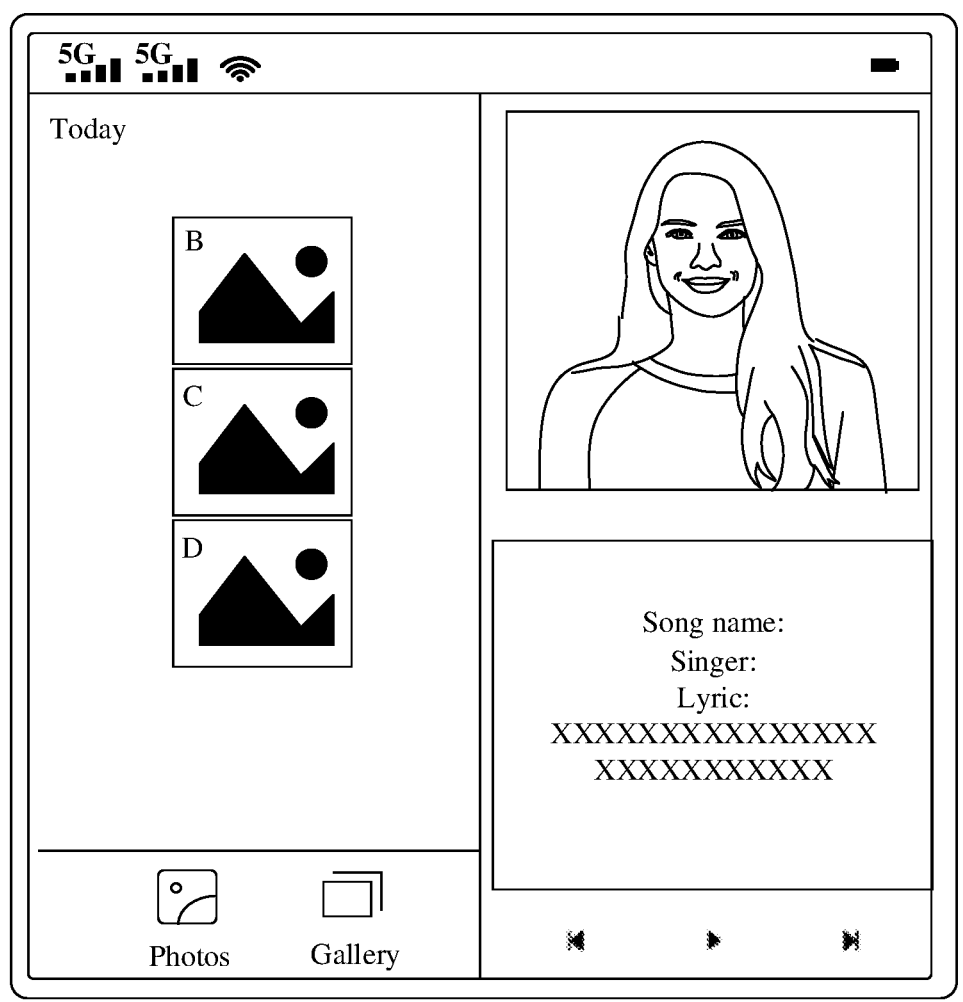

FIG. 34(1) shows a browsing interface displayed when a tablet computer runs the gallery application. The browsing interface includes a layout container. The layout container includes a plurality of image controls (for displaying a thumbnail of a photo or a video) that are respectively an image control A to an image control E. A wrap capability and a hiding capability are set for the layout container. The image control A and the image control E have highest hiding priorities, the image control B and the image control D have second highest hiding priorities, and the image control C has a lowest hiding priority. In this case, widths of the plurality of image controls are wrap reference values.

FIG. 34(2) is a schematic diagram of an interface on which the tablet computer displays two windows in a split-screen manner. A left window is used to display the browsing interface of the gallery application. The right window is used to display a playing interface of a music application. Because a size of the window used to display the browsing interface of the gallery application is reduced, the tablet computer is triggered to wrap to display the layout container. It is determined, based on the wrap reference value of each image control in the layout container, that only one image control can be displayed in each row. In this case, the five image controls are vertically displayed on the interface shown in FIG. 34(2). If a height of the window that is used by the tablet computer to display the browsing interface of the gallery application is insufficient to display the five image controls, the tablet computer is triggered to hide the five image controls based on the hiding priorities. On an interface shown in FIG. 34(3), the image control A and the image control E that have the highest hiding priorities are no longer displayed.

In conclusion, different display interfaces are drawn, based on a same layout file, by electronic devices having different screen parameters. In other words, the electronic devices having the different screen parameters can adaptively adjust a layout of a display interface based on the layout file, to meet different display requirements.

Figures 35, 36:
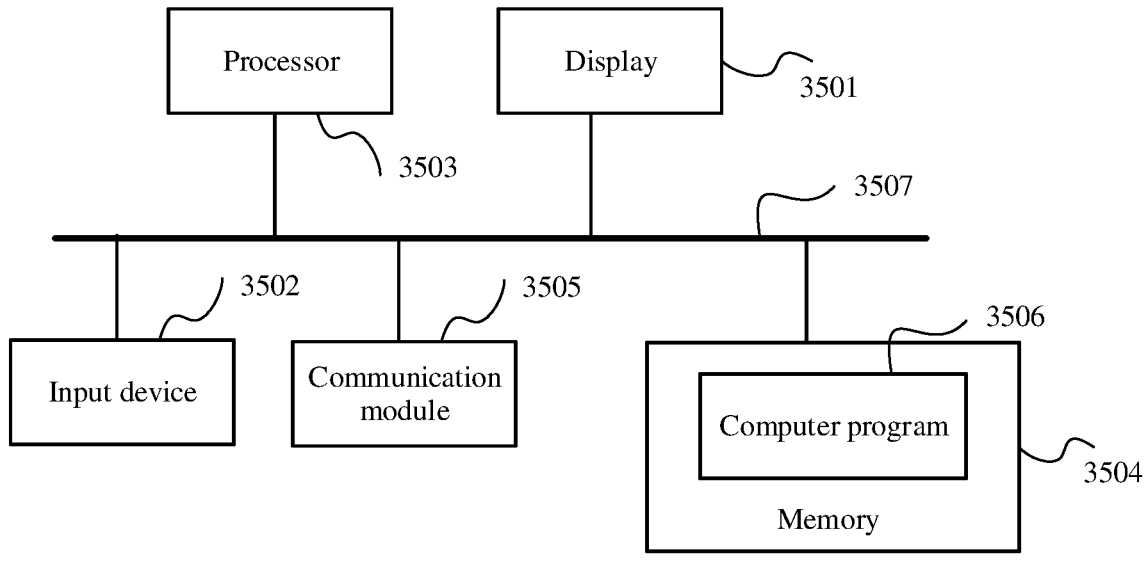
FIG. 35 is a schematic diagram 2 of a structure of an electronic device according to an embodiment of this application.
FIG. 36 is a schematic diagram 3 of a structure of an electronic device according to an embodiment of this application.

As shown in FIG. 35, an embodiment of this application discloses an electronic device. The electronic device may be an electronic device that runs the foregoing application development tool. The electronic device may specifically include a display 3501, an input device 3502 (for example, a mouse, a keyboard, or a touchscreen), one or more processors 3503, a memory 3504, a communication module 3505, one or more applications (not shown), and one or more computer programs 3506. The foregoing components may be connected through one or more communication buses 3507. The one or more computer programs 3506 are stored in the memory 3504 and are configured to be executed by the one or more processors 3503. The one or more computer programs 3506 include instructions, and the instructions may be used to perform a related step in the foregoing embodiments.

As shown in FIG. 36, an embodiment of this application discloses an electronic device. The electronic device may be an electronic device (which may also be referred to as a running device) on which an application installation package including the foregoing layout file is installed. The electronic device may specifically include a display 3601, one or more processors 3603, a memory 3604, a communication module 3605, one or more applications (not shown), and one or more computer programs 3606. The foregoing components may be connected through one or more communication buses 3607. The one or more computer programs 3606 are stored in the memory 3604 and are configured to be executed by the one or more processors 3603. The one or more computer programs 3606 include instructions, and the instructions may be used to perform a related step in the foregoing embodiments.

The foregoing descriptions about implementations allow a person skilled in the art to clearly understand that, for the purpose of convenient and brief description, division into the foregoing function modules is an example for illustration. In actual application, the foregoing functions can be allocated to different function modules for implementation based on requirements, in other words, an inner structure of an apparatus is divided into different function modules to implement all or some of the functions described above. For a detailed working process of the foregoing system, appa- ratus, and unit, refer to a corresponding process in the foregoing method embodiments. Details are not described herein again.

Functional units in embodiments of this application may be integrated into one processing unit, or each of the units may exist alone physically, or two or more units are inte- grated into one unit. The integrated unit may be imple- mented in a form of hardware, or may be implemented in a form of a software functional unit.

When the integrated unit is implemented in the form of the software functional unit and sold or used as an indepen- dent product, the integrated unit may be stored in a com- puter-readable storage medium. Based on such an under- standing, the technical solutions of embodiments of this application essentially, or the part contributing to the con- ventional technology, or all or some of the technical solu- tions may be implemented in a form of a software product. The computer software product is stored in a storage medium and includes several instructions for instructing a computer device (which may be a personal computer, a server, or a network device) or a processor to perform all or some of the steps of the methods described in embodiments of this application. The foregoing storage medium includes any medium that can store program code, for example, a flash memory, a removable hard disk, a read-only memory, a random access memory, a magnetic disk, or an optical disc.

The foregoing descriptions are merely specific implemen- tations of embodiments of this application, but are not intended to limit the protection scope of embodiments of this application. Any variation or replacement within the tech- nical scope disclosed in embodiments of this application shall fall within the protection scope of embodiments of this application. Therefore, the protection scope of embodiments of this application shall be subject to the protection scope of the claims.

What is claimed is:

1. A computer-implemented method comprising:

installing, by an electronic device, an application instal- lation package of a first application, wherein the appli- cation installation package comprises a first layout file, the first layout file comprises a first correspondence between a first control of the first application and a first preset algorithm, wherein an input parameter of the first preset algorithm is a value of a first attribute constraint condition of the electronic device, wherein the first attribute constraint condition of the electronic device comprises a constraint condition of at least one of a device size or a display direction, and wherein the device size comprises an aspect ratio, and the display direction comprises a landscape direction or a portrait direction;

obtaining, by the electronic device, the first attribute constraint condition;

calculating, by the electronic device, a first attribute value of the first control based on the first attribute constraint condition and the first preset algorithm, wherein the first attribute value of the first control indicates at least a size, a shape, a color, a resolution or a position of the first control on a first display interface of the first application;

determining, by the electronic device, a layout of the first control based on calculating the first attribute value, and displaying the first control on the first display interface according to the layout of the first control, wherein the first control includes a View or a View- Group; and displaying, by a second electronic device different from the electronic device, the first control on a second display interface according to the first layout file when the second electronic device runs the first application, wherein the first control on the first display interface of the electronic device is different from the first control on the second display interface of the second electronic device.

2. The method according to claim 1, wherein the first layout file further comprises a second correspondence between a second control and an attribute value of the second control, the attribute value of the second control indicates a size and a position of the second control on the first display interface, and the method further comprises:

calculating, by the electronic device, a second attribute value of the second control based on a device parameter and the first layout file; and determining, by the electronic device, a layout of the second control based on calculating the second attribute value, and displaying the second control on the first display interface according to the layout of the second control.

3. The method according to claim 2, wherein the first layout file further comprises a second preset algorithm, an input parameter of the second preset algorithm is a value of a second attribute constraint condition of the electronic device, the second attribute constraint condition comprises a constraint condition of at least one of a device type, a device size, a display direction, a device capability, or an interaction mode, and an output parameter of the second preset algo- rithm is the attribute value of the second control.

4. The method according to claim 1, wherein the first attribute value of the first control further indicates a display style of the first control.

5. The method according to claim 3, wherein the device type comprises a mobile phone, a television, a head unit, or a watch.

6. The method according to claim 3, wherein the device capability comprises a photographing capability, a position- ing capability, or a call capability, and the interaction mode comprises touch interaction, remote control interaction, or voice interaction.

7. The method according to claim 1, wherein the first layout file further comprises a first function item of the first control, the first function item comprises a layout capability of scaling, stretching, hiding, even distribution, or wrapping, and the method further comprises:

obtaining, by the electronic device, a third preset algo- rithm corresponding to the first function item; and inputting, by the electronic device, a device parameter as an input parameter to the third preset algorithm, and obtaining a third attribute value of the first control through calculation using the third preset algorithm.

8. The method according to claim 1, wherein the first layout file further comprises a third device capability cor- responding to a third control, and the method further com- prises:

querying, by the electronic device, a display output device having the third device capability; and indicating, by the electronic device, the display output device to display the third control.

9. The method according to claim 8, wherein indicating, by the electronic device, the display output device to display the third control comprises:

sending, by the electronic device to the display output device, a display resource corresponding to the third control to display the third control on the display output device.

10. An electronic device, comprising:
one or more processors,
a display, and
a non-transitory memory, wherein
the memory stores one or more computer programs, the one or more computer programs comprise instructions, and the instructions, when executed by the electronic device, cause the electronic device to perform operations comprising:

installing an application installation package of a first application, wherein the application installation package comprises a first layout file, the first layout file comprises a first correspondence between a first control of the first application and a first preset algorithm, wherein an input parameter of the first preset algorithm is a value of a first attribute constraint condition of the electronic device, wherein the first attribute constraint condition of the electronic device comprises a constraint condition of at least one of a device size or a display direction, and wherein the device size comprises an aspect ratio, and the display direction comprises a landscape direction or a portrait direction;

calculating, by the electronic device, a first attribute value of the first control based on the first attribute constraint condition and the first preset algorithm, wherein the first attribute value of the first control indicates at least a size, a shape, a color, a resolution or a position of the first control on a first display interface of the first application; and determining a layout of the first control based on calculating the first attribute value, and displaying the first control on the first display interface according to the layout of the first control, and the first control includes a View or a ViewGroup; and wherein a second electronic device different from the electronic device displays the first control on a second display interface according to the first layout file when the second electronic device runs the first application, wherein the first control on the first display interface of the electronic device is different from the first control on the second display interface of the second electronic device.

11. The electronic device according to claim 10, wherein the first layout file further comprises a second correspondence between a second control and an attribute value of the second control, and the attribute value of the second control indicates a size and a position of the second control on the first display interface; and the electronic device is further caused to perform:

calculating a second attribute value of the second control based on a device parameter and the first layout file; and determining a layout of the second control based on calculating the second attribute value, and displaying the second control on the first display interface according to the layout of the second control.

12. The electronic device according to claim 11, wherein the first layout file further comprises a second preset algorithm, an input parameter of the second preset algorithm is a value of a second attribute constraint condition of the electronic device, the second attribute constraint condition comprises a constraint condition of at least one of a device type, a device size, a display direction, a device capability, or an interaction mode, and an output parameter of the second preset algorithm is the attribute value of the second control.

13. The electronic device according to claim 12, wherein the device capability comprises a photographing capability, a positioning capability, or a call capability, and the interaction mode comprises touch interaction, remote control interaction, or voice interaction.

14. The electronic device according to claim 10, wherein the first layout file further comprises a third device capability corresponding to a third control, and the electronic device is further caused to perform:

querying, by the electronic device, a display output device having the third device capability; and indicating, by the electronic device, the display output device to display the third control.

15. The electronic device according to claim 14, wherein indicating, by the electronic device, the display output device to display the third control comprises:

sending, to the display output device, a display resource corresponding to the third control to display the third control on the display output device.

\* \* \* \* \*